United States Patent
Pettigrew et al.

(10) Patent No.: US 8,619,093 B2
(45) Date of Patent: Dec. 31, 2013

(54) KEYING AN IMAGE

(75) Inventors: Daniel Pettigrew, Pacific Palisades, CA (US); Andrew Bryant, Los Gatos, CA (US); Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 689 days.

(21) Appl. No.: 12/840,286

(22) Filed: Jul. 20, 2010

(65) Prior Publication Data

US 2012/0019551 A1   Jan. 26, 2012

(51) Int. Cl.
*G09G 5/02* (2006.01)

(52) U.S. Cl.
USPC ........... 345/594; 345/419; 345/441; 345/593; 382/162; 382/163; 382/167

(58) Field of Classification Search
USPC .......... 345/419, 441, 593–594; 382/162, 163, 382/167
See application file for complete search history.

(56) References Cited

U.S. PATENT DOCUMENTS

| 4,476,487 | A | 10/1984 | Klie et al. |
| 4,488,245 | A | 12/1984 | Dalke et al. |
| 5,130,789 | A | 7/1992 | Dobbs et al. |
| 5,313,275 | A | 5/1994 | Daly et al. |
| 5,416,890 | A | 5/1995 | Beretta |
| 5,670,986 | A | 9/1997 | Leak |
| 5,715,325 | A | 2/1998 | Bang et al. |
| 5,751,845 | A | 5/1998 | Dorff et al. |
| 5,867,169 | A | 2/1999 | Prater |
| 6,201,581 | B1 | 3/2001 | Moriwake et al. |
| 6,351,557 | B1 | 2/2002 | Gonsalves |
| 6,362,829 | B1 | 3/2002 | Omvik et al. |
| 6,400,843 | B1 * | 6/2002 | Shu et al. ............ 382/167 |
| 6,477,271 | B1 * | 11/2002 | Cooper et al. .......... 382/167 |
| 6,496,599 | B1 | 12/2002 | Pettigrew |

(Continued)

FOREIGN PATENT DOCUMENTS

| EP | 1294177 | 3/2003 |
| EP | 2286384 | 2/2011 |

(Continued)

OTHER PUBLICATIONS

European Search Report and opinion of European Patent Application EP12156769, Apr. 26, 2012, Apple Inc.

(Continued)

*Primary Examiner* — Xiao M. Wu
*Assistant Examiner* — Todd Buttram
(74) *Attorney, Agent, or Firm* — Adeli & Tollen LLP

(57) ABSTRACT

Some embodiments provide a method that provides an image display area that displays an image having a set of pixels that have pixel values in a color space. The method provides a first GUI item that activates a first sampling tool for selecting a first section of the image. The first section includes a first set of pixels for defining a first portion of the color space enclosing the pixel values of the first set. An image pixel whose pixel values are in the first portion is fully selected. The method provides a second GUI item that activates a second sampling tool for selecting a second section of the image displayed in the image display area. The second section includes a second set of pixels for defining a second portion of the color space enclosing the first portion and excluding the pixel values of the first set of pixels.

22 Claims, 45 Drawing Sheets

(56) References Cited

U.S. PATENT DOCUMENTS

| | | | |
|---|---|---|---|
| 6,751,347 | B2 | 6/2004 | Pettigrew et al. |
| 6,757,425 | B2 | 6/2004 | Pettigrew et al. |
| 6,763,134 | B2 | 7/2004 | Cooper et al. |
| 6,788,812 | B1 | 9/2004 | Wilkins |
| 7,280,117 | B2 | 10/2007 | Fayan |
| 7,317,830 | B1 | 1/2008 | Gordon et al. |
| 7,508,455 | B2 | 3/2009 | Liu et al. |
| 7,598,964 | B2 | 10/2009 | Olson |
| 7,602,991 | B2 | 10/2009 | Kokemohr |
| 7,623,138 | B2 | 11/2009 | Fukao et al. |
| 7,693,341 | B2 | 4/2010 | Pettigrew et al. |
| 7,886,355 | B2 | 2/2011 | Rager et al. |
| 7,978,938 | B1 | 7/2011 | Wilensky |
| 8,081,821 | B1 | 12/2011 | Schaem |
| 8,098,259 | B2 | 1/2012 | Kondo et al. |
| 2001/0028738 | A1 | 10/2001 | Pettigrew et al. |
| 2001/0036310 | A1 | 11/2001 | Pettigrew et al. |
| 2003/0016866 | A1 | 1/2003 | Cooper et al. |
| 2003/0053685 | A1 | 3/2003 | Lestideau |
| 2003/0103234 | A1 | 6/2003 | Takabayashi et al. |
| 2003/0133617 | A1 | 7/2003 | Mukherjee |
| 2004/0264767 | A1 | 12/2004 | Pettigrew |
| 2005/0162426 | A1* | 7/2005 | Okada ........................ 345/467 |
| 2005/0238217 | A1 | 10/2005 | Enomoto et al. |
| 2006/0028483 | A1 | 2/2006 | Kondo et al. |
| 2006/0045332 | A1* | 3/2006 | Park .......................... 382/162 |
| 2006/0055708 | A1 | 3/2006 | Fayan |
| 2006/0126719 | A1 | 6/2006 | Wilensky |
| 2007/0189627 | A1 | 8/2007 | Cohen et al. |
| 2008/0117333 | A1 | 5/2008 | Walsh |
| 2008/0131010 | A1 | 6/2008 | Wilensky |
| 2008/0292136 | A1* | 11/2008 | Ramani et al. ............... 382/100 |
| 2009/0204913 | A1 | 8/2009 | Kawano et al. |
| 2009/0220149 | A1 | 9/2009 | Menadeva et al. |
| 2009/0297031 | A1 | 12/2009 | Pettigrew et al. |
| 2009/0297034 | A1 | 12/2009 | Pettigrew et al. |
| 2009/0297035 | A1 | 12/2009 | Pettigrew et al. |
| 2009/0300553 | A1 | 12/2009 | Pettigrew et al. |
| 2010/0054549 | A1 | 3/2010 | Steinberg et al. |
| 2010/0073401 | A1* | 3/2010 | Zaklika et al. ............... 345/619 |
| 2010/0080448 | A1 | 4/2010 | Tam |
| 2012/0206479 | A1 | 8/2012 | Bryant et al. |
| 2012/0210274 | A1 | 8/2012 | Pettigrew et al. |

FOREIGN PATENT DOCUMENTS

| | | |
|---|---|---|
| EP | 2431942 | 3/2012 |
| EP | 2458552 | 5/2012 |
| EP | 2458560 | 5/2012 |
| GB | 2312120 | 10/1997 |
| WO | WO 01/26050 | 4/2001 |
| WO | WO 2009/154951 | 12/2009 |
| WO | PCT/US2012/025525 | 2/2012 |

OTHER PUBLICATIONS

European Search Report and opinion of European Patent Application EP12156770, Apr. 26, 2012, Apple Inc.

Invitation to pay fees and partial international search report of PCT Application PCT/US2012/025525, Jun. 14, 2012, Apple Inc.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Li, Yin, et al, "Lazy Snapping," ACM Transactions on Graphics, Jan. 2004, pp. 303-308, vol. 23, No. 3, ACM, NY, USA.

U.S. Appl. No. 12/840,284, filed Jul. 20, 2010, Pettigrew, Daniel, et al.

U.S. Appl. No. 12/840,290, filed Jul. 20, 2010, Pettigrew, Daniel, et al.

Author Unknown, "Adobe Photoshop 5.0 Limited Edition User Guide, Chapter 4: Making Color and Tonal Adjustments," Adobe Photoshop 5.0 Limited Edition User Guide, Jan. 1, 1998, pp. 67-89, Adobe Systems Incorporated, USA.

Author Unknown, "Adobe Photoshop 5.0 User Guide, Chapter 7: Selecting," Adobe Photoshop 5.0 User Guide, Jan. 1, 1998, pp. 137-164, Adobe Systems Incorporated, USA.

Portions of prosecution history of U.S. Appl. No. 12/840,284, Jul. 7, 2011, Daniel Pettigrew, et al.

Portions of prosecution history of U.S. Appl. No. 12/840,290, Jul. 7, 2011, Daniel Pettigrew, et al.

Bai, Xue, et al., "A Geodesic Framework for Fast Interactive Image and Video Segmentation and Matting," Dec. 26, 2007, 8 pages, IEEE Xplore.

* cited by examiner

KEYING AN IMAGE

CROSS REFERENCE TO RELATED APPLICATIONS

This Application is related to the following applications: U.S. patent application Ser. No. 12/840,284, filed Jul. 20, 2010; and U.S. patent application Ser. No. 12/840,290, filed Jul. 20. 2010.

BACKGROUND

Video producers often shoot video against a blue or green background screen, and later mix that video with a background image or video such that the subject of the video (e.g., a person) appears to be in the environment of the background image or video. The video producer will use an editing application to composite the subject with the desired background. Additionally, photographers (or video producers) will often want to isolate a particular color in a photo (or video) and make modifications to only the portion of the photo with that particular color. For example, a photo shot in poor light might be made better by changing the saturation levels of a particular feature.

A media editing application uses a key to identify the desired portion of the image or video (e.g., the blue or green screen). Some applications allow a user to select a portion of an image (e.g., by tracing over the image) and then just modify that portion—however, it is often difficult for a user to accurately trace the boundaries of an item in an image. In other applications, the key is defined as a portion of a color space. However, identifying an accurate portion of the color space is difficult, especially when accounting for halos that will appear around a subject in front of a blue or green screen.

BRIEF SUMMARY

Some embodiments of the invention provide a novel keyer for a media-editing application. The keyer identifies a portion of a color space that defines a selection of a portion of an image (e.g., a still image, a video picture, etc.). In some embodiments, the portion of the color space is based on a sample of pixels from the image. The keyer identifies a first portion of the color space that encloses pixel values in the color space of the sample pixels. Pixels of the image whose pixel values correspond to the first portion are fully selected. In some embodiments, the keyer also identifies a second portion of the color space that encloses the first portion, and pixels whose pixel values correspond to the second portion are partially selected. When the media-editing application applies edits to the image, the edits are applied to each pixel of the image based on the extent to which the pixel is selected.

Some embodiments provide two user-interface tools with which a user samples pixels from the image. To sample pixels with either tool, the user draws (e.g., with a cursor or touchscreen) a shape over a display of the image while the tool is selected. The pixels within the shape are sampled for use by the keyer to generate the first and second portions of the color space. The first portion of the color space encloses the pixel values of the pixels selected by the first tool (positive sample pixel values), while the second portion of the color space excludes the pixel values of the pixels selected by the second tool (negative sample pixel values).

Based on the image pixels sampled with the first tool, some embodiments identify the first portion of the color space. In some embodiments, the color space is a three-dimensional color space (e.g., YCbCr, HSL, RGB, etc.), and the first portion is a volume in the color space. Some embodiments initially identify a two-dimensional shape for the first portion in two dimensions of the color space that encloses all of the positive sample pixel values in those two dimensions. Different embodiments use different two-dimensional shapes for the first portion, such as a wedge, a circle, etc. Some embodiments then propagate this shape along the third dimension in order to form a volume. In this case, the first portion of the color space is a prism with an edge that runs the length of the positive sample pixel values in the third dimension.

The keyer of some embodiments also generates the second portion of the color space based on the first portion. Within the color space, the second portion encloses the first portion, such that pixels whose pixel values are within the second portion and outside the first portion are partially selected. In some embodiments, the keyer generates a two-dimensional shape for the second portion that encloses the two-dimensional shape in the first two dimensions of the color space. In some embodiments, the second portion shape is a larger version of the first portion shape (e.g., a larger concentric circle, a wedge with larger radial and angular range). The difference in size between the first portion shape and the second portion shape is based on an value input by a user in some embodiments (e.g., through a UI item such as a slider). In addition, the keyer may modify the shape of the second portion in some embodiments to exclude any negative sample pixel values (e.g., by reducing the spread of the second portion shape in one dimension). Some embodiments then propagate the second portion shape along the third dimension in order to form a volume for the second portion, as with the first portion. The range of the prism in the third dimension is larger than for the first portion so as to enclose the first portion. This range may also be shortened by the negative sample pixel values.

Once the first and second portions of the color space are generated from the sample pixel values, some embodiments display the two-dimensional shapes to a user of the media-editing application and enable the user to freely modify the shapes within the two-dimensional plane. In some embodiments, a user can drag the edges of the shapes (or points on the edges) in order to modify the shape. Some embodiments restrict the modifications to changing parameters of a particular shape (e.g., the radial or angular spread of an arc, the radius of a circle, etc.). Other embodiments, however, put no restrictions on the modification of the shapes. In some embodiments, the shapes are formed of spline curves (e.g., bezier splines, b-splines, etc.) that the user drags to form a desired shape.

Modification to the first portion shape in some embodiments causes a corresponding modification to the second portion shape. For instance, increasing the size of the first portion shape will cause the second portion shape to increase in size as well. Even when modifications to the first portion shape do not affect the second portion shape, the first portion shape cannot be modified such that the second portion shape no longer encloses the first portion shape in the plane.

In addition, some embodiments enable the user to modify the first and second portions of the color space in the third dimension. As described, the user can modify the shape of the first and second portions in the first two dimensions of the color space, and these shapes are propagated along the third dimension to form a prism in some embodiments. The user can modify the length of the prisms in some embodiments, so long as the second portion still encloses the first portion.

The user can also modify how the shape propagates through the third dimension in some embodiments. By modifying a curve that runs along the third dimension, some embodiments shift the location in the two-dimensional plane of the first and/or second portion shapes for different third dimension values. For instance, the shape might range from $x_1$ to $x_2$ and $y_1$ to $y_2$ in the two-dimensional plane at $z_1$ in the third dimension, while ranging from $x_3$ to $x_4$ and $y_3$ to $y_4$ at $z_2$ in the third dimension (where $x_2-x_1=x_4-x_3$ and $y_2-y_1=y_4-y_3$). This modifiable curve running along the third dimension is a spline curve (e.g., bezier spline, b-spline, etc.) in some embodiments, and the user modifies the definition points of the spline curve.

The keyer of some embodiments also provides an auto-fitting function that identifies a best fit in three dimensions of the color space for the first portion volume. Some embodiments automatically modify the modifiable curve that runs along the third dimension to that the first portion more tightly encloses the sample pixel values, as those pixel values may vary in the two-dimensional plane at different values of the third dimension.

In addition to keying based on user input (i.e., user-selected samples, modification of the first and second portions of color space), some embodiments automatically generate the first and second portions of the color space when the media-editing application opens an image or video. In some embodiments, the application identifies whether the background of the image is one of a set of particular colors (e.g., blue and green), and if so, identifies a set of positive sample pixels in the image to use to generate a first and second portion of the color space. Based on an automatically generated first and second portions of the color space, some embodiments also automatically generate positive sample shapes and display these over the image.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. For instance, many of the examples illustrate keying in the YCbCr color space. However, various embodiments may key in other color space, such as RGB or HSL.

Some embodiments of the invention provide a novel keyer for a media-editing application. The keyer identifies a portion of a color space that defines a selection of a portion of an image. In some embodiments, the portion of the color space is based on a sample of pixels from the image. The keyer identifies a first portion of the color space (i.e., a key) that encloses pixel values in the color space of the sample pixels. Pixels of the image whose pixel values correspond to the first portion are fully selected. In some embodiments, the keyer also identifies a second portion of the color space (i.e., a transition region) that encloses the first portion, and pixels whose pixel values correspond to the second portion are partially selected.

The media-editing application of some embodiments allows a user to edit an image (e.g., a photograph, animation, etc.) or a sequence of images (e.g., a video composed of frames or fields). The media-editing application provides a set of user interface tools that the user manipulates in order to modify the image. The user can apply color correction edits to the image, such as a hue shift, saturation shift, etc. When the media-editing application applies edits to the image, the edits are applied to each pixel of the image based on the extent to which the pixel is selected. When the user edits a sequence of images, in some embodiments each image in the sequence is modified in the same manner.

Figure 1:
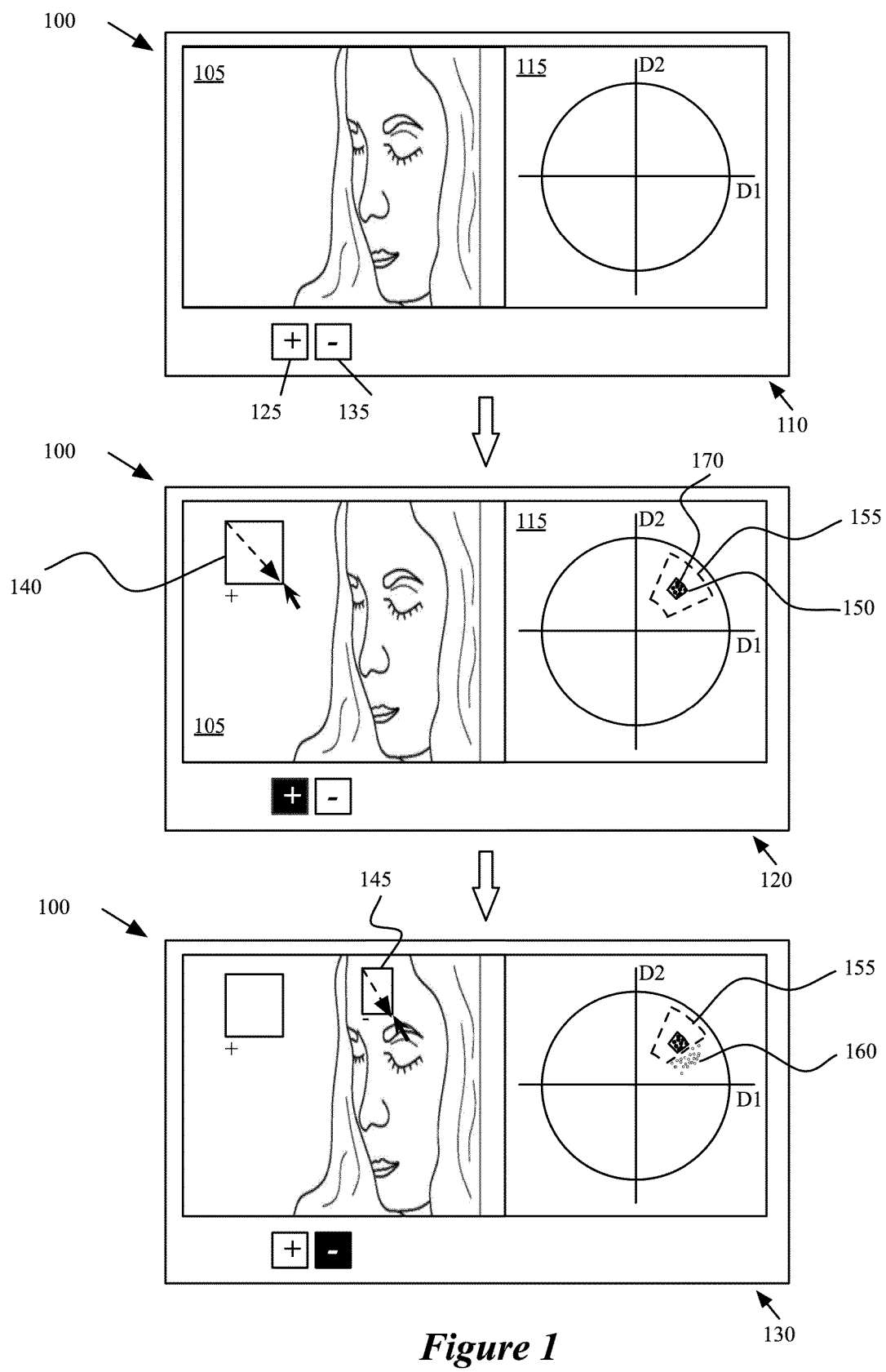
FIG. 1 illustrates the generation of a key and transition region in a graphical user interface (GUI) of a media editing application.

FIG. 1 illustrates the generation of a key and transition region in a graphical user interface (GUI) 100 of such a media editing application. Specifically, FIG. 1 illustrates the GUI 100 in three stages: a first stage 110 before a user has selected any samples of a displayed image, a second stage 120 that illustrates a key shape and transition shape in two dimensions of a color space after a user has selected a positive (inclusive) sample of the image, and a third stage 130 that illustrates the key shape and transition shape in the two dimensions of the color space after the user has selected a negative (exclusive) sample of the image.

As shown at the first stage 110, the GUI includes an image display area 105, a key display area 115, and a pair of sampling UI items 125 and 135. The image display area 105 displays an image for the user to edit with a set of editing tools. The user can also draw sample shapes over the image in the image display area in order to generate samples of pixels for the keyer.

In some embodiments, the key display area 115 of some embodiments displays a two-dimensional plane of the color space in which the media-editing application generates the key. Within the two-dimensional plane, the key display area 115 displays key and transition shapes generated based on sampled pixels. In some embodiments, the user can also directly modify the key and transition shapes in the two-dimensional plane.

The sampling UI items 125 and 135 enable a user to activate either a positive sampling tool or negative sampling tool in order to sample pixels from the image displayed in image display area 110. To sample pixels with either tool, the user draws (e.g., with a cursor or touchscreen) a shape over a display of the image while the tool is selected. The pixels within the shape are sampled for use by the keyer to generate the key and transition regions. The key encloses in the color space the pixel values of the pixels selected by the first tool (positive sample pixel values), while the transition regions excludes in the color space the pixel values of the pixels selected by the second tool (negative sample pixel values).

Stage 120 illustrates that a user has activated the positive sampling tool by selecting UI item 125 and has drawn a positive sample shape 140 over a portion of the background of the image in image display area 105 using a cursor (as illustrated by the dashed arrow). As a result, the media-editing application has generated a key shape 150 in the two-dimensional plane of the color space based on the pixels sampled with the positive sample tool. These pixel values are plotted as points 170 in the two-dimensional plane. In some embodiments, the color space is a three-dimensional color space (e.g., YCbCr, HSL, RGB, etc.) and the key is a volume in that color space. As shown in FIG. 1, some embodiments initially identify a two-dimensional shape for the key in two dimensions of the color space that encloses all of the positive sample pixel values in those two dimensions. Different embodiments use different two-dimensional shapes for the key, such as a wedge, a circle, etc. Some embodiments then propagate this shape along the third dimension in order to form a volume. In this case, the key is a prism with an edge having a length based on the range of the positive sample pixel values in the third dimension.

In addition to the key shape, the media-editing application has generated a transition shape 155 that encloses the key shape 150 in the first two dimensions of the color space. As illustrated, the transition shape is a larger version of the key shape in some embodiments. The difference in size between the key shape 150 and the transition shape 155 is based on a value in some embodiments, which may be input by a user (e.g., as a number, through a UI item such as a slider, etc.).

In addition, the keyer may modify the transition shape in some embodiments to exclude any negative sample pixel values (e.g., by reducing the spread of the transition shape in one dimension). The third stage 130 illustrates that the user has activated the negative sampling tool by selecting UI item 135 and has drawn a negative sample shape 145 over a portion of the subject of the image in image display area 105 using a cursor (as illustrated by the dashed arrow). As a result, the transition shape 155 is now smaller on one side of the key shape so as to exclude the pixel values of the pixels within shape 145. As shown by negative sample pixel values 165, some embodiments plot the sample pixel values in the key display area.

To form a transition volume in the three-dimensional color space, some embodiments propagate the transition shape along the third dimension, as with the key. The range of the transition prism in the third dimension is larger than for the key so as to enclose the key. This range may also be shortened by the negative sample pixel values. Within the color space, the transition region encloses the key, such that pixels whose pixel values are within the transition region and outside the key are partially selected.

Figure 2:
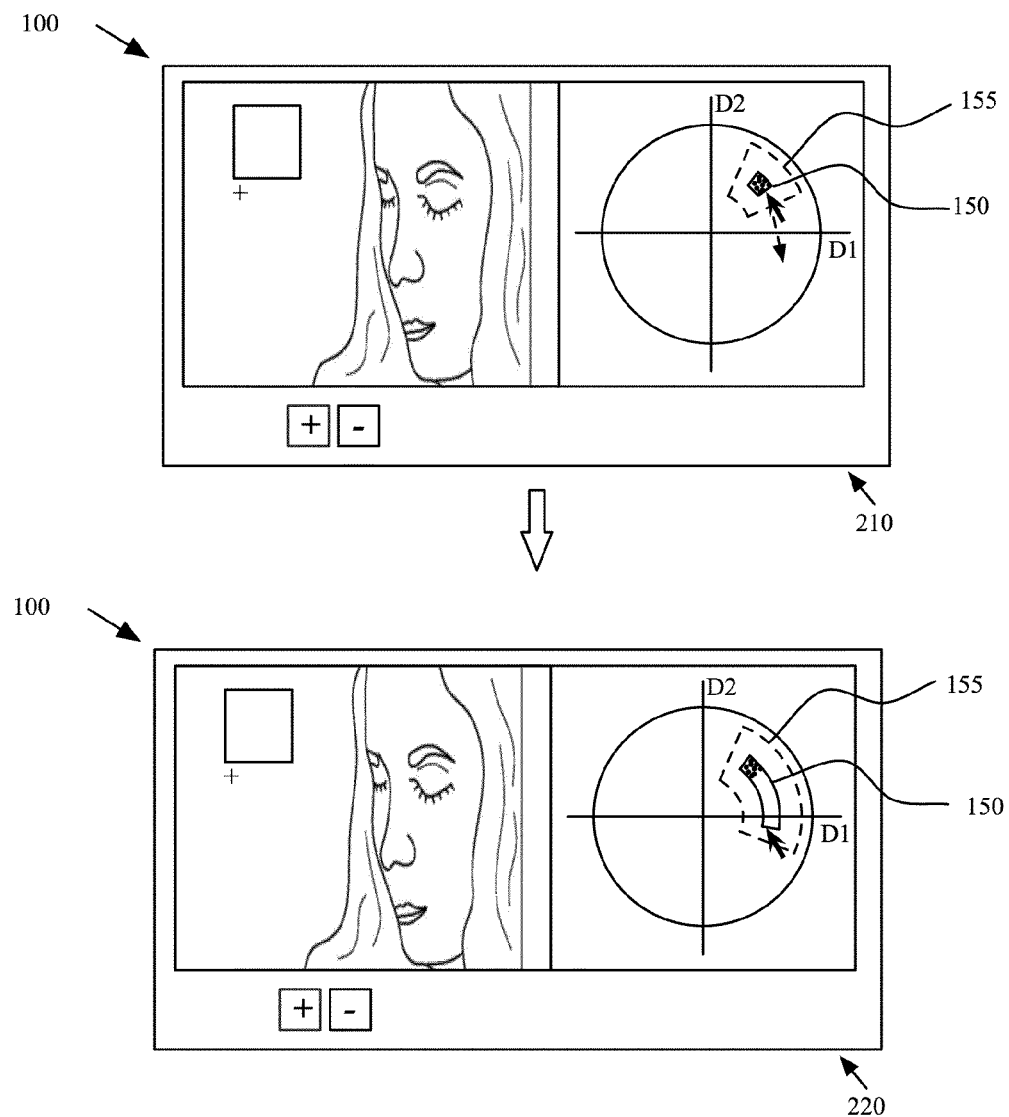
FIG. 2 illustrates the GUI of FIG. 1 in two stages, before and after a user has directly modified the key shape.

Once key and transition regions are generated in the color space from the sample pixel values, some embodiments enable the user to freely modify the shapes within the two-dimensional plane. FIG. 2 illustrates the GUI 100 in two stages 210 and 220, before and after a user has directly modified the key shape 150. As shown in stage 210, the user places a cursor on the edge of the key shape 150 and drags the edge of the shape down and to the right (as illustrated by the dashed arrow). The result, in stage 220, is that the key shape 150 has increased by moving the bottom right edge of the shape clockwise around the center of the plane of color space.

Modification to the key shape in some embodiments causes a corresponding modification to the transition shape, as illustrated in stage 220, in which the transition shape 155 has correspondingly increased such that the transition shape remains larger than the key shape 150 by the same amount as in stage 210. Even when modifications to the key shape do not affect the transition shape, the key shape cannot be modified such that the transition shape no longer encloses the key shape in the plane.

Figure 3:
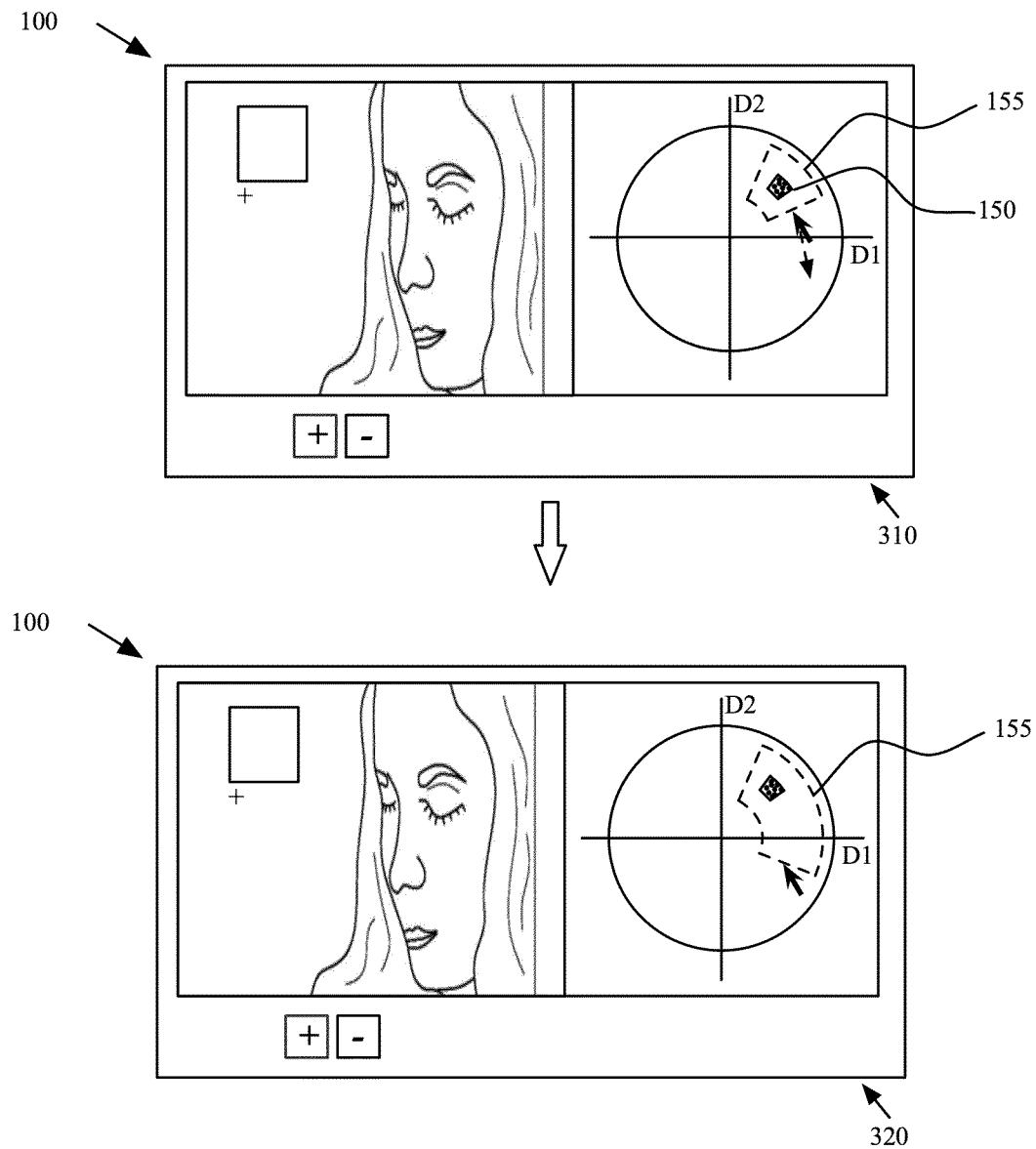
FIG. 3 illustrates the GUI of FIG. 1 in two stages, before and after a user has directly modified the transition shape.

FIG. 3 illustrates the GUI 100 in two stages 310 and 320, before and after a user has directly modified the transition shape 155. As shown in stage 310, the user places a cursor on the edge of the transition shape 155 and drags the edge of the shape down and to the right (as illustrated by the dashed arrow). The result, in stage 320, is that the transition shape 155 has increased by moving the bottom right edge of the shape clockwise around the center of the plane of color space. In some embodiments, as shown, modifying the transition shape directly does not affect the key shape. The result is that the transition shape 155 at stage 320 is the same as at stage 220, but the key shape 150 has not changed in this case.

In some embodiments, the user drags the edges of the shapes (or points on the edges) in order to modify the shape, as illustrated. Some embodiments restrict the modifications to changing parameters of a particular shape (e.g., the radial or angular spread of an arc, the center and radius of a circle, etc.). Other embodiments, however, put no restrictions on the modification of the shapes. In some embodiments, the shapes are formed of spline curves (e.g., bezier splines, b-splines, etc.) that the user drags to form a desired shape in the color plane.

In addition, some embodiments enable the user to modify the key and transition region in the third dimension of the color space. As described, the user can modify the key and transition shapes in the first two dimensions of the color space, and these shapes are propagated along the third dimension to form a prism in some embodiments. The user can modify the length of the prisms, so long as the transition volume still encloses the key volume.

Figure 4:
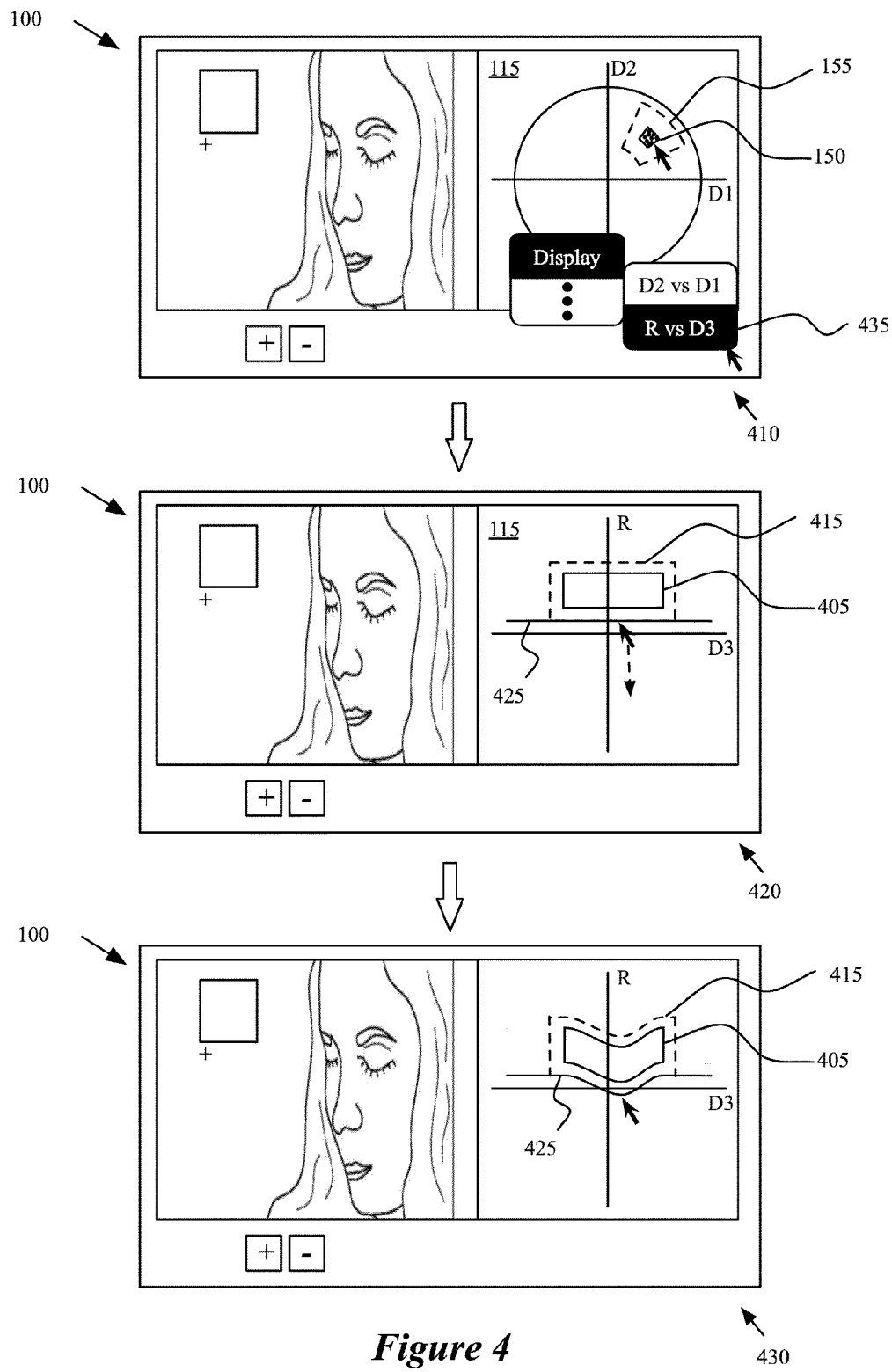
FIG. 4 illustrates the GUI of FIG. 1 with a different view of the color space in the key display area.

The user can also modify how the shape propagates through the third dimension in some embodiments. FIG. 4 illustrates the GUI 100 in three stages 410-430. In the first stage 410, the user selects a menu item 435 to toggle between views of the key display area 115. Rather than display the plane of the first two dimensions of the color space, the user selects for a display of the third dimension and a dimension derived from the first two dimensions on the y-axis.

The second stage 420 illustrates that the key display area 115 now displays a different set of axes than in the previous figures. As shown at stage 420, the key display area 115 displays a plane with the third dimension of color space on the x-axis and a dimension derived from the first two dimensions on the y-axis. For instance, when the shapes in the two-dimensional plane are wedges, the derived dimension is the radial distance from the origin in the plane in some embodiments.

The key display area 115 also displays key and transition regions 405 and 415 in the new plane. By default in some embodiments, the regions are rectangles paralleling the third dimension, as the regions represent how the key and transition shapes propagate along the third dimension to form the key and transition volumes. A modifiable curve 425 is displayed running along the third dimension, which the user can modify in some embodiments to shift the location in the two-dimensional plane of the first and/or second portion shapes for different third dimension values. For instance, the shape might range from $x_1$ to $x_2$ and $y_1$ to $y_2$ in the two-dimensional plane at $z_1$ in the third dimension, while ranging from $x_3$ to $x_4$ and $y_3$ to $y_4$ at $z_2$ in the third dimension (where $x_2-x_1=x_4-x_3$ and $y_2-y_1=y_4-y_3$). This modifiable curve is a spline curve (e.g., bezier spline, b-spline, etc.) in some embodiments, in which the user modifies the definition points of the spline curve.

Stage 420 illustrates that the user has placed the cursor on the curve 425 and dragged the curve downwards (as indicated by the dashed arrow). Stage 420 illustrates the result, that the curve 425 is modified. The key and transition regions are modified correspondingly based on the new curve. In three dimensions, the key and transition volumes are formed by propagating the key and transition shapes 150 and 155 along the curve 425 through the third dimension.

The keyer of some embodiments also provides an auto-fitting function that identifies a best fit in three dimensions of the color space for the key volume. Some embodiments automatically modify the modifiable curve that runs along the third dimension to more tightly enclose the sample pixel values as those pixel values may vary in the two-dimensional plane at different values of the third dimension.

In addition to keying based on user input (i.e., user-selected samples, modification of the key and transition region of color space), some embodiments automatically generate the key and transition regions of the color space when the media-editing application opens an image. In some embodiments, the application identifies whether the background of the image is one of a set of particular colors (e.g., blue and green), and if so, identifies a set of positive sample pixels in the image to use to generate a key and transition region. Based on an automatically generated key and transition region, some embodiments also automatically generate positive sample shapes and display these sample shapes over the image.

Several more detailed embodiments of the invention are described below. Section I describes in further detail the initial generation of the key and transition volumes for an image based on samples of the image. Section II then describes direct modification of the key and transition shapes in a two-dimensional plane, while Section III describes various controls for modifying the key in the third dimension. Section IV describes the automatic keyer of some embodiments. Next, Section V describes the use of a key to color correct an image. Section VI then describes the software architecture of a media production application of some embodiments, while Section VII follows that with a description of a process used to define and store the application. Finally, Section VIII describes an electronic system with which some embodiments of the invention are implemented.

I. Generation of Initial Key and Transition

The media-editing application of some embodiments generates an initial key and transition region for an image (e.g., a photograph, a video picture, etc.) based on user-selected samples of one or more areas of an image. A user can select a region of the image to indicate that all of the pixels in the selected region should be part of the key that defines a selection of a portion of the image. As mentioned above, in some embodiments a key is a set of pixel values that define a selection of a portion of the image. Any pixels in the image whose pixel values fall in the set are part of the selection. In some embodiments, the pixel values are values in a particular color space (e.g., YCbCr (YUV) color space).

In addition to generating a key, some embodiments generate a transition region outside the key. Image pixels whose pixel values fall within the transition region are only partially part of the selection; the extent to which a particular pixel is part of the selection is determined by how close its pixel values are to the key. When a pixel is only partially selected, edits (e.g., color correction edits) applied to a selection are only partially applied to the pixel.

In addition to samples that define the key, samples can be used to constrain the transition region in some embodiments—i.e., to determine portions of the image that will not be selected at all. When such an exclusionary sample (referred to herein as a negative sample, while samples for defining the key are referred to as positive samples) is selected, the pixel values of the pixels in that sample are excluded from the transition region (e.g., by modifying the transition region). The following subsection A describes the sampling of portions of an image and the resulting generation or modification of a key and transition region, while subsection B will describe in detail how a transition region is generated from a key according to some embodiments.

A. Sampling a Portion of an Image

Figure 5:
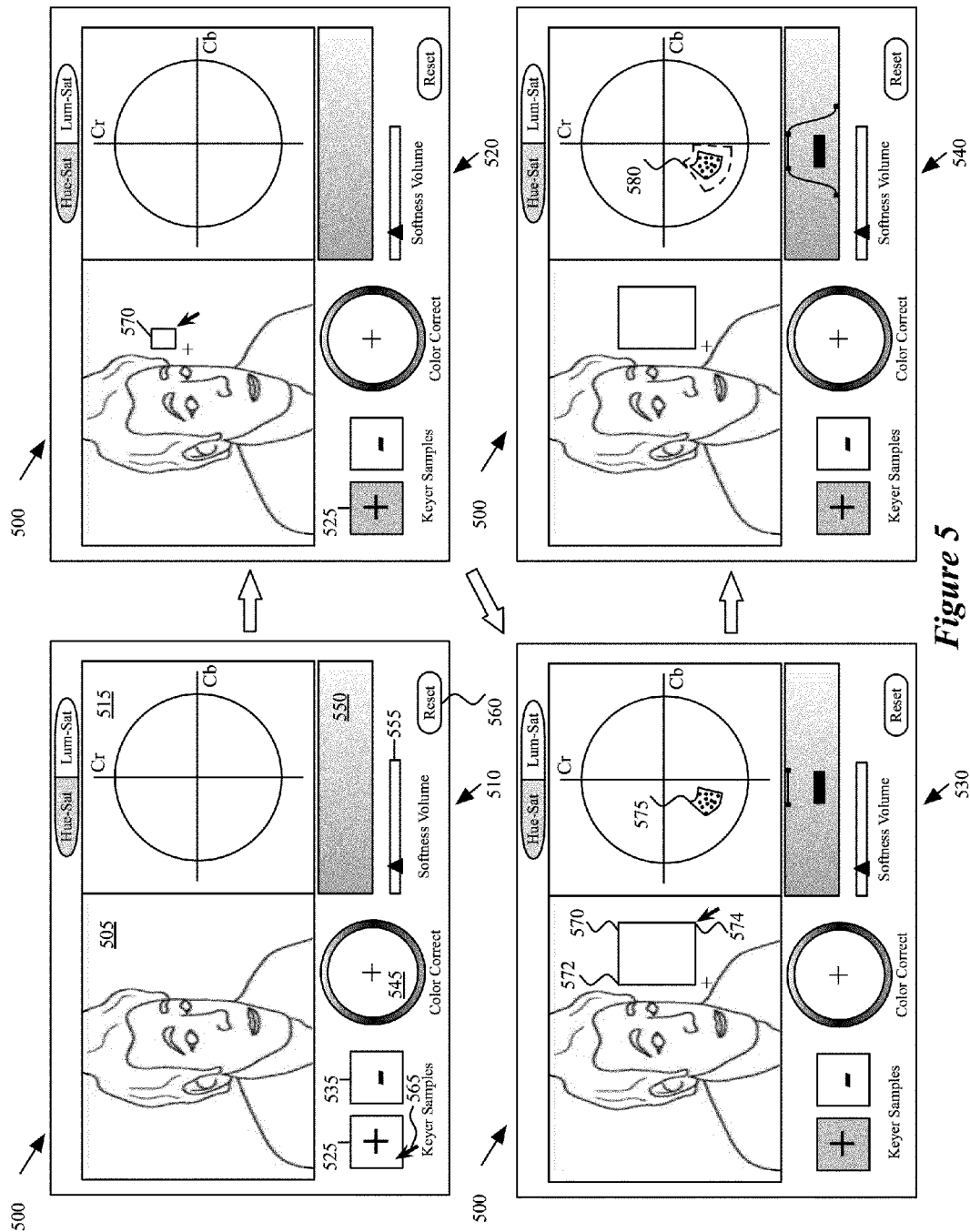
FIG. 5 illustrates the use of a user interface tool to sample an image and thereby generate a key and transition region in a graphical user interface (GUI) of a media-editing application of some embodiments.

FIG. 5 illustrates the use of a user interface tool to sample an image and thereby generate a key and transition region in a graphical user interface (GUI) 500 of a media-editing application of some embodiments. Specifically, FIG. 5 illustrates the GUI 500 in four stages: a first stage 510 at which a user selects the positive sampling tool, a second stage 520 at which the user is selecting a positive sample, a third stage 530 at which the positive sample is selected and a key has been generated, and a fourth stage 540 which shows the generation of a transition region based on the key.

The GUI 500 includes an image display area 505, a key display area 515, positive sample and negative sample UI items 525 and 535, color correction tools 545, a third dimension selection graph 550, a transition region size slider 555, and a reset button 560. The image display area 505 displays an image for the user to edit. The image may be a still image, a video picture (e.g., a frame or field), etc. In addition to displaying the image, the display area 505 also displays any sample regions of the image selected by the user.

The key display area 515 displays a two-dimensional plane in a color space. For example, the plane displayed in key display area 515 is the CbCr (chrominance) plane of the YCbCr color space. In some embodiments, the hue of a pixel is represented by its angular location in the plane, and the saturation of the pixel is represented by its radial distance (i.e., distance from the origin) in the plane.

When a user selects a sample region of an image displayed in the display area 505, some embodiments plot the pixel values of the pixels of the sample region in the two-dimensional plane displayed in key display area 515. Thus, in the example, the pixels in the sample region are plotted in the CbCr plane according to their Cb and Cr values. In some embodiments, the media-editing application performs a color space conversion (e.g., from RGB color space to YCbCr color space) in order to plot the pixel values, as the image information may be stored in a different color space than that used for keying. Some embodiments plot negative sample pixel values differently from positive sample pixel values in the key display area 515 (e.g., using different colors).

In addition to displaying a plot of sample pixels, the key display area displays the key and transition regions in the two-dimensional plane. The key is generated from the positive samples, and in some embodiments is the smallest shape having particular constraints (e.g., a circle, a wedge with arcs centered at the plane's origin, etc.) that encompasses all of the positive sample pixels.

The transition region is generated based on the key in some embodiments. In some embodiments, the transition region is the same shape as the key, but larger, sized based on a value from the transition region size slider 555. Furthermore, the transition region may be constrained by any negative sample pixel values. Some embodiments prevent the automatically generated transition region from including any of the negative sample pixel values.

The positive sample UI item 525 is a selectable item that enables a user to activate a sampling tool. In some embodiments, the user activates the sampling tool by selecting the UI item 525 (e.g., by moving a cursor over the UI item with a cursor controller and producing selection input such as tapping a touchpad or clicking a mouse button, by touching the UI item on a touchscreen, etc.). With the sampling tool activated through selection of UI item 525, the user can sample a portion of the image in order to generate a key for the image. In some embodiments, the user draws a shape over the image, the interior of which is the sampled portion of the image. Pixel values of the pixels in the sampled portion will all be contained within the key. Various methods may be used to draw the shape, as described below.

The negative sample UI item 535 is a selectable item that enables a user to activate a second sampling tool. In some embodiments, the second sampling tool is activated by a user in the same way as the first sampling tool (e.g., with a cursor controller, through a touchscreen, etc.). With the second sampling tool activated through UI item 535, the user can sample a portion of the image in order to constrain the transition region that is based on the key for the image. In some embodiments, the user draws a shape over the image, the interior of which is the sampled portion of the image. Pixel values of the pixels in the sampled portion will be excluded from the transition region. In some embodiments, positively sampled pixels take precedence over negatively sampled pixels, such that negatively sampled pixels whose pixel values fall within the key are ignored.

The positive and negative sample UI items 525 and 535 are illustrated in GUI 500 as selectable square boxes with "+" and "−" icons. However, one of ordinary skill in the art will recognize that various types of user interface items may be used for activation of the sampling tools. For instance, other graphics could be used for selectable items (e.g., circles, eyedropper graphics, etc.). In addition, the sampling tools may be activated in some embodiments through menus (e.g., drop-down menus), keystrokes, etc.

The color correction tools 545 are illustrated in the GUI 500 as a color wheel.

Some embodiments include a variety of color correction tools for editing the image displayed in image display area. For instance, in addition to a color wheel, some embodiments include sliders for adjustment of saturation, hue shift, etc. In some embodiments, the color correction (and the keying) is applied to previous and/or subsequent images in a video sequence of which the displayed image is a part. The edits made through the color correction tools are applied to all pixels whose pixel values fall within the key for the image (and are thus part of a selection). In addition, the edits are applied partially to pixels whose pixel values fall within the transition region (and are thus partially selected).

Some embodiments assign a value (called an alpha value in some embodiments) to each pixel in the image. Pixels that are fully selected have an alpha value of 1 and pixels that are not selected at all have an alpha value of 0. Pixels whose pixel values fall within the transition region have an alpha value between 0 and 1, depending on where in the transition region the pixel values fall. In some embodiments, the closer the pixel values are to the keyed area of the color space, the higher the alpha value. In some embodiments, the alpha value of a particular pixel indicates the extent to which edits (e.g., color correction edits) are applied to the particular pixel. Thus, a pixel with an alpha value of 0.75 would be affected three-fourths as much by an edit as a pixel with an alpha value of 1. In some embodiments, an edit affects the pixel values (e.g., the RGB values, YCbCr values, etc.) of a pixel, so this effect is damped for a pixel with an alpha value less than 1. If, for example, the edit multiplies the luma (Y) value of a selected pixel by 4, then the pixel with an alpha value of 0.75 would have its luma value multiplied only by 3.

The third dimension selection graph 550 displays a plot of the selection along the third dimension of the color space (i.e., the dimension not represented in the key display area 515). Thus, in the example of GUI 500, the horizontal axis of the graph 550 is the luma (Y) axis. The vertical axis of the graph 550 is the alpha value associated with that luma value. Some embodiments generate the three-dimensional key by propagating the two-dimensional key (e.g., in the CbCr plane) along the third dimension for the length of the key in that third dimension (which may be determined by the range of pixel values in the third dimension from the positive samples), thereby forming a prism in the shape of the two-dimensional key. The transition region in three dimensions may also be a larger prism, having a base the shape of the two-dimensional transition region.

The transition region size slider 555 modifies the size of the transition region of the color space relative to the keyed region. As a user moves the slider to the left (e.g., by dragging the slider with a cursor controller or through a touchscreen, etc.), the transition region grows smaller. Correspondingly, moving the slider to the right causes the transition region to grow larger. In some embodiments, the transition region is initially generated based on a value from the slider 555 and can be modified after its initial generation through user movement of the slider.

The reset button 560, present in the GUI of some embodiments, enables a user to remove all positive and negative samples and start the sampling process over. In some embodiments, the reset button also removes any color correction or other edits applied to the image. Other embodiments, however, include a separate reset button for removing edits to the image.

The operation of the GUI 500 to generate a key and transition region for the image in display area 505 based on a sample selected by a user will now be described. As shown in stage 510, a user has placed a cursor 565 over the positive sample UI item 525. In stage 520, the positive sampling tool is activated, as indicated by the highlighting of the UI item 525. To select the UI item 525, the user may have clicked a mouse button, tapped a touchpad, etc., with the cursor 560 located over the UI item.

In addition, stage 520 illustrates that the user has started to draw a shape 570 to define a sample of the image. In the example shown, the shape is drawn as a rectangle. The user places the cursor at a point in the image and holds down a cursor controller button (e.g., a mouse button). The point at which the user initially presses down the cursor controller button is one corner of the rectangle. With the cursor controller button held down, the user moves the cursor and then releases the cursor controller button. The point at which the cursor is located when the cursor controller button is released is the opposite corner of the rectangle. In some embodiments, the user draws a freeform shape, a circle, etc. to define the sample. Rather than drawing the shape with a cursor controller, in some embodiments the user draws the shape using a touchscreen.

Stage 520 illustrates the beginning of the drawing of the sample shape 570. In stage 530, the user has finished drawing the sample shape by moving the cursor from point 572 to point 574. At this stage, the pixel values of the pixels in the sample are plotted in the key display area 515 and a key 575 is generated based on the sample. In addition to the key 575 generated in the two-dimensional plane, a range in the third dimension of the sample pixel values is displayed in the graph 550, and an alpha value of 1 is plotted for this range.

To generate the key, some embodiments identify the smallest wedge-shape in the CbCr plane that will encompass all of the pixel values in all positive samples. The angular range in the plane is identified for the sample pixels—this is the angular range of the wedge. In the illustrated example, the pixel values are concentrated in a portion of the CbCr plane that corresponds to green pixels, as the image shown in display area 505 is a greenscreen image. The inner arc of the wedge will correspond to the pixel value closest to the origin and the outer arc will be at the distance of the pixel value furthest from the origin. In general, the saturation levels of a greenscreen (or bluescreen) will be fairly high, and thus the pixel values are concentrated away from the center in the example. The key is then formed from the inner and outer arcs and the bounding radial lines (lines running such that they would intersect the center of the plane), as shown.

The above describes the case when two lines intersecting the center can be drawn for the wedge so as to include all of the pixel values in the key. However, in some cases (e.g., when the pixel values encompass the center) this may not be the case. In such a case, some embodiments use a point rather than an inner arc, and attempt to find the smallest area key that is bordered by (i) an arc centered about the center of the plane, (ii) a single point on the other side of the plane's origin from the arc, and (iii) two straight lines connecting the arc to the single point.

The examples (and the above description) illustrate the case in which the generated key is a wedge formed either from two arcs or an arc and a point. Other embodiments may use other shapes for the key in the two-dimensional plane. For instance, some embodiments will find the circle, square, equilateral triangle, diamond, etc. with the smallest area that encompasses all of the pixel values in the plane. Some embodiments always use a wedge with a point in the center of a plane. Yet other embodiments find the smallest shape of any sort (i.e., freeform shape) that can encompass all of the sampled pixel values.

Stage 540 illustrates the GUI 500 after a transition region 580 has been automatically generated based on the key, and displayed in key display area 515. The size of transition region 580 is determined by the transition region size slider 555. If the slider 555 is set further to the left, the transition region 580 will be smaller. Similarly, if the slider 525 is set further to the right, the transition region 580 will be larger. The details of how such a transition region is generated from a key according to some embodiments are also described in detail below. In addition to the two-dimensional shape of the transition region in the plane shown in key display area 515, the range of the transition region in the third dimension is also displayed in the graph 550. Endpoints of the transition region in the third dimension are determined based on the transition region size slider 555, and the graph displays the drop-off in alpha values from 1 (at the edge of the key) to 0 (at the edge of the slider). As will be described in further detail below, the manner in which the alpha values drop within the transition region can be modified in some embodiments.

While the operation of the GUI 500 during the drawing of a shape in the GUI is shown in four distinct stages, some embodiments present all of the information in real time. That is, as the user moves the cursor to draw the sample rectangle over the image, the pixel values are plotted and the key and transition regions are displayed all at the same time. As more pixels are contained within the drawn sample shape, more pixel values are plotted, and the size and shape of the key and transition region correspondingly change.

Figure 6:
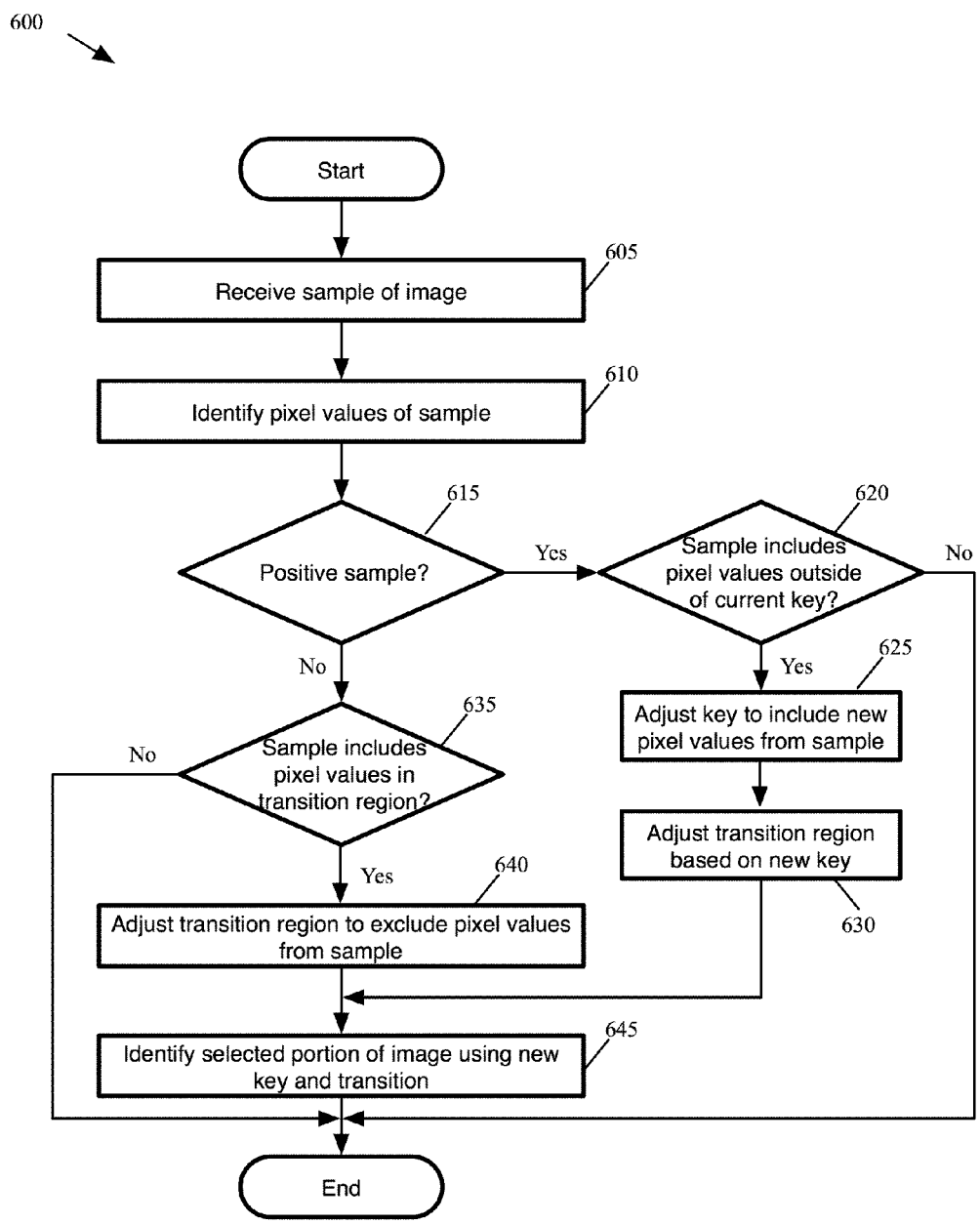
FIG. 6 conceptually illustrates a process of some embodiments performed by the media-editing application to generate or modify a key and transition region based on a new sample.

The above description of FIG. 5 introduced many of the GUI features present in the media-editing application of some embodiments and described the operation of the GUI when an initial positive sample of an image is selected by a user. FIG. 6 conceptually illustrates a process 600 of some embodiments performed by the media-editing application to generate or modify a key and transition region based on a new sample. The media-editing application of some embodiments performs process 600 or a similar process each time a user selects a new set of sample pixels for an image.

As shown, the process 600 begins by receiving (at 605) a sample of an image. The sample could be a positive sample (i.e., for defining a key for the image) or a negative sample (i.e., for constraining a transition region generated from the key). As described, the sample may be received through a user interface when a user selects a sampling tool and draws a shape of the sample over a display of the image (e.g., through a touchscreen display, with a cursor controller, etc.). The interior of the drawn shape includes a set of pixels that make up the sample.

Upon receiving the sample, the process 600 identifies (at 610) pixel values of the sampled pixels. In some embodiments, the pixel values are the pixels' coordinates in a color space. For instance, the pixel values could be a triplet (R, G, B) in the RGB color space, where each of the three values runs from 0 to 255. Similarly, the pixel values could be a triplet (Y, Cb, Cr) in the YCbCr (or Y'CbCr or YUV) color space, or a triplet (H, S, L) in the HSL color space. In some embodiments, the process receives the sample pixel values in a first color space (e.g., RGB) and converts the pixels into a second color space (e.g., YCbCr) for generating the key. In some embodiments, it may be easier or more intuitive to generate the key in the second color space (i.e., separating out the chroma components from the luma components) while the image stores its pixel values in the first color space. As such, the media-editing application performs the conversion when the pixels are selected.

Next, the process determines (at 615) whether the sample is a positive sample (i.e., a sample for defining the key) rather than a negative sample (i.e., a sample for constraining the transition region). When the sample is a positive sample, the process determines (at 620) whether the sample includes any pixel values outside of the current key. If the received sample is the first, and there is no key yet, then the sample will include such new pixel values. However, when there is already a key generated for the image, it is possible that all of the pixel values fall within that key. In this case, the key need not be modified (and therefore the transition region need not be modified) on account of the new sample, and the process ends.

Figure 7:
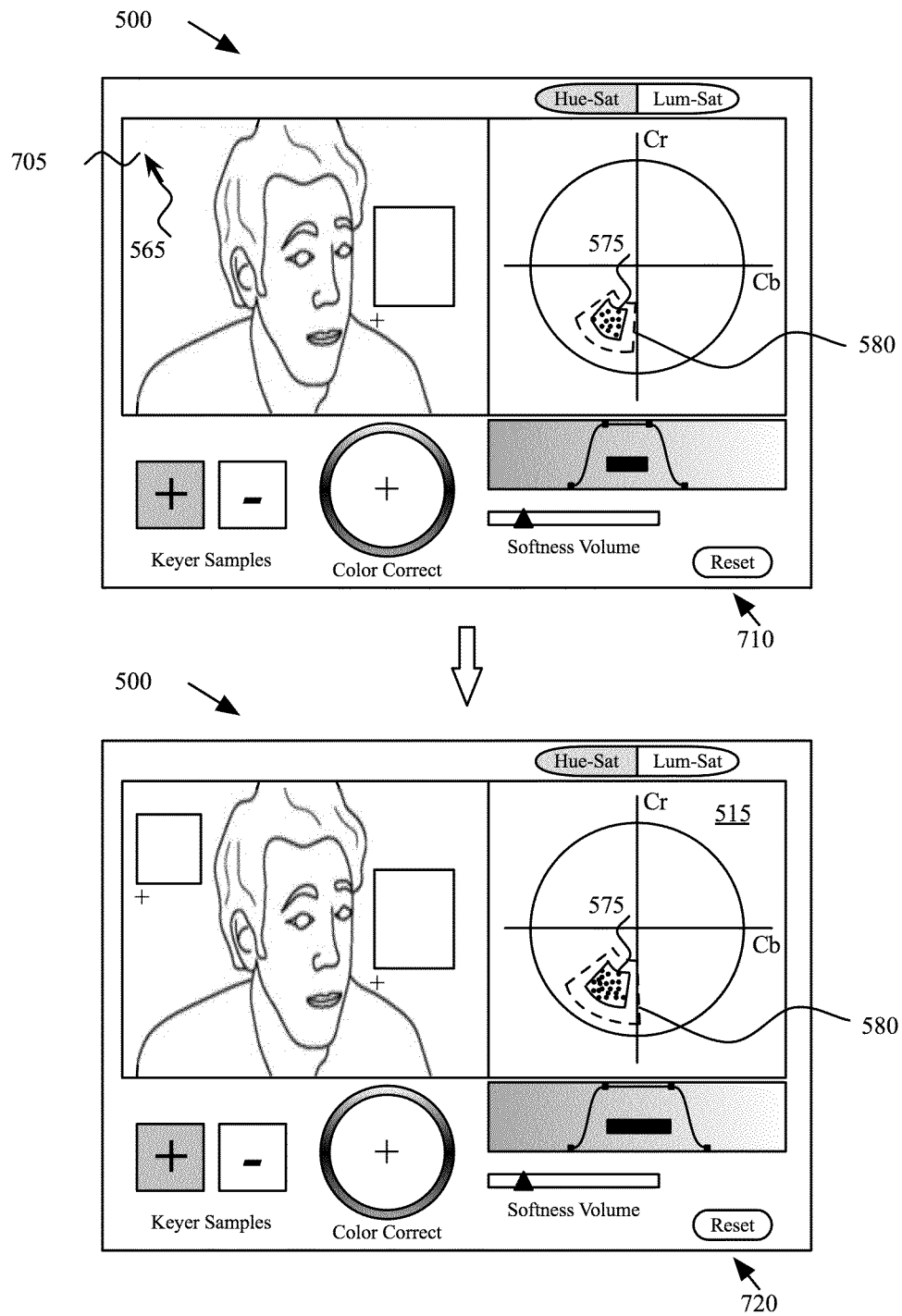
FIG. 7 illustrates the selection of a second positive sample region in the GUI of FIG. 5 and the subsequent adjustment of the key.

When the sample includes pixel values that fall outside of the current key (or if there is no key yet), however, the process adjusts (at 625) the key to include the new pixel values from the currently received sample. FIG. 7 illustrates the selection of a second positive sample region in the GUI 500 and the subsequent adjustment of the key. Specifically, FIG. 7 illustrates the GUI in two stages: a first stage 710 before the second sample is selected and a second stage 720 after the second sample is selected.

As shown, at stage 710, the cursor 565 is placed at a location 705 in the image display area 505. At this point, the positive sample UI item 525 is highlighted, indicating that the positive sampling tool is activated. The key 575 and the transition region 580 are presently based on the first sample as shown in FIG. 5. At stage 720, the user has drawn a new shape to select a second positive sample. As a result of this new positive sample, additional pixel values are plotted in the plane in the key display area 515. One may note that the number of points plotted in the CbCr plane may be smaller than the number of pixels selected. In some embodiments, the media-editing application is able to recognize duplicate pixel values and discard them. In addition, the pixel values may be duplicates as far as their values in the two-dimensions of the plane (e.g., Cb and Cr) but may have different values in the third dimension (e.g., different luma values). These pixel values are not discarded for the purpose of generating the overall key, but will show up as one plotted point in the key display area 515.

As a result of the new sample, the key 575 has been adjusted and is now larger. In addition, the range of the key in the third dimension has increased, as shown in the graph 550. Upon receiving the new positive sample and determining that at least one of the pixel values from the new sample is outside of the current key, the media-editing application identifies new radial and angular bounds for the total sample in the plane, and generates a new key as described above. Some embodiments, rather than determining whether any new sample pixel values are outside the current key, simply regenerated the key. As shown, some embodiments group all of the positive samples together and treat them as one sample. That is, the media-editing application bins together all of the positive samples. On the other hand, as will be described below, some embodiments bin each negative sample separately.

In some embodiments, even if the new pixel values are all within the key in the two-dimensional plane, some of the new pixel values may be outside the third dimension range (e.g., higher or lower luma values than pixels in the previous samples). In such a case, the shape of the key in the two-dimensional plane will not change, but the key will nevertheless be adjusted in the third dimension to account for the new pixel values.

Returning to process 600, the process adjusts (at 630) the transition region based on the newly adjusted key. When the size of the key increases or changes shape, some embodiments modify the transition region accordingly. In stage 720 of FIG. 7, the transition region 580 has also increased in size to account for the larger key 575. As mentioned above, the process for generating a transition region from a key region is described in further detail below. The process then advances to operation 645, described below.

The operations 620-630 are performed when the received sample is a positive sample. On the other hand, when the sample is a negative sample (i.e., a sample for constraining the transition region), the process determines (at 635) whether the sample includes any pixel values in the current transition region. In some cases, a user will select a negative sample that does not include any samples within the transition region. In this case, the process ends. The negative sample could still affect the transition region 580 if the user increases the size of the transition region with the transition region size slider 555 at a later time.

When the negative sample includes a pixel value inside the transition region, the process adjusts (at 640) the transition region to exclude the pixel values from the sample. This may involve moving the inner or outer arc closer to the corresponding arc of the key, shortening the angular spread of the transition area on one or both sides of the key, or shortening the range of the transition region in the third dimension. In some embodiments, the media-editing application attempts to modify the transition region in the third dimension of the color space (e.g., luma) first, before modifying the region in the plane. If the range of the transition region in the third dimension can be shortened such that the negative sample pixel values are all outside the key despite overlapping in the two-dimensional plane, then the transition region in the plane is not modified in some embodiments. As an example, if a negatively sampled pixel has pixel values (Y, Cb, Cr)=(200, 45, 38) and the transition region runs from Y=75 to Y=115, then the transition region in the CbCr plane need not be modified on account of the negative sample pixel even if the transition shape in the CbCr plane includes the coordinates (45, 38). Other embodiments, however, always address the two-dimensional plane first, and would modify the transition region in the example.

Figure 8:
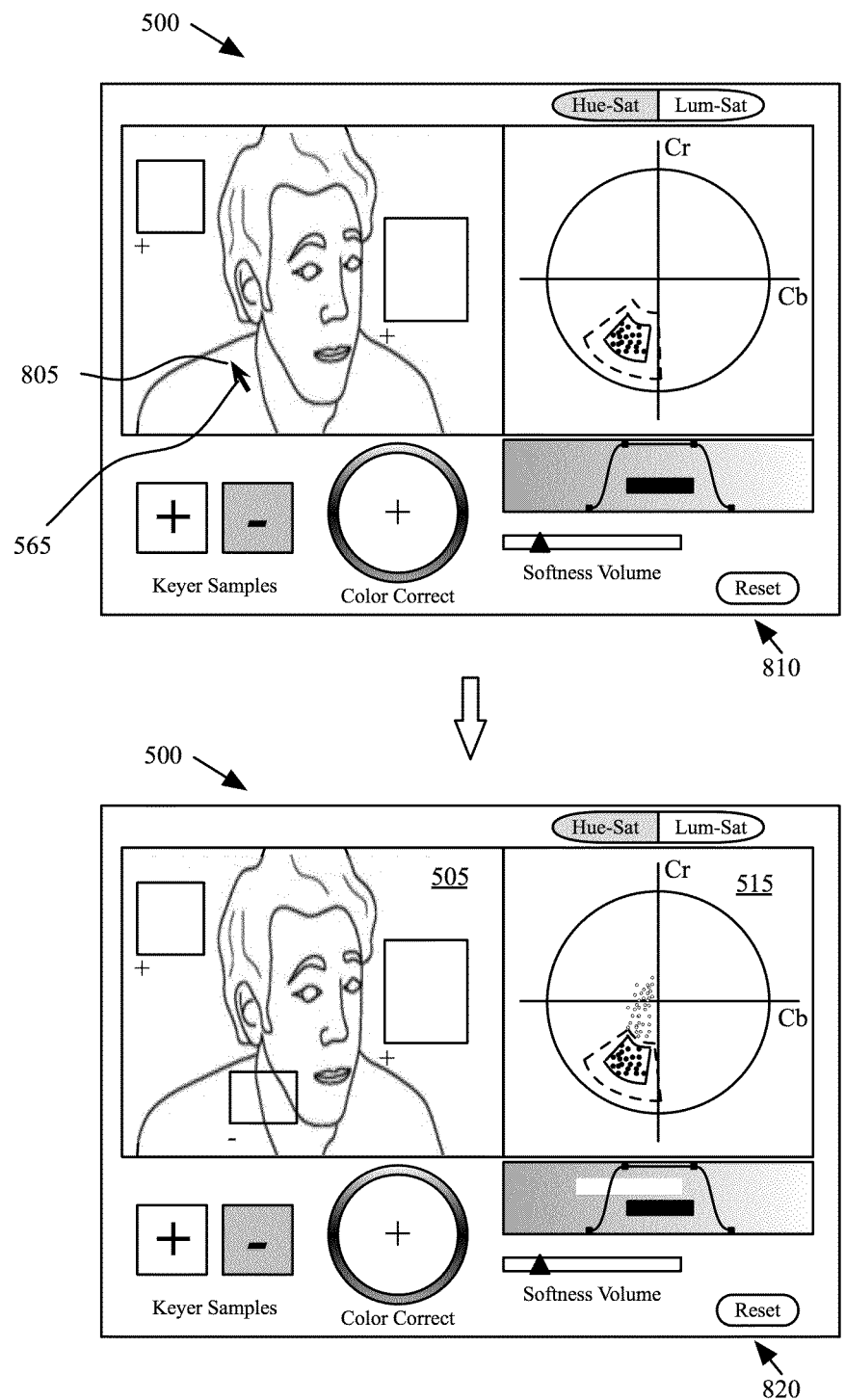
FIG. 8 illustrates an example of using a negative sample to modify the transition region in the GUI of FIG. 5.

FIG. 8 illustrates an example of using a negative sample to modify the transition region in the GUI 500. Specifically, FIG. 8 illustrates the GUI 500 at two stages: a first stage 810 before the negative sample is selected and a second stage 820 after the negative sample is selected.

As shown, at stage 810, the cursor 565 is placed at a location 805. The At this point, the negative sample UI item 535 is highlighted, indicating that the negative sampling tool is activated. The key 575 and transition region 580 are presently based on the two positive samples as shown in FIG. 7. At stage 820, the user has drawn a shape to select a negative sample. As a result of this new negative sample, new pixel values are plotted in the plane in the key display area 515. As shown, some embodiments differentiate the positive sample pixels from the negative sample pixels (e.g., with different colors). In some embodiments, the shapes drawn over the image in image display area 505 are also different colors. As in the examples, some embodiments also display a "+" and a "−" next to the boxes to further differentiate the positive samples from the negative samples.

As a result of the sample, the transition region has been adjusted and is now smaller. Specifically, the inner arc of the transition region is closer to the key area. The details of the generation of the transition region will be described in further detail by reference to FIG. 11. In addition, the values of the negative sample in the third dimension are plotted in the graph 550. As shown, the luma values of the sample run throughout most of the transition and key range along the luma axis. However, as these pixel values are outside the transition region in the chroma plane, they are not within the transition volume.

Once any necessary adjustments to the key and transition region are made, the process identifies (at 645) a selected portion of the image using the new key and transition. The process then ends In some embodiments, each pixel is assigned an alpha value as described above. Any pixel whose pixel values fall within the keyed region of the color space have an alpha value of 1 (fully selected). Pixels whose pixel values fall within the transition region of the color space have an alpha value between 0 and 1, depending on the proximity in the color space to the keyed region. Any pixels whose pixel values fall outside the color space have an alpha value of 0 (not selected at all).

Figure 9:
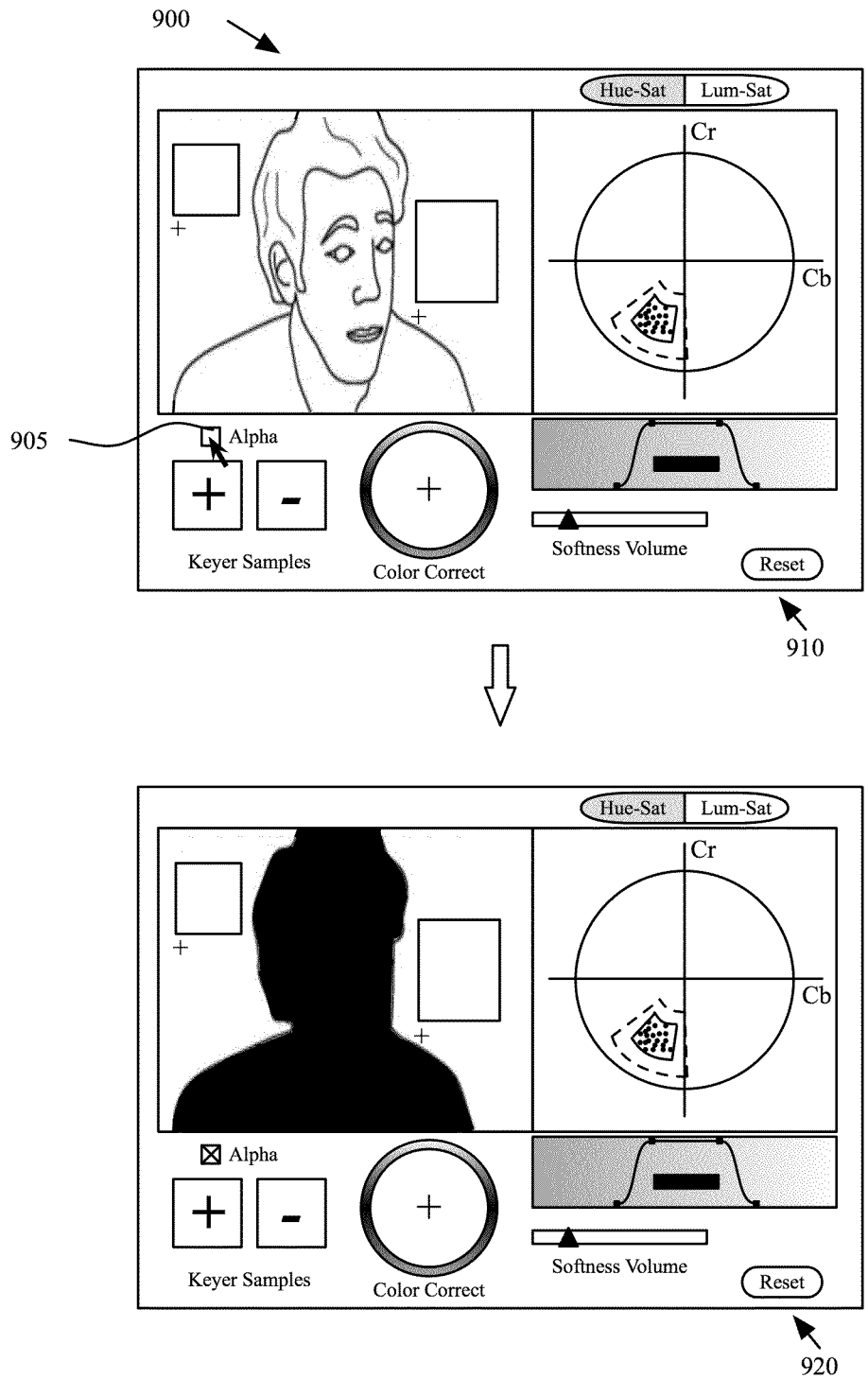
FIG. 9 illustrates an alpha view of the GUI of some embodiments that displays the selected and unselected portions of an image based on a key.

FIG. 9 illustrates an alpha view of the GUI of some embodiments that displays the selected and unselected portions of an image based on a key. Specifically, FIG. 9 illustrates a GUI 900 that includes all of the features of the GUI 500, as well as an image alpha view selectable item 905. This GUI is illustrated before and after the selection of the item 905 in stages 910 and 920, and includes an image display area 905 as well as the other features corresponding to those of GUI 500. As shown, in the first stage 910, a user has placed a cursor over the image alpha view selectable item 905.

The second stage 920 illustrates the result of the user selecting this item 905. The selectable item may be a checkbox as shown, a drop-down menu item, or any other user interface construct, and may be accessed via a hotkey in some embodiments. When the image alpha item is selected, a grayscale version of the image is displayed in some embodiments. Pixels assigned an alpha value of 0 are displayed in black and pixels assigned an alpha value of 1 are displayed in white. Pixels with alpha values between 0 and 1 are displayed in shades of gray—the higher the alpha value, the lighter the gray. As shown in stage 920, most of the pixels of the image have either an alpha value of 0 (for the portrait of the man) or an alpha value of 1 (the selected greenscreen background). Around the man's portrait is a sort of border of transition alpha values, which often come about as the result of a halo effect present in greenscreen and bluescreen film and photography.

Figure 10:
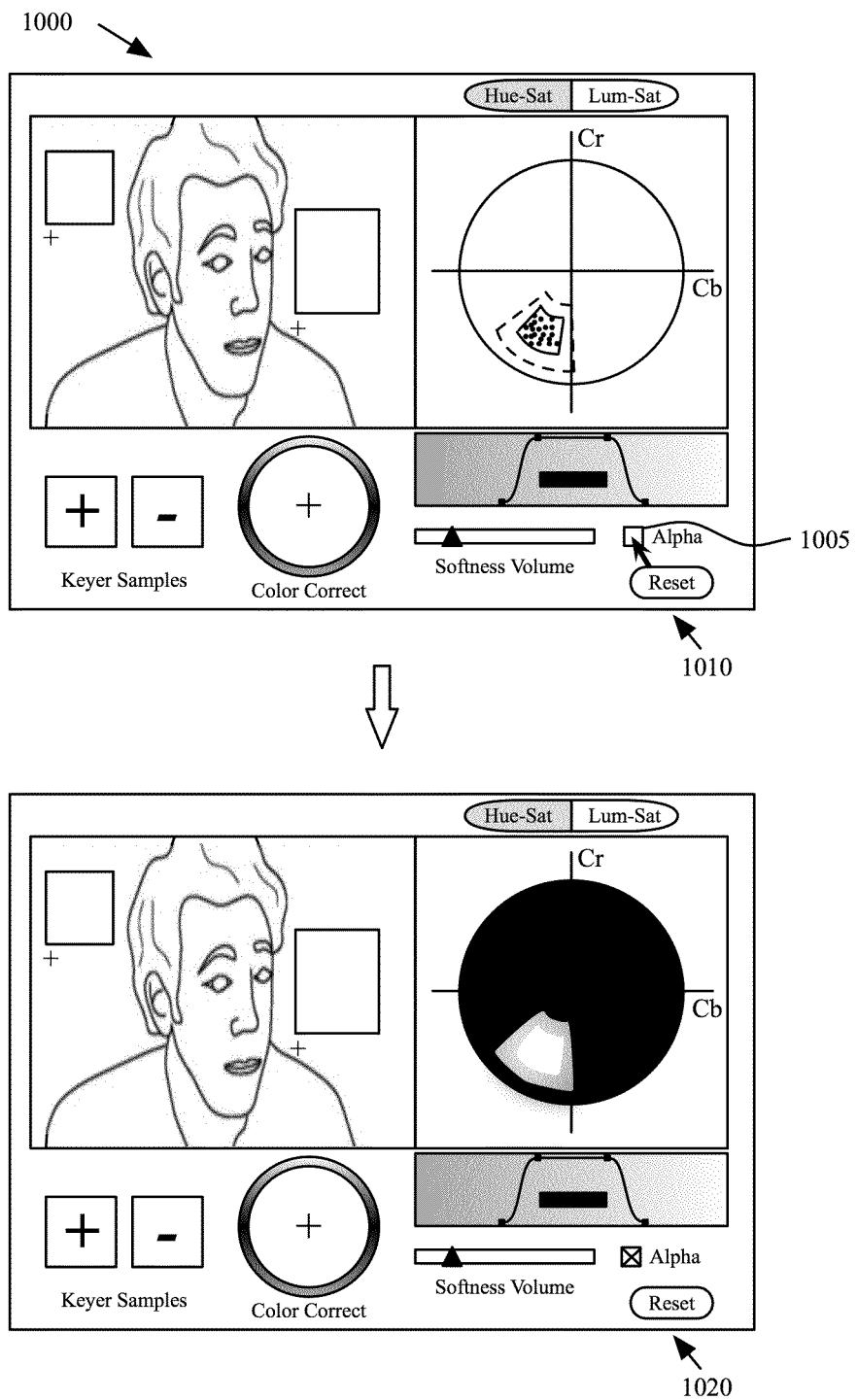
FIG. 10 illustrates a key alpha view that illustrates regions of the two-dimensional plane that are associated with different alpha values.

Some embodiments provide a key alpha view, instead of or in conjunction with the image alpha view. The key alpha view illustrates regions of the two-dimensional plane that are associated with the different alpha values. FIG. 10 illustrates such a key alpha view, through two stages of a GUI 1000: a first stage 1010 before a key alpha view selectable item 1005 is selected, and a second stage 1020 after the item is selected. The GUI 1000 includes the same features as GUI 500, as well as the key alpha view selectable item 1005. As shown, in the first stage 1010, a user has placed a cursor over the key alpha view selectable item 1005.

The second stage 1020 illustrates the result of the user selecting this key alpha view item 1005 The selectable item may be a checkbox as shown, a drop-down menu item, or any other user interface construct, and may be accessed via a hotkey in some embodiments. When the key alpha item is selected, a grayscale version of the color space plane is displayed in some embodiments. Pixel values inside the key are displayed as white, because pixels with these pixel values will be assigned alpha values of 1. Similarly pixel values outside the transition region are displayed as black, because pixels with these pixel values will be assigned alpha values of 0. In the transition region, the pixel values transition from very light gray on the inside to dark gray on the outside. In some embodiments, whether a pixel is part of the transition region is determined based on its three-dimensional pixel values, but its alpha value is only determined by its two-dimensional (e.g., chroma) values. On the other hand, in some embodiments, the alpha transitions in three dimensions, such that two pixels with the same chroma values but different luma values will have different alpha values, even if both are inside the transition region.

B. Generation of Transition Region from Keyed Region

Figure 11:
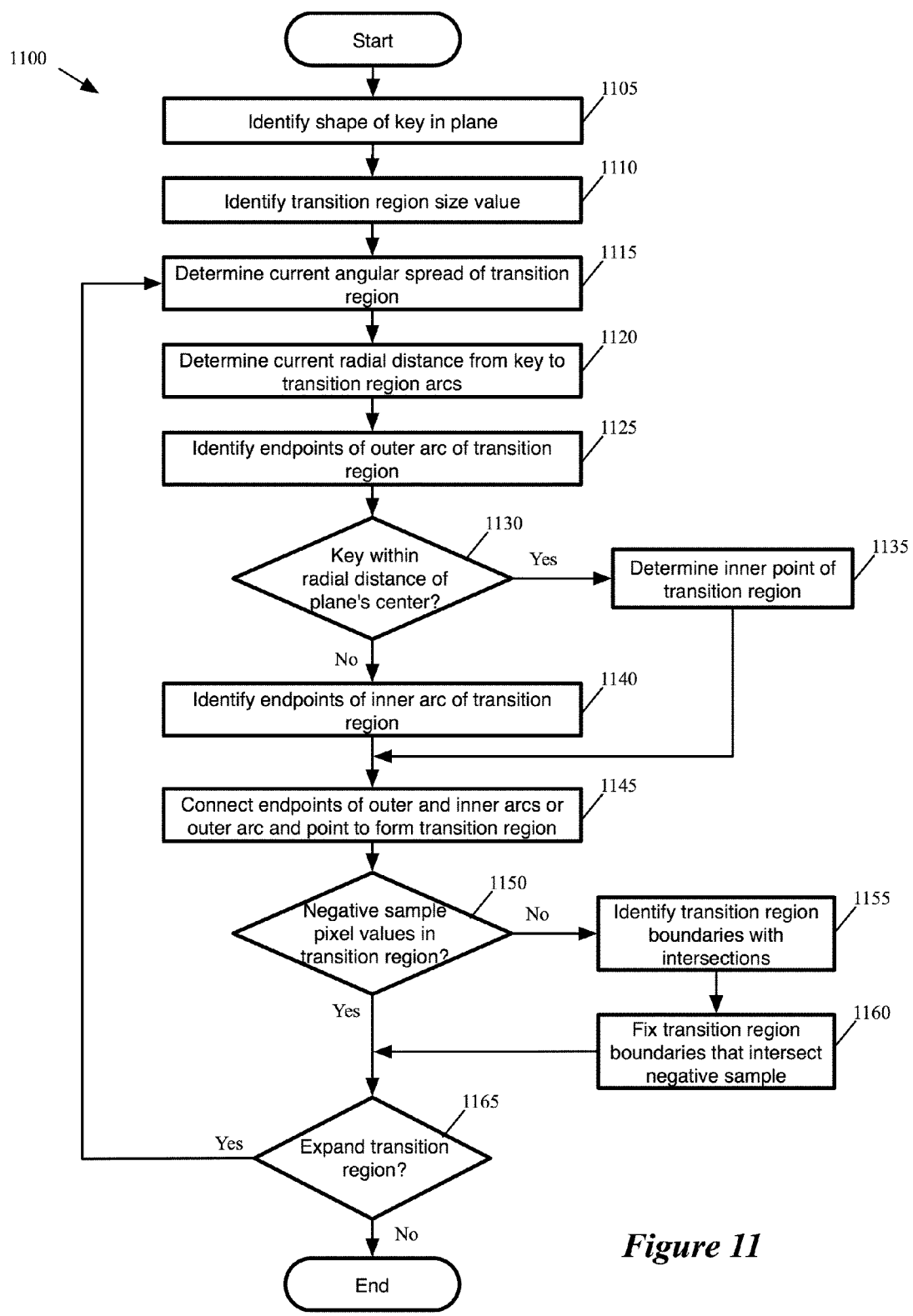
FIG. 11 conceptually illustrates a process 1100 of some embodiments for generating the transition region based on a wedge-shaped key.

As described above, some embodiments generate a key for an image as a particular shape in a two-dimensional plane of color space (e.g., the CbCr plane) based on one or more samples of pixel values from the image. From this shape, some embodiments also generate a transition region in the color plane. FIG. 11 conceptually illustrates a process 1100 of some embodiments for generating the transition region based on a wedge-shaped key. This process deals with the generation of the two-dimensional shape that is propagated along the third dimension in order to form the keyed region of the three-dimensional color space. The process 1100 is described by reference to FIG. 12, which illustrates the generation of a transition region from a key in four stages 1210-1240.

Figure 12:
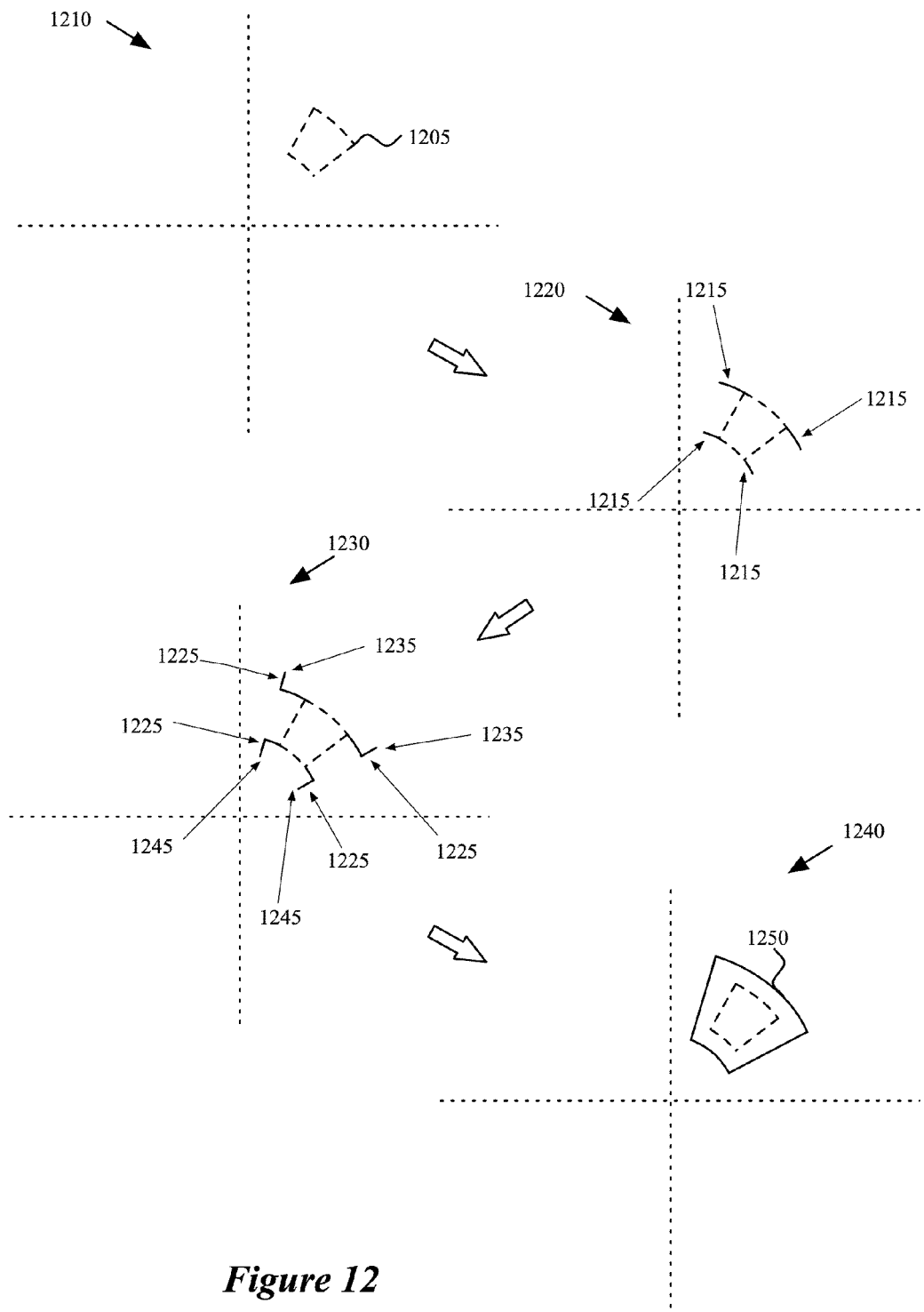
FIG. 12 illustrates the generation of a transition region from a key.

As shown, the process 1100 begins by identifying (at 1105) the shape of the key in the two-dimensional plane. As described, this shape may be generated based on the pixel values (i.e., Cb and Cr values) of a sampled portion of the image for which the key and transition region are generated. In some embodiments, the shape is a wedge. When possible to do so while encompassing all of the positive sample pixel values, the wedge has a radial range in the plane (from an inner arc to an outer arc) and an angular range (between two straight lines connecting the arcs. In some cases (e.g., when the sample includes pixel values on opposite sides of the plane close to the center), no such wedge can be constructed, and the media-editing application generates the smallest wedge that encompasses all of the pixel values formed by connecting an arc about the center of the plane to a single point using two straight line segments. Stage 1210 of FIG. 12 illustrates an example of a key 1205, shown as a dotted line in a two-dimensional plane.

The process 1100 then identifies (at 1110) a transition region size value. This size value determines how large the transition region will be in comparison to the key shape. In some embodiments, this value is determined from a setting of a slider (or other user-modifiable UI construct) such as the transition region size slider 555 of user interface 500. In some embodiments, the process 1100 is a recursive process that initially generates a small transition region that is not much larger than the key. This transition region is tested for intersection with negative samples (as described below) and then, if possible, increased incrementally until a size determined by the transition region size value is reached.

Next, the process 1100 determines (at 1115) a current angular spread of the transition region. The first time through operation 1115, this will be a small angle, and will gradually increase unless a negative sample is intersected or a maximum angle determined by the size value is reached. Stage 1220 of FIG. 12 illustrates an angular distance extended out from the key on either side as solid lines 1215. As shown, in some embodiments, this distance is the same on either side of the key. The example shown in FIG. 12 illustrates what could be a final transition region or an intermediately generated transition region.

The process then determines (at 1120) a radial distance from the key to the transition region arcs based on the size value. Stage 1230 of FIG. 12 illustrates the radial distance extended out from the arcs drawn at stage 1220 on either side of the key as solid lines 1225. The endpoints of these lines form the "corners" of the transition region. As noted, this could be a final transition region or an intermediately generated transition region.

The process 1100 then identifies (at 1125) the endpoints of the outer arc of the transition region. These are points 1235 in stage 1230. The process also determines (at 1130) whether the inner arc of the key is within the identified radial distance of the plane's center. That is, the process determines whether a line from the center of the plane to the inner arc of the key is smaller than the identified radial distance.

Figure 13:
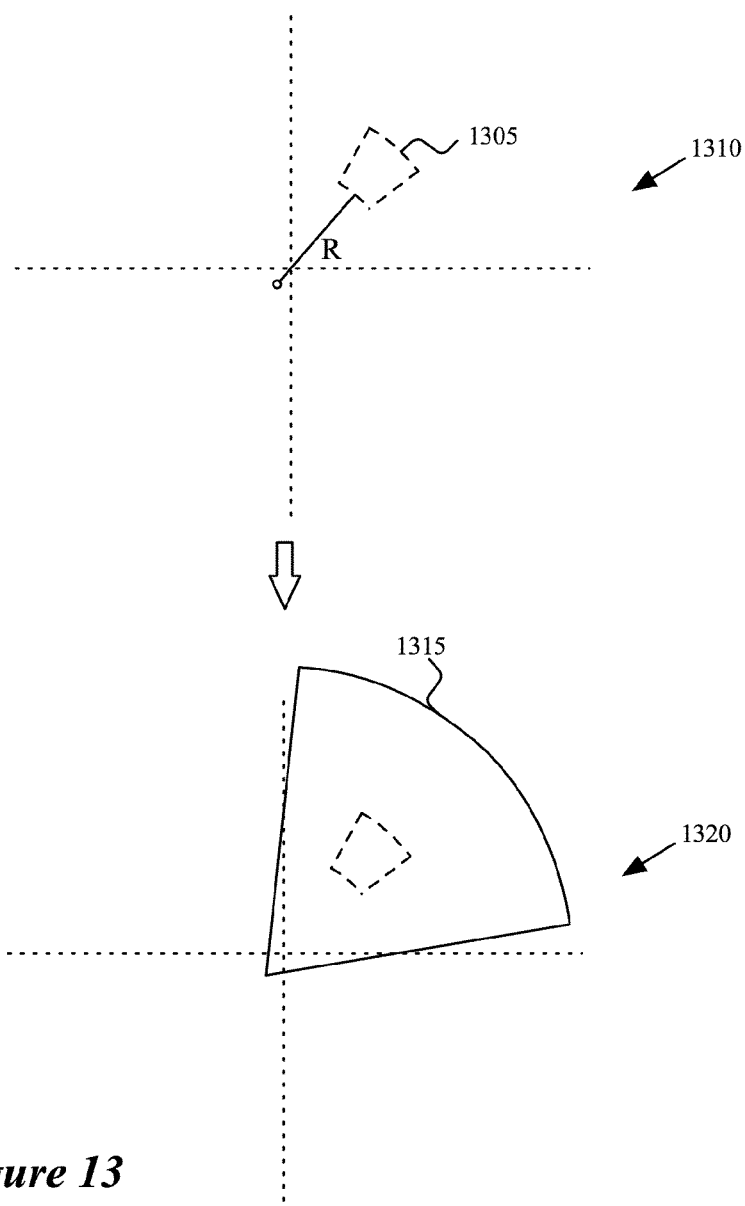
FIG. 13 illustrates the generation of a transition region from a key when the transition region encompasses the center of a plane.

When this is the case the inner arc of the transition region will be on the opposite side of the plane's center from the outer arc, and a point will have to be used rather than an arc. Thus, the process determines (at 1135) an inner point for the transition region. To identify the location for the point, some embodiments use a line, of the identified radial distance, from the center of the inner arc through the center of the plane. FIG. 13 illustrates such a line and the resultant inner point 1305 for a radial distance R at a first stage 1310, using the key 1205 with a different transition region size value. One of ordinary skill will recognize that when the key region has a point rather than an inner arc, the transition region will also have an inner point rather than an arc if generated according to the illustrated process, regardless of the transition region size value.

On the other hand, when the identified radial distance is less than the distance from the inner arc of the key to the plane's center, the process identifies (at 1140) the endpoints of the inner arc of the transition region. These are points 1245 in stage 1230 of FIG. 12.

With the relevant points determined, the process connects (at 1145) the endpoints of the outer arc with the inner arc endpoints or single point in order to form the transition region. For the case in which an inner arc is used, stage 1240 of FIG. 12 illustrates the transition region 1250. For the other case, in which a single point is used in place of the inner arc because the transition region encompasses the center of the plane, stage 1320 of FIG. 13 illustrates the transition region 1315. These two transition regions may be generated for the same key region as a result of different transition region size values.

The process then determines (at 1150) whether there are any negative sample pixels in the transition region. When there are no negative samples at all, then there will be nothing to constrain the transition region and the transition region can be expanded up to a point determined by the identified transition region size value. However, when the user has selected portions of the image as negative samples, these may constrain the transition region and thus the process determines whether this is the case. In some embodiments, this determination is made by examining the color space coordinates of each negatively sampled pixel. However, this is a fairly processing-intensive technique, especially when there are many negative sample pixels, so other techniques may be used.

Figure 14:
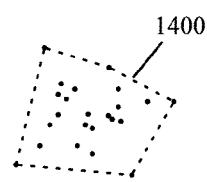
FIG. 14 illustrates an example of a convex cell for a group of points.

For instance, some embodiments test each of the lines (i.e., the three or four lines of the wedge) that make up the current transition region to determine whether these lines intersect with any of the negative sample regions. In some embodiments, a convex cell is generated for each negative transition region, and a line-intersection identification process is performed to determine whether any of the lines making up the transition region intersect with the convex cell. A convex cell for a group of points can be thought of as the shape that would be formed if the points were all nails and a rubber band was stretched around the nails. FIG. 14 illustrates an example of such a convex cell 1400 for a group of points. The interior points are ignored, and only the exterior points are used to form the convex cell. When two or more different negative samples are selected, some embodiments treat these samples separately. Thus, two negative samples with pixel values on opposite sides of the CbCr plane will not create a single massive convex cell that greatly constrains the transition region. Instead, convex cells are generated for each sample and tested separately for intersection with the transition region boundary.

When there are no negative sample pixel values in the transition region, the process proceeds to 1165, described below. When there are negative sample pixel values in the transition region, however, the process identifies (at 1155) the transition region boundaries (i.e., the arcs and lines connecting the arcs or arc and point) that intersect with a negative sample convex cell. It should be noted that, as mentioned above, some embodiments first determine whether any negative sample pixel values can be accounted for by shortening the range of the transition region in the third dimension. However, when the third dimension values of the negative sample are equal to or close to the third dimension range of the key, then shortening the range of the transition region in this dimension will not alleviate the issue. Accordingly, the shape in the two-dimensional plane is modified instead.

The process fixes (at 1160) any of the boundaries that intersect one or more of the negative samples. These fixed boundaries will not increase in distance from the key the next iteration through the process 1100. The process then determines (at 1165) whether to continue expanding the transition region. If all boundaries have been fixed, or if the maximum size of the unfixed boundaries has been reached, then the process ends. Otherwise, the process returns to 1115 to determine an incrementally larger angular spread and radial distance for any unfixed boundaries.

The maximum size of the transition region is determined from the transition region size value. In some embodiments, the size value determines a particular number of radians on either side of the key region for the transition region. In other embodiments, the angular spread on either side of the key region is a percentage of the angular spread of the key region. For instance, the size value might specify 0.2 radians or 5 percent of the angular spread of the key. Much like the angular distance for the transition region, the radial distance may be either a percentage of the radial spread of the key or a set distance based on the size value.

One of ordinary skill will recognize that the process 1100 conceptually illustrated in FIG. 11 is only one possible process for generating the transition region, and that many such different processes are possible. For instance, some of the operations may be performed in a different order (e.g., the determination of the angular spread and the radial distance). In addition, some embodiments may generate a transition region at full size initially, then shrink the transition region if there are any negative sample pixel values inside the volume. Furthermore, some embodiments use different shapes (e.g., circles, polygons, etc.) in the two-dimensional plane for the key, and thus must use different processes to determine a transition region.

C. Post-Generation Modification of Key and Transition

In some embodiments, once a key and transition are generated from one or more samples, a user may wish to adjust the key and/or transition in order to produce a more desirable selection of a portion of the image. Some embodiments allow the user to modify one or both of the volumes directly via the shapes in the two-dimensional plane and/or the third dimension graph, as described in detail below. Alternatively, or conjunctively, some embodiments allow for various other modifications—moving or modifying the sample shapes, or modifying the transition region size value (e.g., via a slider such as slider 555).

Figure 15:
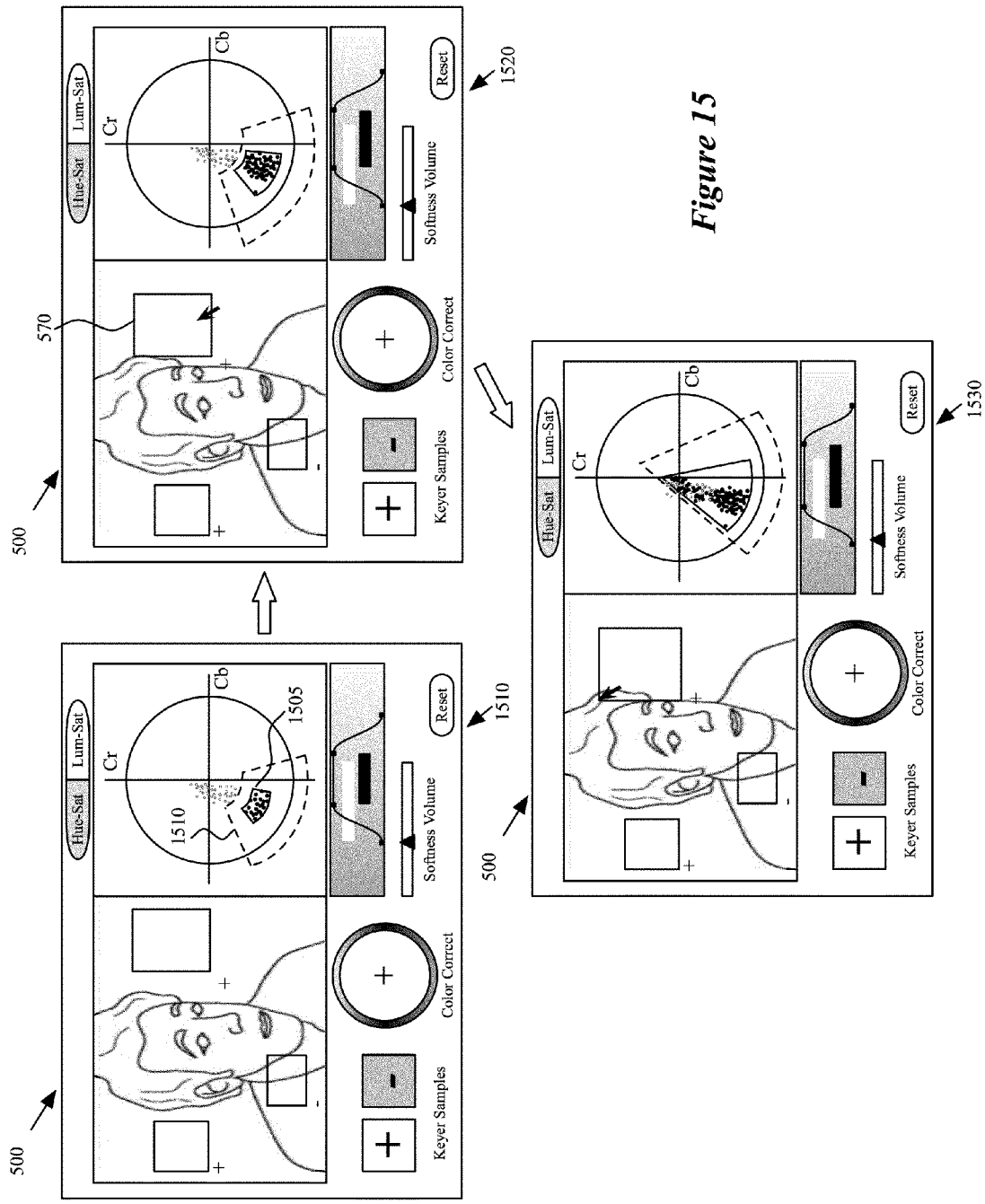
FIG. 15 illustrates the modification of the key, and along with it the transition region, via modification of one of the positive sample boxes already drawn in the image display area.

FIG. 15 illustrates the modification of the key, and along with it the transition region, via modification of one of the positive sample boxes drawn in image display area 505. Specifically, FIG. 15 illustrates the GUI 500 in three stages: a first stage 1510 before any modifications are made, a second stage 1520 after the positive sample box 570 is moved, and a third stage 1530 after the size of the positive sample box 570 is modified.

The first stage 1510 illustrates the GUI 500 with three samples (two positive and one negative). A key 1505 is generated in the two-dimensional plane based on the positive samples and a transition region 1510 is generated based on the key. As can be seen, the inner arc of the transition region is constrained by the negative sample pixel values, as the outer arc is much further from the key than the inner arc.

Stage 1520 illustrates that the user has moved the positive sample box 570 to the left so that the border pixels just on the edge of the man's hair are included in the positive sample. Often these border pixels are slightly different from the greenscreen as a result of shadows or a blending halo effect in the film/photography. As a result, the range of the positive sample pixel values is increased, leading to a larger key 1505. The transition region has similarly increased where required (and possible, accounting for any negative samples). The outer arc has increased in its distance from the center of the plane in accordance with a similar increase from the key. However, although the inner arc of the key is now closer to the center of the plane, the inner arc of the transition region is fixed on account of the negative sample pixel values.

In some embodiments, a user may move the sample boxes in the image display area by dragging a sample box—e.g., by moving a cursor over the box with a cursor controller, selecting the sample box (e.g., double tapping a touchpad, pressing down on a mouse button, etc.), moving the sample box by moving the cursor, and deselecting the sample box (e.g., double tapping a touchpad for a second time, releasing a mouse button, etc.). In some embodiments, the user can also touch the display of the sample box on a touchscreen and move his finger along the touchscreen in order to drag the sample box.

Stage 1530 illustrates that the user has enlarged the sample box 570 by dragging the top left corner of the sample box up and left. As this picks up more pixels from the man's hair, the spread of the pixel values for the key has greatly increased. As a result, the generated key crosses over the center point of the plane and now has an single point rather than an inner arc. In addition, much of the negative sample is enclosed within the key. As part of the negative sample is still outside the key, it still constrains the transition region. Thus, left of the key, the transition region is along the key. On the other hand, to the right of the key, the transition region is not constrained at all, and thus ends up asymmetric. The outer arc is an arc about the center of the plane, though some embodiments use an arc about either the inner point of the key or the inner point of the transition. One will note that once an entire negative sample is within the key, the sample no longer constrains the transition region.

In some embodiments, a user may alter the shape of the sample boxes in the image display area by dragging a corner or edge of a sample box—e.g., by moving a cursor of the corner or edge with a cursor controller, selecting the sample box (e.g., double tapping a touchpad, pressing down on a mouse button, etc.), moving the corner or edge by moving the cursor, and deselecting the sample box (e.g., double tapping a touchpad for a second time, releasing a mouse button, etc.). In some embodiments, the user can also touch the display of the corner or edge of the sample box on a touchscreen and move his finger along the touchscreen in order to modify the sample box.

Just as a user can modify and move the positive sample boxes as shown in FIG. 15, the user also is provided the capability to modify and move the negative sample boxes in some embodiments. Doing so will only affect the transition region, rather than the key. In addition, the user can delete sample boxes (e.g., by selecting a sample box and then pressing the delete key). When a sample box is moved, modified, deleted, etc., some embodiments regenerate the key and/or transition (e.g., by performing process 600 and/or 1100).

Figure 16:
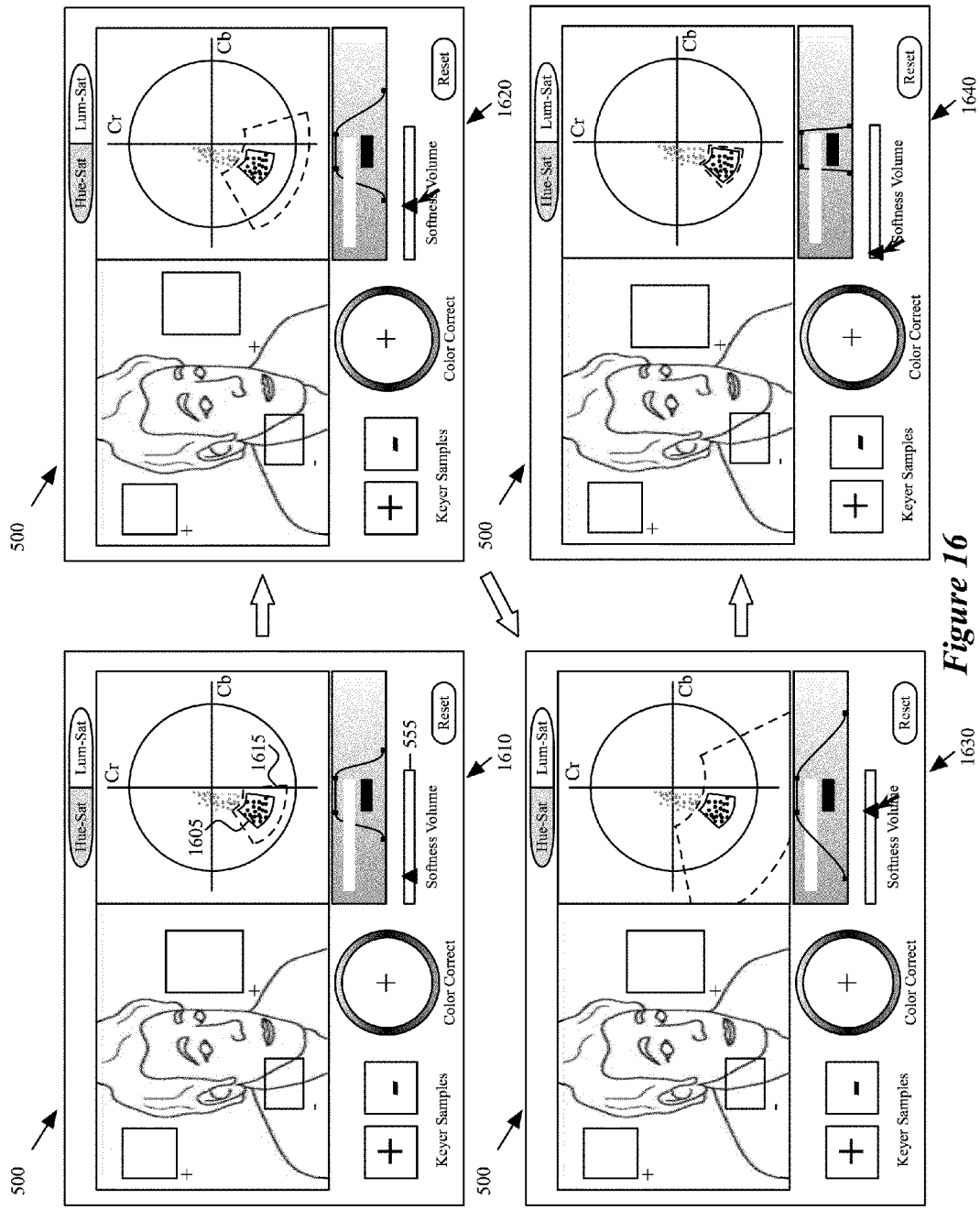
FIG. 16 illustrates the user of the transition region size slider to modify the transition region in the GUI.

In addition to modifying the sample boxes, a user can move the transition region size slider 555 (or a similar UI construct) in order to modify the size of the transition region, to the extent that the transition region is not constrained. FIG. 16 illustrates the use of the transition region size slider 555 to modify the transition region in GUI 500. Specifically, FIG. 16 illustrates the GUI 500 in four stages 1610-1640 in which the user is moving the slider 555.

Stage 1610 illustrates the GUI 500 after two positive samples of a greenscreen background and a negative sample of a man's portrait have been selected, and a key 1605 and transition region 1615 have been generated for the image. The inner arc of the transition region is constrained by the negative samples at this point. In the second stage 520, the user has moved the slider to the right (e.g., with a cursor controller, through a touchscreen, etc.) and the size of the transition region has increased. The outer arc of the transition region 1615 is further from the center of the plane, and the angular spread is larger. However, due to the constraint of the negative sample pixel values, the inner arc has not moved (though it is longer due to the increase in the angular spread).

Stage 1630 illustrates the GUI after the user has increased the transition region size value even further with the transition region size slider 555. Again, the outer arc and angular spread have moved such that the transition region is quite large and does not fit entirely within the key display area 515. In some embodiments, the color space is constrained (e.g., the RGB color space only runs from 0 to 255 for each of the three coordinates, and thus the YCbCr color space, a linear transformation of the RGB space, is similarly constrained). This does not prevent the transition region from increasing past the limits of the color space in some embodiments, as shown. However, some portions of the transition region will not have any corresponding pixels in the image, as pixels cannot be defined to have those pixel values.

Finally, stage 1640 illustrates the GUI after the user has moved the transition region size slider 555 all the way to the left, minimizing the size value. A small transition region 555 is still present, as some embodiments require at least a small transition region between pixel values for which alpha=0 and pixel values for which alpha=1. At this stage, the inner arc is no longer constrained by the negative sample pixel values.

Figure 17:
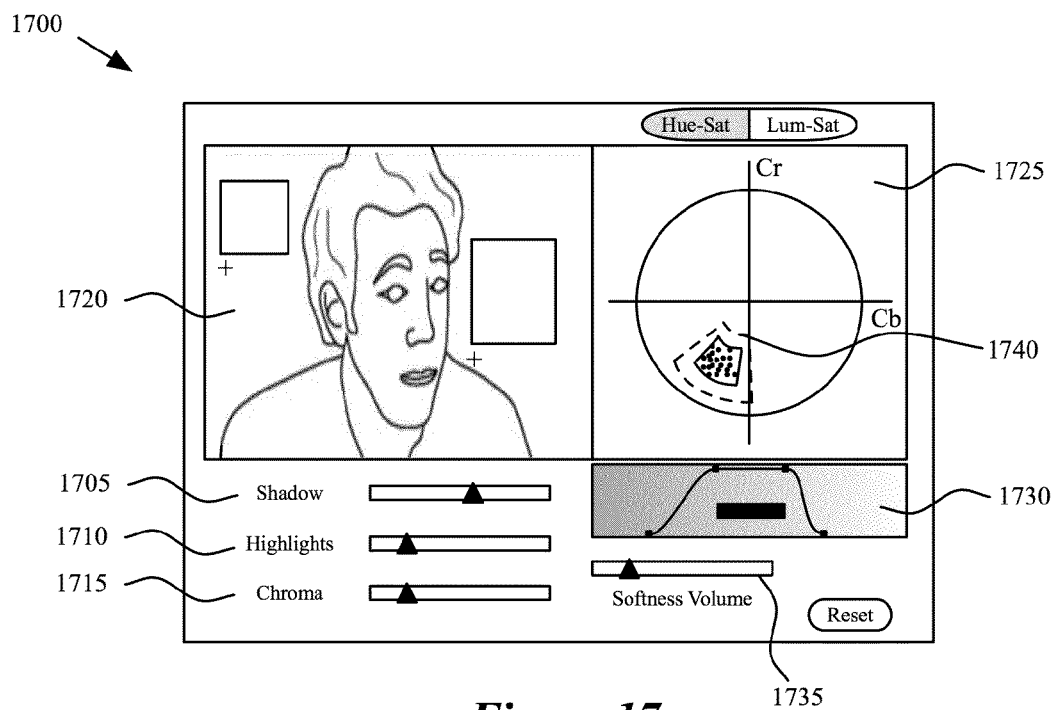
FIGS. 17-19 illustrate additional controls that cause different aspects of the transition region to be modified at different rates by the transition region size slider.

Some embodiments provide additional controls that cause different aspects of the transition region to be modified at different rates by the transition region size slider. FIG. 17 illustrates a GUI 1700 that includes a set of sliders 1705, 1710, and 1715, in addition to an image display area 1720, key display area 1725, third dimension graph 1730, and transition region size slider 1735. Some embodiments also include positive and negative sample UI items and color correction tools in the same GUI as sliders 1705-1715.

The sliders 1705-1715 include a shadow slider 1705, a highlights slider 1710, and a chroma slider 1715. These sliders (or other UI items performing a similar function) modulate how the transition region size value affects different aspects of the transition region. In some embodiments, the shadow slider 1705 modulates the low luminance side of the luma dimension, the highlights slider 1710 modulates the high luminance side of the luma dimension, and the chroma slider 1715 modulates the shape in the CbCr plane.

FIG. 17 illustrates the affect of having a larger setting for the shadow slider 1705 than for the other two sliders 1710 and 1715. As shown, the transition region size slider 1735 is set to a relatively small value. Accordingly, the transition region shape 1740 in the chroma plane is a fairly small size (the same size as shown at stage 720 of FIG. 7, with the same key and setting of the transition region size slider). Similarly, the right (high luma) side of the third dimension graph is small as well, also at the same size as stage 720 of FIG. 7. The left (low luma) side of the third dimension graph, on the other hand, is significantly larger than the right side, indicating a larger transition region on the low luma side of the key in the three dimensional color space. This larger transition region is a result of the shadow slider 1705 being set higher than the other sliders 1710 and 1715.

Figure 18:
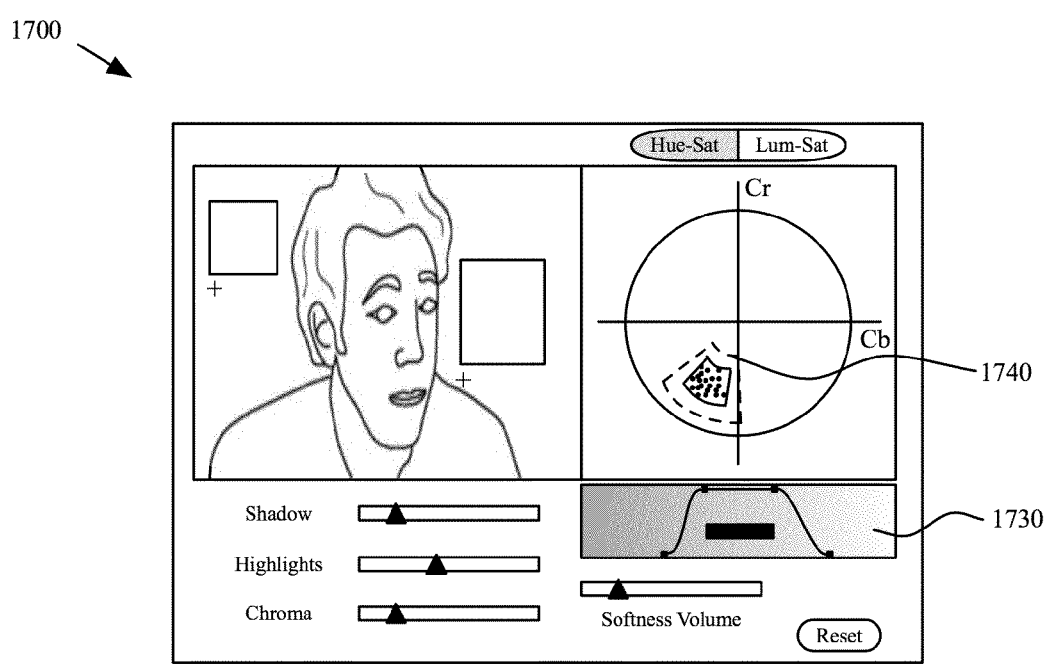
Figure 19:
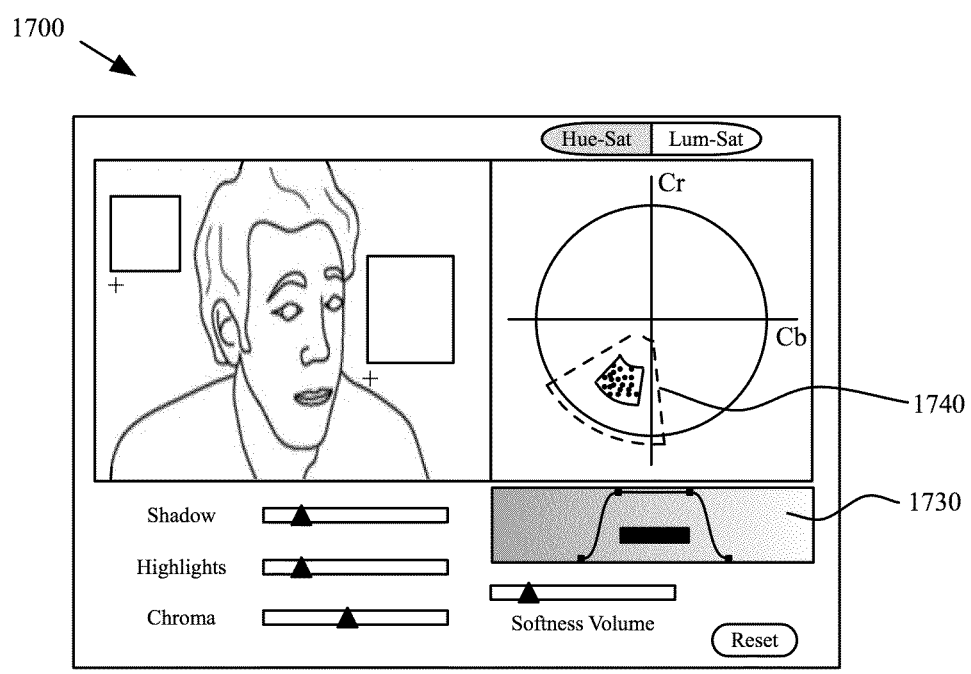

FIG. 18 illustrates the GUI 1700 when a user has moved the highlights slider 1710 to a higher setting than the other two sliders 1705 and 1715. In this case, the right (high luma) side of the third dimension graph 1730 is larger than the left side (the low luma side and the two dimensional shape 1740 are the same size as shown in stage 720 of FIG. 7) as a result of the positioning of the sliders 1705-1715. FIG. 19 illustrates the GUI 1700 when a user has moved the chroma slider 1715 to a higher setting than the other two sliders 1710 and 1715. In this case, the two-dimensional shape 1740 is significantly larger than in the previous figures, while the transition regions of the third dimension graph 1730 are smaller.

II. Direct Modification of Key and Transition

In addition to generating the key and transition regions based on samples of (i) pixels whose pixel values will definitely be in the key and (ii) pixels whose pixel values will definitely not be in the transition region, some embodiments provide the user direct control over the key and transition regions in the color space representation. That is, the user can directly modify the key and transition borders in the two-dimensional plane (e.g., in key display area 515) and third dimension graph (e.g., graph 550). In some embodiments, these modifications are limited such that the shapes maintain a particular shape (e.g., wedge, circle, etc.), while other embodiments allow completely freeform modifications.

Figure 20:
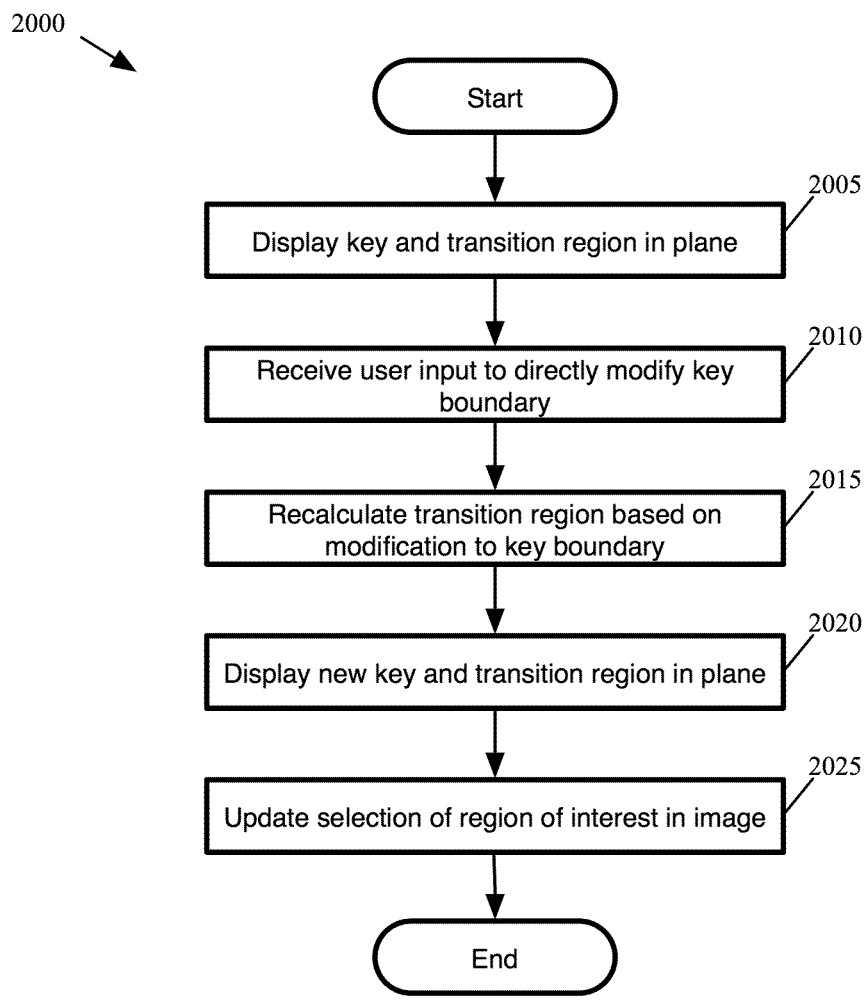
FIG. 20 conceptually illustrates a process 2000 of some embodiments for modifying a key and transition region based on direct user input.

FIG. 20 conceptually illustrates a process 2000 of some embodiments for modifying a key and transition region based on direct user input. As shown, the process begins by displaying (at 2005) a key and transition region in the two-dimensional color space plane. As described above, this may be the Cb-Cr plane or some other two-dimensional plane of a color space in which the keyer operates. The key and transition region may be generated as wedge shapes based on samples of portions of the image in some embodiments, though a variety of different shapes are possible.

The process 2000 then receives (at 2010) user input to directly modify the key boundary. In some embodiments, a user drags one edge or corner of the key. For instance, when the key is a wedge, some embodiments allow the user to drag either the inner or outer arc or either of the sides. In addition, some embodiments allow the user to modify the key in a freeform mode. In some such embodiments, the key boundary is treated as a spline or similarly deformable curve and the user can drag points on the curve as desired, modify tangents (e.g., if the curve is a bezier spline), etc.

Based on the modification to the key boundary, the process recalculates (at 2015) the transition region boundary. In some embodiments, process 1100 is used to determine the transition region (i.e., when the key and transition are wedges). Similar processes may be used for different shapes, with similar constraints to account for negative sample pixels. In some embodiments, when the user makes freeform modifications to the key, the transition region remains unchanged. Other embodiments determine the smallest wedge (or other shape) that could contain the entire key region, and calculate the transition region using process 1100 or a similar process. Yet other embodiments use a transition region the shape of which follows that of the key, only larger by a distance determined from the transition region size value.

The process 2000 then displays (at 2020) the new key and transition region in the two-dimensional plane. The process then updates (at 2025) the selection of the region of interest in the image. That is, the process determines a new alpha value for each pixel in the image based on the new key and transition region. The process then ends. Some embodiments perform all of these operations in real-time. That is, the user can see the key and transition regions being modified as he performs the user input to modify the key. If alpha image view is selected, or edits have been applied to the image, then changes in the selection of the region of interest can be displayed in real time as well in some embodiments.

Figure 21:
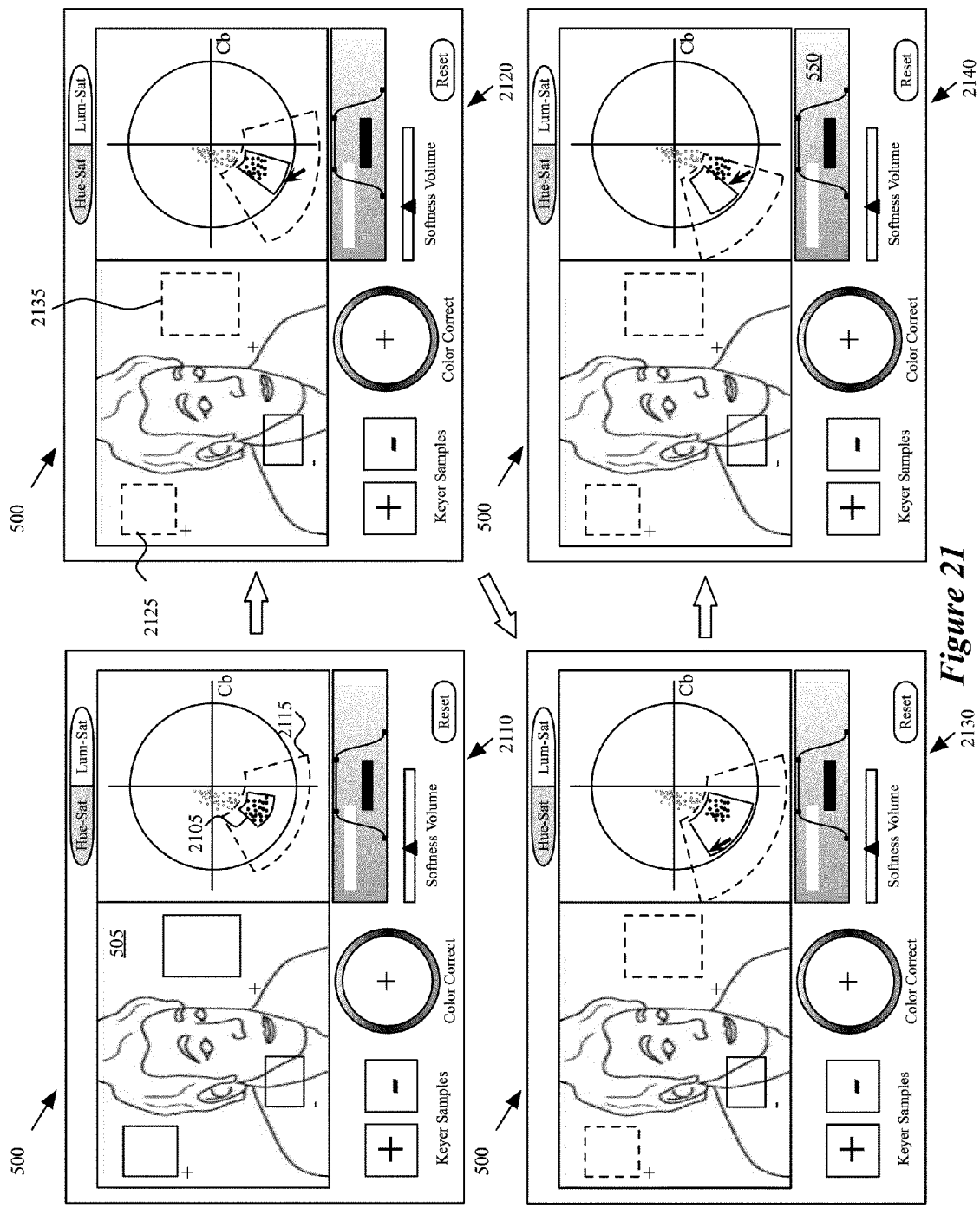
FIG. 21 illustrates various direct user modifications of the key and the resultant modifications to the transition region.

FIG. 21 illustrates various direct user modifications of the key and the resultant modifications to the transition region in GUI 500. Various modifications are illustrated at four different stages 2110-2140. The first stage 2110 shows a key 2105 and transition region 2115 generated based on two positive sample selections and one negative sample selection for an image in image display area 505.

At the second stage 2120, the user has dragged the outer arc of the key 2105 outwards (away from the origin of the CbCr plane). As a result, the outer arc of transition region 2115 has also moved outwards such that the radial distance from the outer arc of the key to the outer arc of the transition region does not change. The user can direct this movement in some embodiments by placing the cursor over the edge of the key, selecting the edge for dragging (e.g., by pressing down on a cursor controller button, tapping or double-tapping a touchpad, etc.), moving the cursor to a new location in the GUI, and unselecting the edge (e.g., by releasing the cursor controller button, etc.). In some embodiments, the GUI is displayed on a touchscreen, and the user places a finger on the edge of the key and drags it to a new location by moving the finger along the screen before removing the finger.

In order to indicate that the key 2105 is no longer entirely based on the sample selection, some embodiments modify the display of the sample selection shapes drawn over the image display area. As shown, the two positive sample boxes 2125 and 2135 in GUI 500 are displayed as dashed lines at stage 2120.

The stage 2130 illustrates the user moving the left edge of the key 2105 in a clockwise manner so as to expand the angular spread of the wedge. This causes a similar expansion of the angular spread of the transition region 2115. At stage 2140, the user has moved the right edge clockwise by a similar amount. At this point, almost none of the positive sample pixel values are within the key (most are within the transition region).

One will note that the third dimension graph 550 does not change during the modification of the key in the two-dimensional plane. The range in the third dimension of the color space remains unaffected by the shape in this case. However, in some embodiments, if a user modifies the key such that the new transition region can expand further into the third dimension without including negative sample pixel values or can be constrained in the third dimension so as to allow for an increased size in the two-dimensional plane, then the third dimension graph will be modified accordingly.

Figure 22:
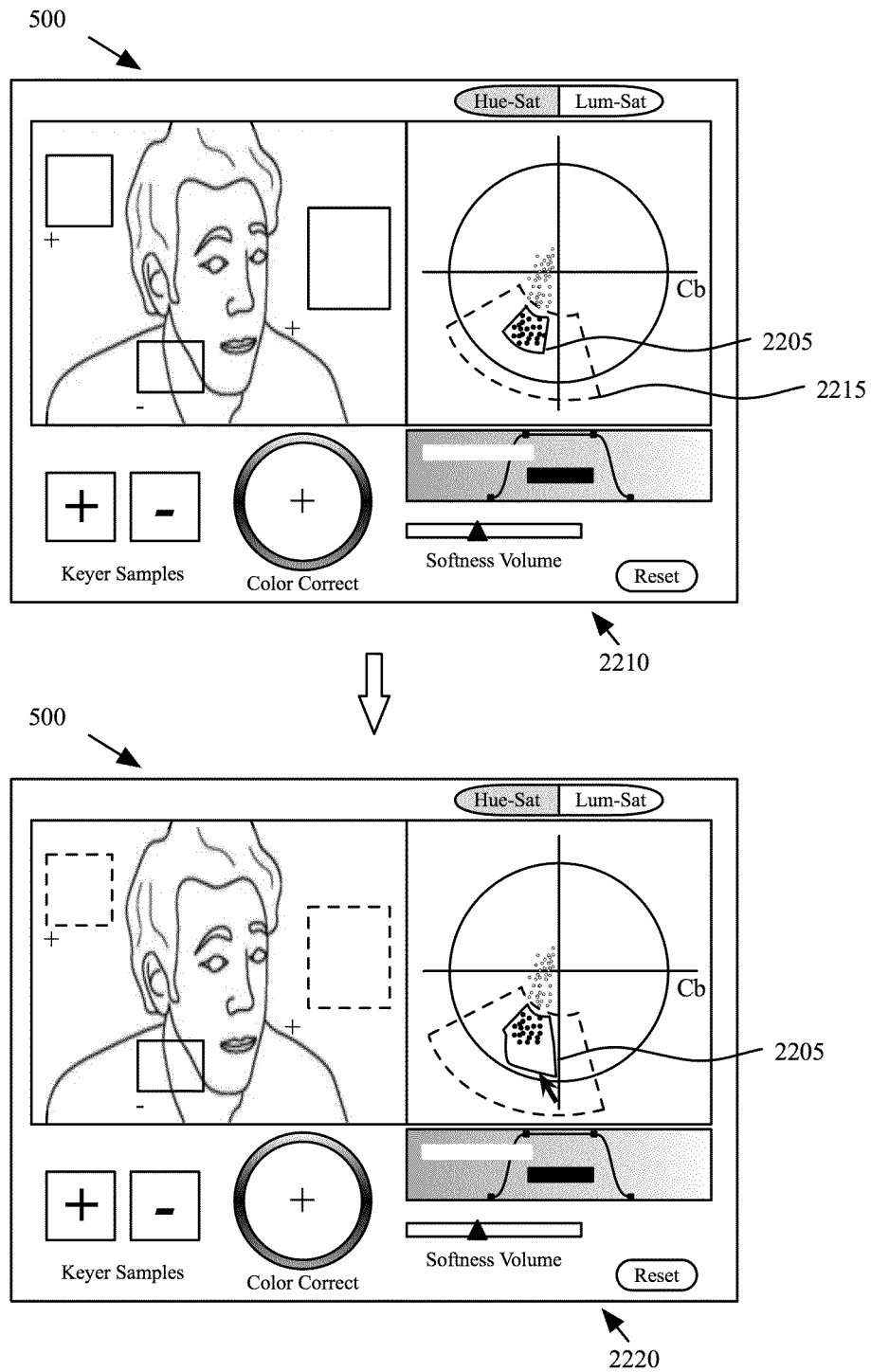
FIG. 22 illustrates freeform modification of the key in the two-dimensional plane.

FIG. 22 illustrates freeform modification of the key in the two-dimensional plane in two stages 2210 and 2220 of the GUI 500. As shown at the first stage, the key 2205 is a key generated based on two positive samples. The transition region 2215 is generated based on the key and transition region size value, and is constrained by the negative sample.

The second stage 2220 illustrates that the user has modified the key 2205 in a freeform manner. In some embodiments, the user can modify the key by dragging a point on the key boundary in an arbitrary fashion. Some embodiments treat the boundary as a deformable curve. The curve may be defined by a set of definition points that the user can move in order to modify the curve. In some embodiments, the user can also modify properties of the points (e.g., tangents for a bezier curve). The curve may be a spline curve in some embodiments, such as a bezier spline or b-spline. Bezier splines, for example, have definition points that are on the curve, and each such point has a tangent that defines how the boundary curves as it leaves the definition point. B-splines, on the other hand, have definition points not on the curve. Other types of deformable curves, including other spline curves, may be used in various embodiments.

In the example shown, the transition region 2215 does not change in response to the freeform modifications to the key. In some embodiments, however, the media-editing application modifies the transition region to match the shape of the key. For instance, if the deformable key is a bezier spline, then for each definition point, a similar definition point is defined on the curve of the transition region boundary. To account for the transition boundary being longer, the tangents at the definition points are longer on the transition boundary than on the key boundary.

Figure 23:
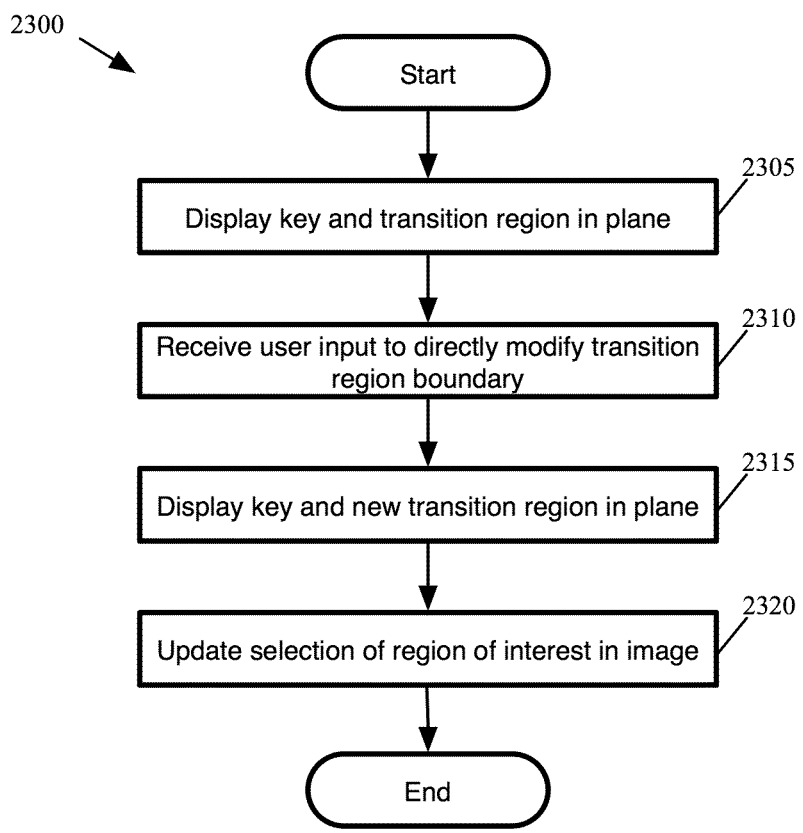
FIG. 23 conceptually illustrates a process 2300 of some embodiments for modifying a transition region based on direct user input.

As mentioned, some embodiments allow for the user to directly modify the key in the two-dimensional plane. FIG. 23 conceptually illustrates a process 2300 of some embodiments for modifying a transition region based on direct user input. As shown, the process begins by displaying (at 2305) a key and transition region in the two-dimensional color space plane. As described above, this may be the Cb-Cr plane or some other two-dimensional plane of a color space in which the keyer operates. The key and transition region may be generated as wedge shapes based on samples of portions of the image in some embodiments, though a variety of different shapes are possible.

The process 2300 then receives (at 2310) user input to directly modify the transition region boundary. In some embodiments, a user can drag one edge or corner of the transition boundary. For instance, when the transition region is a wedge, some embodiments allow the user to drag either the inner or outer arc or either of the sides. In addition, some embodiments allow the user to modify the transition region in a freeform mode. In some such embodiments, the transition region boundary is treated as a spline or similarly deformable curve and the user can drag points on the curve as desired, modify tangents (e.g., if the curve is a bezier spline), etc. In some embodiments, the modifications to the transition region do not affect the key. A user is free to modify the transition region (so long as the transition boundary stays outside of the key boundary) without changing the fully selected portion of the color space.

The process 2300 then displays (at 2315) the key and the new transition region in the two-dimensional plane. The process updates (at 2320) the selection of the region of interest in the image, then ends. That is, the process determines a new alpha value for each pixel in the image based on the new transition region. The alpha values for pixels with alpha=1 (fully selected) will not change, but the other pixels may, depending on the modifications to the transition region. Some embodiments perform all of these operations in real-time. That is, the user can see the transition region being modified as he performs the user input to modify the transition (e.g., moves a mouse). If alpha image view is selected, or edits have been applied to the image, then changes in the selection of the region of interest can be displayed in real time as well in some embodiments.

Figure 24:
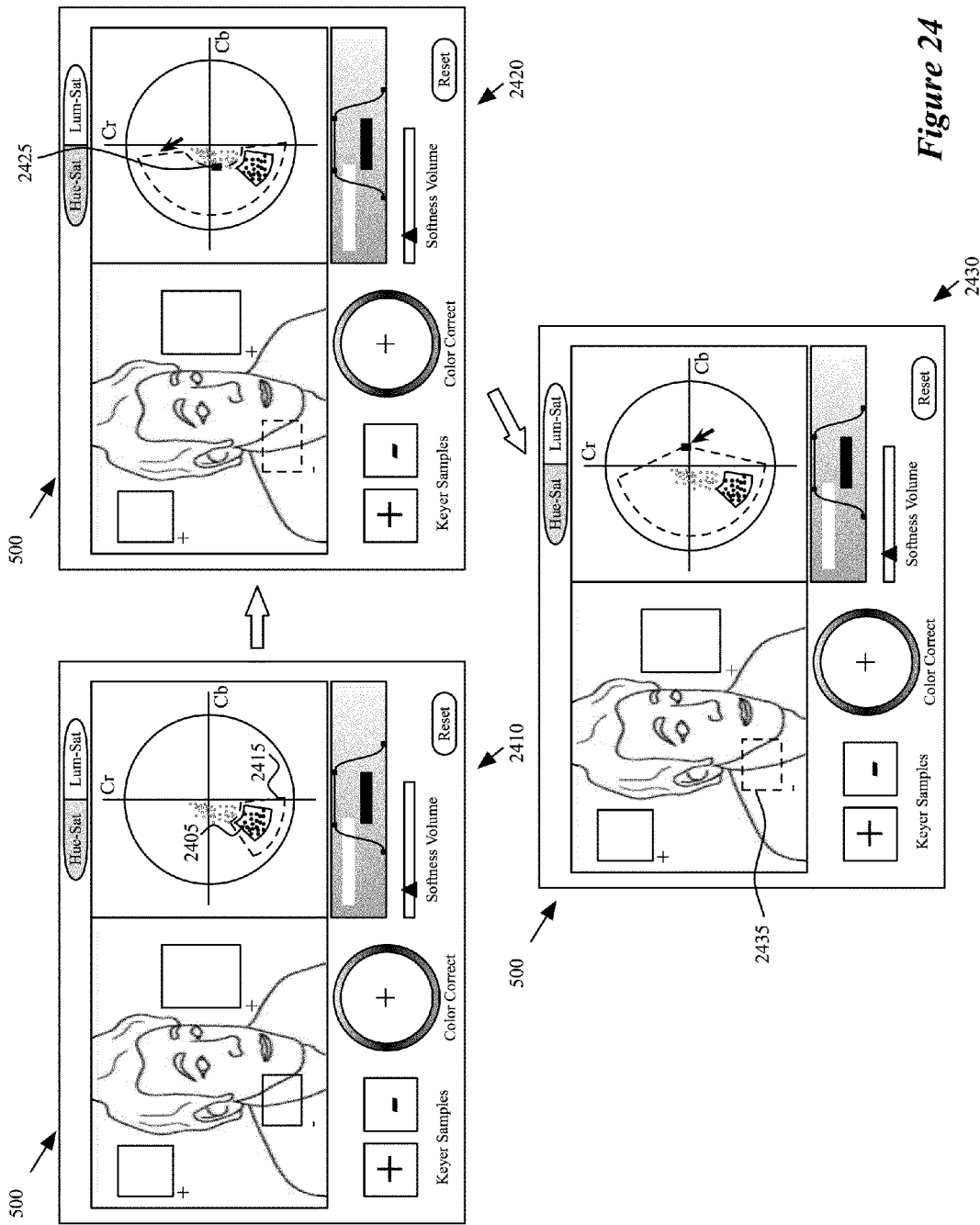
FIG. 24 illustrates various direct user modifications of the transition region.

FIG. 24 illustrates various direct user modifications of the transition region in GUI 500. Various modifications are illustrated at three different stages 2410-2430. The first stage 2410 shows a key 2405 and transition region 2415 generated based on two positive sample selections and one negative sample selection for an image in image display area 505.

At the second stage 2420, the user has dragged the left edge (that is, the edge at a lesser angle of the two edges, as measured in the standard counterclockwise direction) of the transition boundary 2415 in a clockwise manner so as to expand the angular spread of the transition region. The user can direct this movement in some embodiments by placing the cursor over the edge of the transition region, selecting the edge for dragging (e.g., by pressing down on a cursor controller button, tapping or double-tapping a touchpad, etc.), moving the cursor to a new location in the GUI, and unselecting the edge (e.g., by releasing the cursor controller button, etc.). In some embodiments, the GUI is displayed on a touchscreen, and the user places a finger on the edge of the transition region and drags it to a new location by moving the finger along the screen before removing the finger.

Moving the transition region as shown causes some of the negative sample pixels to be included within the transition region. In order to indicate that the transition region 2415 is no longer constrained by the negative samples, some embodiments modify the display of the sample selection shapes drawn over the image display area. As shown, the negative sample box 2435 is displayed using dashed lines at stage 2420 once the user has started to directly modify the transition region. Some embodiments display the negative sample shapes as such (or using a different indicator) even when the direct modifications to the transition boundary do not cause any of the negative sample pixel values to be included within the transition region. In addition, as shown, some embodiments display a marker 2425 at the center of the inner arc of the transition region as a user modifies the region.

The stage 2430 indicates that a user has selected the marker 2425 and dragged the inner arc of the transition region over the origin of the CbCr plane, such that the inner arc becomes a single point. At this stage, all of the negative sample pixels are within the transition region. Some embodiments include a user-selectable option (e.g., as a selectable button, item in a drop-down menu, etc.) the selection of which causes the regeneration of the key and transition region based only on the samples and the transition region size value. In the example illustrated, selection of such an option would cause the key and transition region to revert back to that shown in stage 2410.

As with the modifications to the key described above, the third dimension graph 550 does not change as the user modifies the transition region in the plane. The range of the transition region remains unaffected by the changes to the two-dimensional shape. As will be described below, this range can be modified separately in some embodiments.

Figure 25:
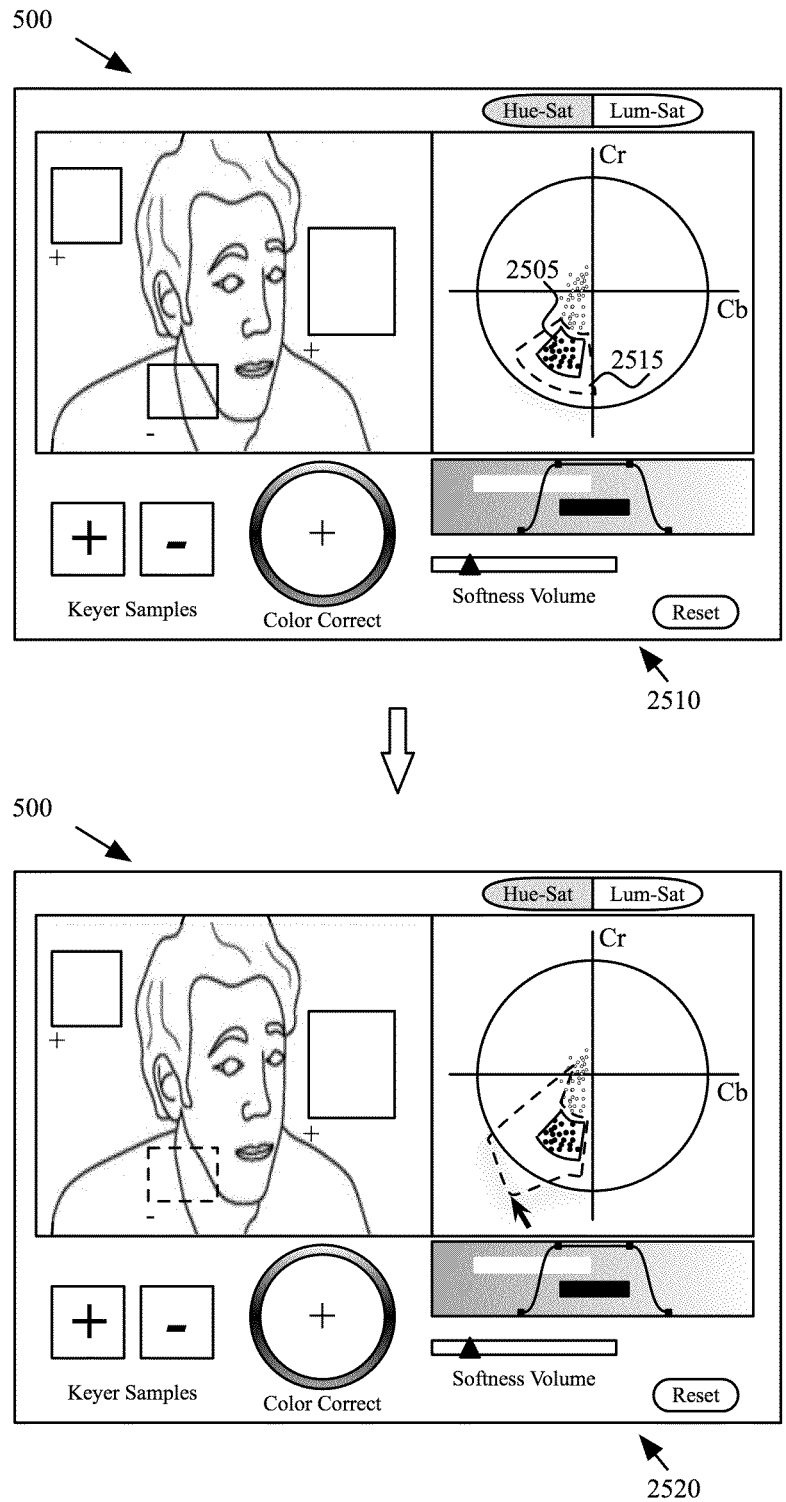
FIG. 25 illustrates freeform modification of the transition region in the two-dimensional plane.

FIG. 25 illustrates freeform modification of the transition region in the two-dimensional plane in two stages 2510 and 2520 of the GUI 500. As shown at the first stage, the key 2505 is generated based on two positive samples. The transition region 2515 is generated based on the key and transition region size value, and is constrained by the negative sample.

The second stage 2520 illustrates that the user has modified the transition boundary 2515 in a freeform manner. In some embodiments, the user can modify the transition region by dragging a point on the boundary in an arbitrary fashion. Some embodiments treat the boundary as a deformable curve. The curve may be defined by a set of definition points that the user can move in order to modify the curve. In some embodiments, the user can also modify properties of the points (e.g., tangents for a bezier curve). The curve may be a spline curve in some embodiments, such as a bezier spline or b-spline. Bezier splines, for example, have definition points that are on the curve, and each such point has a tangent that defines how the boundary curves as it leaves the definition point. B-splines, on the other hand, have definition points not on the curve. Other types of deformable curves, including other spline curves, may be used in various embodiments. In the example shown, multiple points have been moved in order to form the transition region into the shape shown in stage 2520.

III. Control of Key and Transition in Three Dimensions

The above sections focused primarily on the generation and modifications of the shapes of the key and transition regions in a two-dimensional plane of color space, such as the chroma plane. As mentioned above, the key and transition shapes are propagated along the third dimension (e.g., luma, or Y) axis in order to generate three-dimensional volumes in the color space.

Figure 26:
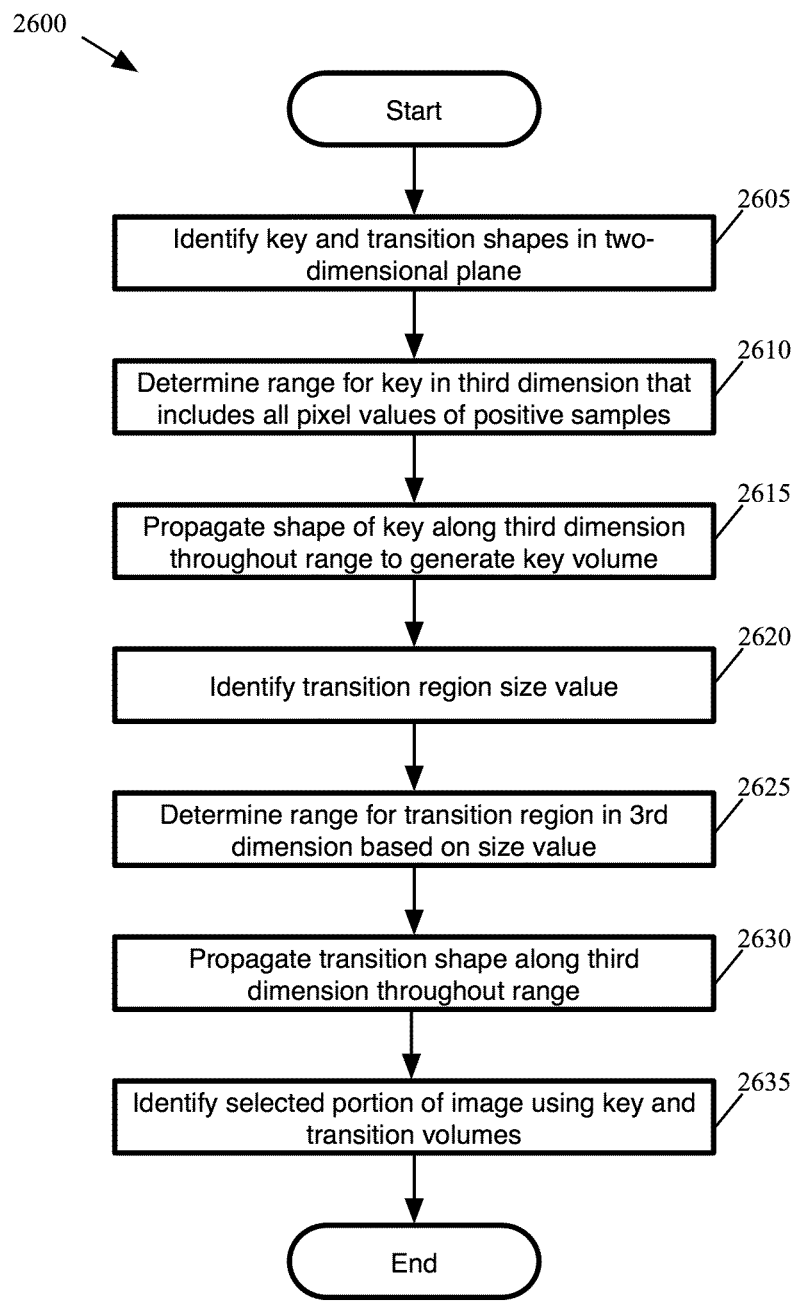
FIG. 26 conceptually illustrates a process of some embodiments for generating the three-dimensional key and transition volumes.

FIG. 26 conceptually illustrates a process 2600 of some embodiments for generating the three-dimensional key and transition volumes. Some embodiments of the media-editing application perform process 2600 any time a user modifies any aspect of the key and/or transition region, whether by adding to or updating the samples, directly modifying the shapes in the key display area, modifying the third dimension graph (e.g., as described below), modifying the transition region size slider, etc.

As shown, the process 2600 begins by identifying (at 2605) key and transition shapes in the two-dimensional plane. In some embodiments, these shapes are generated based on pixel samples as described above in Section I and II. That is, the key shape is generated according to positive samples of pixels whose pixel values must be included in the key and the transition shape is generated based on the key shape and a transition region size value while constrained by any negative samples of pixels whose pixel values must be excluded from the transition shape.

Next, the process determines (at 2610) a range for the key in the third dimension that includes all of the pixel values of the positive samples. As described above, the pixel values of some embodiments are coordinates in a three-dimensional color space. The pixel values of the positive samples in two of the dimensions (e.g., Cb and Cr) are used to define the key and transition shapes (unless those shapes are then modified by a user). The pixel values of the positive samples in the remaining dimension (e.g., Y) determine the range of the key in the third dimension. Some embodiments use the edges of the range of the pixel values, while other embodiments use a slight buffer on either side of the range. For instance, if the positive sample pixels have luma values ranging from 75 to 103, some embodiments define the key to range from 73 to 105 along the luma axis.

Once the range is determined, the process 2600 propagates (at 2615) the key shape along the third dimension axis throughout the determined range in order to generate the key volume in the color space. The key volume is a volume in the color space that encloses a set of pixel values. Any pixels in the image being keyed with pixel values that fall into the key volume are part of the selection to which edits (e.g., color correction edits) are fully applied.

By propagating the two-dimensional shape along the axis, a prism is formed as the key volume. The prism will have the shape of the two-dimensional shape. When the color space is an orthogonal coordinate system, the shape will be a right prism. However, in some embodiments, the third dimension is not orthogonal to the two-dimensional plane, and the prism will then be an oblique prism. For instance, while the RGB color space is an orthogonal space, the YCbCr color space (defined as a transformation of the RGB space) will not necessarily be an orthogonal space.

One will note that the shape is not propagated such that the key volume encloses any portion of the axis of the third dimension. Assuming that the axis runs through the center of the two-dimensional plane in which the key shape is generated, the key volume only encloses the axis when the key shape encloses the center of the plane. When the center of the plane is not enclosed, the prism will be off to the side of the third dimension axis.

Once the key volume is generated, the process identifies (at 2620) the transition region size value. As discussed, the transition region size value is based on the setting of the transition region size slider in some embodiments. As a user moves the slider to higher settings, the size value increases. With the increase in the size value comes an increase in the size of the transition shape in the two-dimensional plane (that is identified at 2605).

Based on the transition region size value, the process determines (at 2625) a range for the transition region in the third dimension. In some embodiments, this is the range of the key extended out by an amount based on the size value. For instance, if the size value specifies that the transition region should have a range of 15 along the luma axis on either side of the key, then in the example above in which the key ranges from 73 to 105, the transition region will range from 58 to 120 along the luma axis.

The process 2600 then propagates (at 2630) the transition shape along the third dimension axis throughout the determined transition range. Thus, the transition volume, like the key volume, will be a prism (and a right prism if the color space is an orthogonal coordinate system). The transition volume will enclose the key volume, as the transition shape encloses the key shape in the two-dimensional plane. As a result, the transition region will not actually be the entire transition volume, but rather the portion of the transition volume that surrounds the key volume (i.e., a prism with a smaller prism cut out of the center).

With the key and transition volumes calculated, the process identifies (at 2635) a selected portion of the image using the key and transition volumes. The selected portion of the image will included pixels that are fully selected (those whose pixel values fall within the key volume in color space), pixels that are not selected (those whose pixel values fall outside the transition volume in color space), and pixels that are partially selected (those whose pixel values fall within the transition volume). For partially selected pixels, the extent to which a pixel is selected will depend upon where exactly its pixel values fall within the transition region.

Some embodiments display the three-dimensional volumes in the graphical user interface, while other embodiments mathematically generate the three-dimensional volumes, but do not display the volumes to the user. Even when the media-editing application does not display the three-dimensional volumes to the user, the user can visualize the volumes from the shapes in the two-dimensional plane and the range of the third dimension graph.

Figure 27:
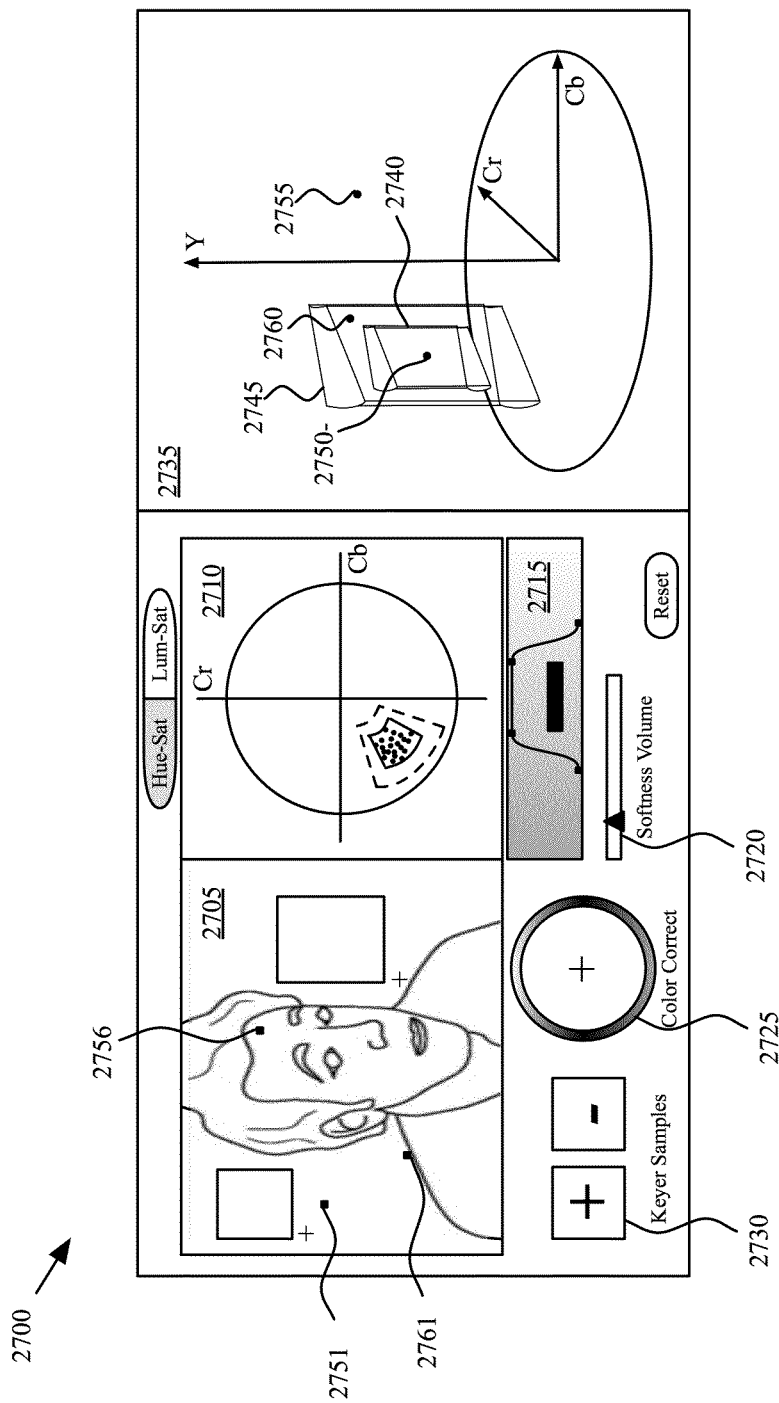
FIG. 27 illustrates a GUI that includes a three-dimensional key and volume in the case in which the third dimension axis is orthogonal to the plane in which the shape is formed.

FIG. 27 illustrates a GUI 2700 that includes a three-dimensional key and volume in the case in which the third dimension axis is orthogonal to the plane in which the shape is formed. The GUI 2700 includes an image display area 2705, key display area 2710, third dimension graph 2715, transition region size slider 2720, color correction tools 2725, and image sampling tools 2730. Similar display areas and tools are discussed above. In addition, the GUI 2700 includes a 3D color space display area 2735.

The 3D color space display area 2735 displays a three dimensional color space with the key and transition volumes in the color space. As shown, the color space illustrated in display area 2735 is the YCbCr color space, with the luma (Y) axis perpendicular to the chroma (CbCr) plane. Displayed in this color space is the key volume 2740 and the transition volume 2745. The key and transition volumes 2740 and 2745 are generated from the shapes in the two-dimensional plane displayed in the key display area 2710 and the range of the key and transition areas displayed in third dimension graph 2715. As such, the volumes 2740 and 2745 are located in the green portion of the color space, with midtone (neither especially bright nor especially dark) luminances.

FIG. 27 illustrates three points 2750, 2755, and 2760 in the color space, representing three pixels 2751, 2756, and 2761 from the image in image display area 2705. The first of these pixels 2751 is clearly in the greenscreen area, and thus its pixel values 2750 fall within the key volume in the color space. Pixel 2751 is fully selected and will therefore be fully affected by any edits to the image. The second pixel 2756 is on the edge of the green screen near the subject of the image, and its pixel values fall within the transition volume in the color space. Thus, pixel 2756 is partially selected and will be partially affected by any edits to the image. The third pixel 2761 is from the subject's face, and thus its pixel values 2760 fall into the red area of color space outside the key and transition volumes. As such, the pixel 2761 is not selected and will be unaffected by any edits.

In the example shown in FIG. 27, the color space displayed in 3D color space display area 2735 the GUI 2700 is the YCbCr space. This is the same color space that is displayed in the key display area 2710 (which displays the CbCr plane) and the third dimension graph (which displays the Y axis). On the other hand, some embodiments display the key and transition volumes in a different color space. For instance, as will be shown in the examples below, some embodiments display the volumes in RGB space. In some such embodiments, the YCbCr transformation of RGB space is not an orthogonal color space (i.e., the Y axis is not perpendicular to the CbCr plane).

Just as the user can modify the shape of the key and transition boundaries in the plane, various user interface controls provide the user with the ability to modify how the shape propagates through the third dimension. The following subsections will first describe user interface controls for modifying the range of the key and transition volumes in the third dimension, and then controls for modifying how the key and transition are propagated along the third dimension axis.

A. Modifying Range in Third Dimension

As described above, the third dimension graph (e.g., graph 550 of GUI 500) displays the range of the key and the transition region in the third (e.g., Y) dimension. In some embodiments, this graph is a user-modifiable curve or curves that allows the user to control the range of both the key and the transition along this axis.

Figure 28:
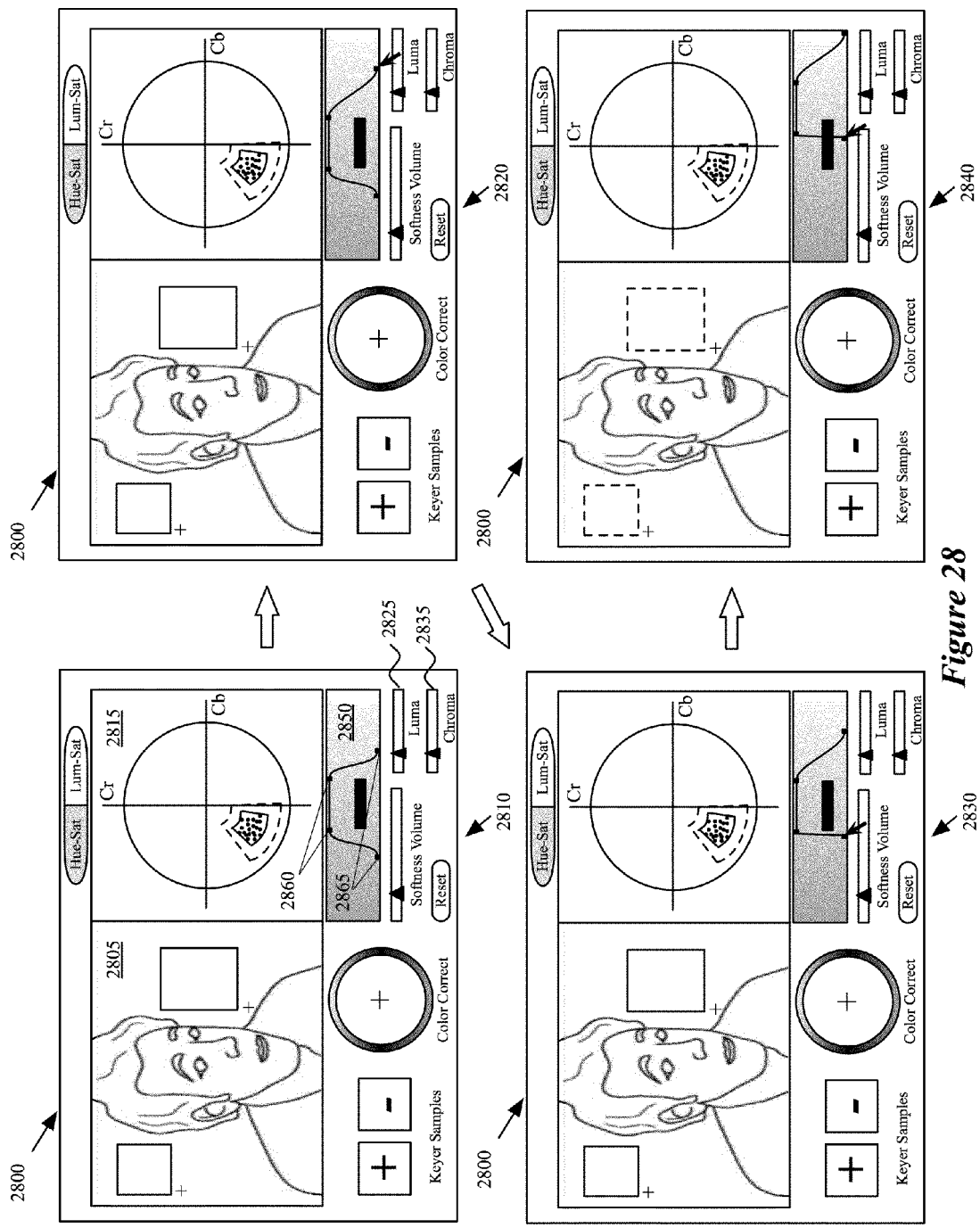
FIG. 28 illustrates various modifications to ranges of the key and transition in the third dimension by using a third dimension graph.

FIG. 28 illustrates various modifications to these ranges by using a third dimension graph in a GUI 2800. Specifically, FIG. 28 illustrates different user-directed modifications in four stages 2810-2840. Like GUI 500 of FIG. 5, the GUI 2800 includes an image display area 2805, a key display area 2815, a third dimension graph 2850, a transition region size value slider 2855, as well as various other controls. In addition, the GUI 2800 includes two alpha transition controls 2825 and 2835. The two alpha controls determine how the alpha values change between pixel values within the transition region. These controls will be described in further detail with respect to FIG. 29.

The first stage 2810 of FIG. 28 illustrates a key and transition as generated automatically from two positive samples in the image display area 2805. The key and transition shapes are displayed in the key display area 2815. In addition, the third dimension graph 2850 displays the luminance values of the samples. The graph 2850 includes four points: two key endpoints 2860 and two transition endpoints 2865. The key endpoints 2860 are at the upper and lower bounds of the luma values from the samples, while the transition endpoints are determined by the transition region size value. The larger the size value, the further the transition endpoints will be from the key endpoints. The graph will generally be symmetric unless the transition region is shortened on one side or the other due to constraints from negative sample pixels. In some embodiments, the graph is a plot of alpha values along the third dimension. The transition between alpha=1 (at the edge of the key) and alpha=0 (at the outer bounds of the transition region is a spline curve in some embodiments. This is described in further detail by reference to FIG. 29.

The second stage 2820 illustrates that the user has taken the right transition endpoint 2865 and moved it further to the right, thereby extending the range of the transition region at the high end of the luma scale. As a result of a longer transition region on this end, the transition from high alpha to low alpha is less steep.

At the third stage 2830, the user has taken the left transition endpoint 2865 and moved it to the right such that it is nearly at the same value along the luma axis as the left key endpoint 2860. Some embodiments will not allow the user to move the transition endpoint inside the key range, and will in fact mandate a small minimum difference between the key endpoint and the transition endpoint.

Stage 2840 illustrates that, in some embodiments, the user is able to continue moving the left transition endpoint to the right. This will cause the entire graph to shift to the right, so as to prevent the transition endpoint from passing the key endpoint. In some embodiments, once the other transition endpoint (in this case, the right endpoint) hits the end of the third dimension scale (e.g., a maximum luma value), the graph cannot be shifted any further. Some embodiments, however, allow the user to continue moving the graph past the end of the third dimension scale. As the key no longer corresponds to the sample pixel values, the positive sample shapes in the image display area have been modified at stage 2840.

In addition to moving the transition endpoints, some embodiments allow the user to move the key endpoints so as to shorten or extend the key. Just as a transition endpoint cannot be moved inside of the key endpoint, some embodiments prevent a key endpoint from being moved outside of its corresponding transition endpoint, and may impose the same minimum difference. If a user, for example, were to move the left key endpoint 2860 to the left, the key would continue extending in some embodiments, pushing the left transition endpoint along to the left as well.

In the example GUI illustrated in FIG. 28, the transition between the key endpoints and the transition endpoints of the graph is a curve that is flat at the endpoints and steep in between. In some embodiments, the curve within the transition region is user modifiable. As noted above, the GUI of some embodiments includes alpha transition controls 2825 and 2835 that determine how the alpha values change between pixel values within the transition region. The controls 2825 and 2835 are sliders, though different embodiments use different types of controls (e.g., wheels, boxes into which a user can type a number, etc.).

The sliders allow the user to control the slope of the transition between alpha=0 and alpha=1. The luma-alpha transition control 2825 controls the slope of the graph 2850. In some embodiments, the two curves representing the transition region are spline curves (e.g., bezier curves) and the endpoints are definition points of the curves. The tangents at the endpoints require that the graph be flat (a slope of 0) at that point, and the transition control 2825 corresponds to the length of the tangent. The longer the tangent, the flatter the graph will be at the endpoints, and therefore the steeper the slope must be at the endpoints. Thus, a long tangent will concentrate the alpha values in the transition region towards alpha=0 and alpha=1, while a small tangent will result in a more even spread of alpha values.

Figure 29:
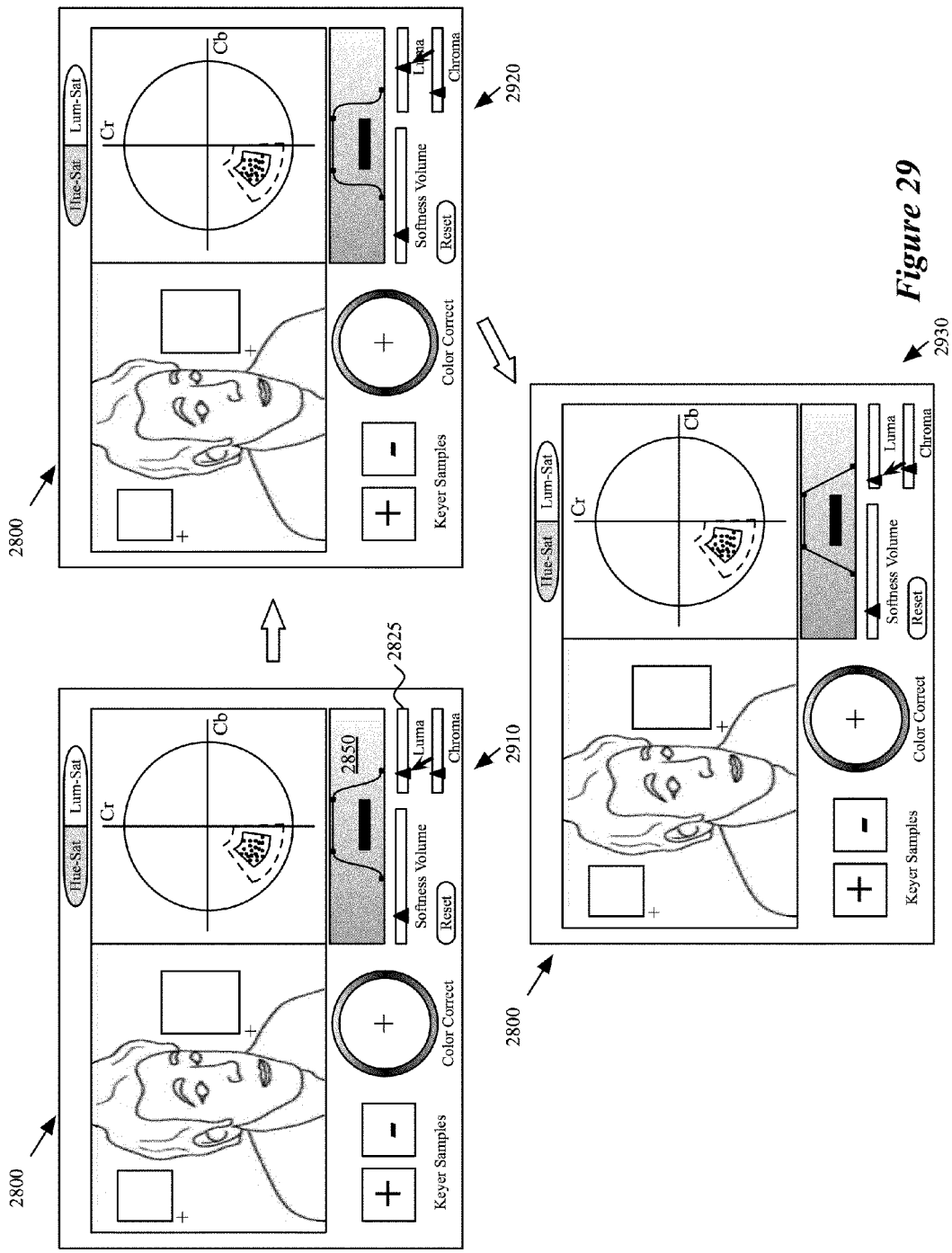
FIG. 29 illustrates the use of a luma-alpha transition control.

FIG. 29 illustrates the use of the luma-alpha transition control 2825 in three stages 2910-2930 of the GUI 2800. The first stage 2910 illustrates the key and transition region generated from two positive sample boxes drawn in the image display area. In addition, the third dimension graph 2850 displays the luminance values of the samples and the alpha values for the key and transition regions. As shown, the luma-alpha transition control 2825 is at a first setting. In some embodiments, this is a default setting.

The second stage 2920 illustrates that the user has moved the luma-alpha slider 2825 to the right. As a result, the graph 2850 is flatter around the endpoints and closer to vertical in between. On the other hand, in stage 2930, the user has moved the luma-alpha slider 2830 to the left. As a result, the graph 2850 is now basically a straight line between the endpoints. In some embodiments, no matter how far the user pushes the luma-alpha slider to the right, the slope of the graph on the left (low-luma) side will never be negative (and similarly, will never be positive on the high-luma side).

The chroma-alpha transition control 2835 makes similar modifications to the alpha values in the transition region of the Cb-Cr plane. When the luma value of a pixel falls into the luma range of the key and the chroma values are within the transition region of the chroma plane, the alpha value of the pixel is determined based on the chroma values. Similarly, when the chroma values are within the key shape and the luma value falls into the transition region, the luma value determines the alpha value of the pixel from graph 2850. When the chroma and luma values of a pixel fall into the transition region, some embodiments multiply the two alpha values together to arrive at an alpha value for the pixel, average the alpha values, or otherwise use a combination of the two alpha values.

B. Modifying Propagation of Key and Transition in Third Dimension

As mentioned, some embodiments enable the user to modify not just the range of the key and transition in the third dimension (as described in the subsection above), but also how the key and transition propagate through the third dimension. That is, in some embodiments, the user can modify a curve that represents an offset of the key and transition shapes from the third dimension axis at various values along the third dimension axis. Some embodiments automate the modification of the curve for a best fit, while other embodiments enable manual modification of the curve.

Figure 30:
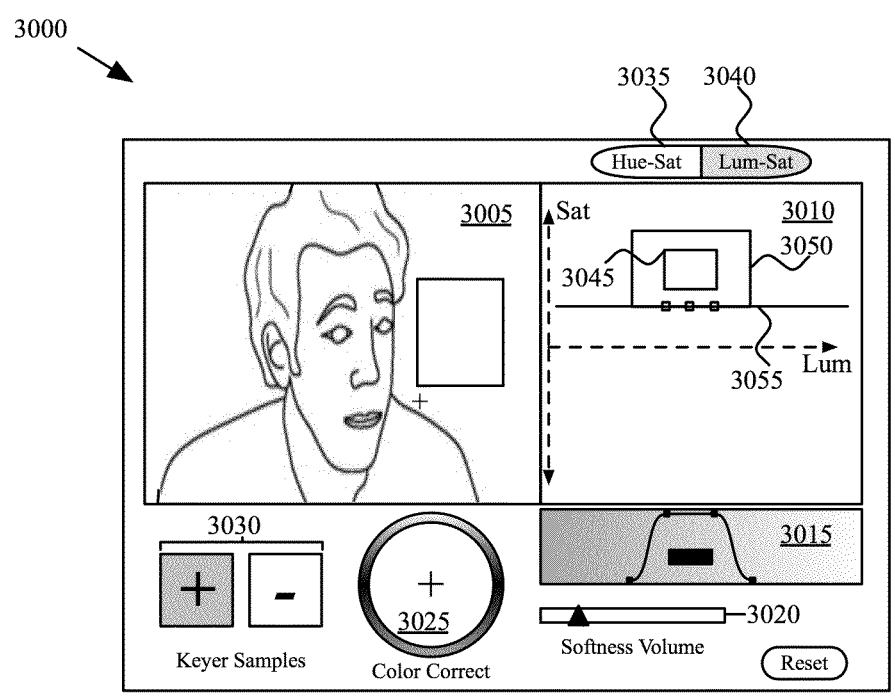
FIG. 30 illustrates a GUI that provides a curve along the third dimension axis for the user to modify.

FIG. 30 illustrates a GUI 3000 that provides such a curve along the third dimension axis for modification by the user. As shown, the GUI 3000 includes an image display area 3005, key display area 3010, third dimension graph 3015, transition region size slider 3020, color correction tools 3025, sampling tools 3030, and key display items 3035 and 3040. With the exception of the key display area 3010 and key display items 3035 and 3040, these various GUI items are similar to those described above (e.g., with respect to FIG. 5).

As shown, the key display area 3010 does not display the same two-dimensional (CbCr or Hue-Saturation) plane as shown in many of the above figures. Instead, the key display area displays the radial aspect of the two-dimensional plane along the vertical axis and the third dimension of the color space along the horizontal axis. In this case, the radial aspect of the two-dimensional plane represents saturation. At the vertical center of the key display area 3015 is zero saturation, and both the top and bottom represent maximal saturation. The third dimension, in this case luminance, runs from zero at the left side to maximal at the right side of the key display area.

In some embodiments, the background of the key display area shows the colors represented by each point in the plane. In general, there will be one basic color in the upper half and one basic color in the lower half, as the center line represents the colorless center of the CbCr plane. For instance, in the example shown in FIG. 30, in which the key and transition are in the green portion of the CbCr plane, the upper half of the luminance-saturation plane will be green (ranging from dark at the left to light at the right and from grayscale at the center to fully saturated at the top). Similarly, the bottom will be pink, as that is the color directly across the center of the CbCr plane from green.

Within the luminance-saturation plane, the key 3045 and transition 3050 are displayed as well. Horizontally, the key and transition regions have the same range as shown in the third dimension graph 3015 in some embodiments, as both represent the luminance axis. Vertically, the range of the key 3045 and transition 3050 is based on the distance of the inner and outer arcs of the key and transition shapes in the two-dimensional plane discussed in the sections above, as will be described in further detail below by reference to FIG. 31.

The key display area 3010 also includes a user-modifiable curve 3055 with three modification points. In some embodiments, as illustrated in further detail below, a user can modify the curve in order to move the key shape up or down along the saturation axis at different luminance values. In some embodiments, the curve is a spline curve (e.g., bezier spline, b-spline, etc.) and the user-modifiable points are the definition points of the spline curve. For instance, when the curve is a bezier spline, the modifiable points are points on the curve at which tangents are defined in order to define the curve. When the curve is a b-spline, the modifiable points are points off the curve that define the curve. For other types of modifiable curves, the modifiable points may define the curve in other ways.

In some embodiments, the user can switch between the two views that have been shown for the key display area 3010 using the key display items 3035 and 3040. Selecting the item 3035 ("Hue-Sat") will display the CbCr (or hue-saturation) plane, as shown in FIG. 5 and subsequent figures. Selecting the item 3040 ("Lum-Sat") will display the luminance-saturation plane, as shown in FIG. 30. While shown as selectable buttons in GUI 3000, different embodiments may use different UI constructs (e.g., hotkeys, menu options, etc.) to enable the user to switch between views. In addition, some embodiments display both of the view options concurrently (as well as the 3D display area, in some cases).

Figure 31:
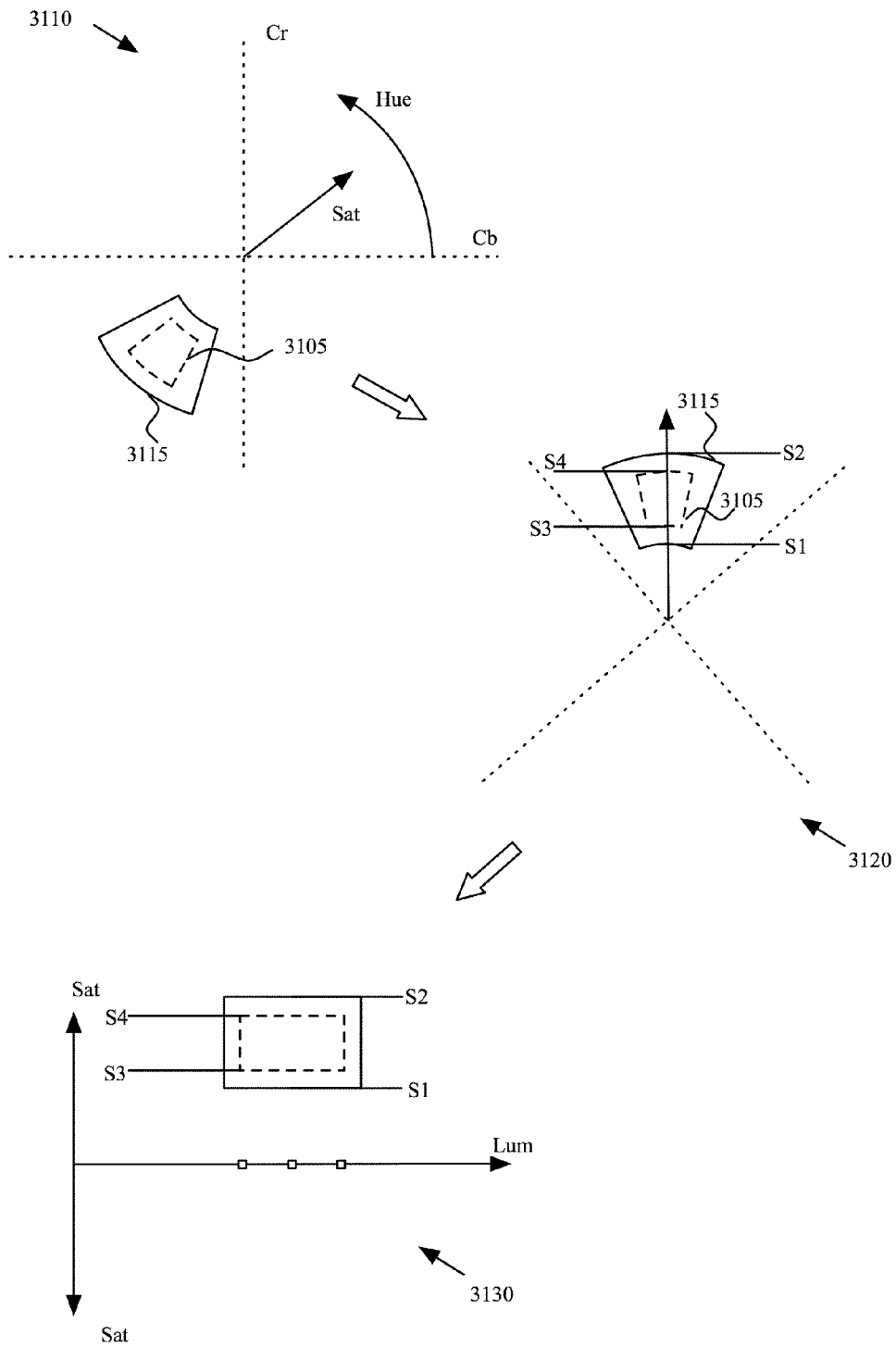
FIG. 31 illustrates the mechanics of a transformation between a hue-saturation view and a luminance-saturation view in the key display area.

Some embodiments animate the transformation between the hue-saturation view and the luminance-saturation view in the key display area. FIG. 31 illustrates the mechanics of this transformation in three stages 3110-3130. The first stage 3110 illustrates a key 3105 and transition shape 3115 in the green region of the Cb-Cr plane. In addition, this stage illustrates that the hue corresponds to an angular coordinate and the saturation corresponds to a radial coordinate in the CbCr plane.

The second stage 3120 illustrates the CbCr plane rotated such that the key and transition shapes are now oriented vertically; that is, a vertical line from the center of the plane will intersect the center of the inner and outer arcs of the key 3105 and transition shape 3115. This stage also illustrates the saturation values S1 and S2 of the inner and outer arcs of the transition shape 3115 and the saturation values S3 and S4 of the inner and outer arcs of the key shape 3105.

The third stage 3130 illustrates the luminance-saturation plane. If one imagines the luminance axis at stage 3120 as sticking directly out of the page (perpendicular to the hue-saturation plane), the color space has been rotated 90° about the vertical saturation axis such that the luminance axis now goes from left to right on the page. Thus, as shown at stage 3130, the saturation values S1-S4 are now at the same distance from the luminance axis as the values were from the center of the plane at stage 3130. The range of the key (and thus the transition region) in the luminance axis at stage 3130 are based on the range of luminance values in a sampled portion of the image in some embodiments. As mentioned, this transition from stage 3110 to stage 3120 to stage 3130 is animated in the key display area of some embodiments when a user selects to view the luminance-saturation plane. Some embodiments also animate the transition from stage 3130 back to stage 3110 when the user selects to view the hue-saturation plane.

Figure 32A:
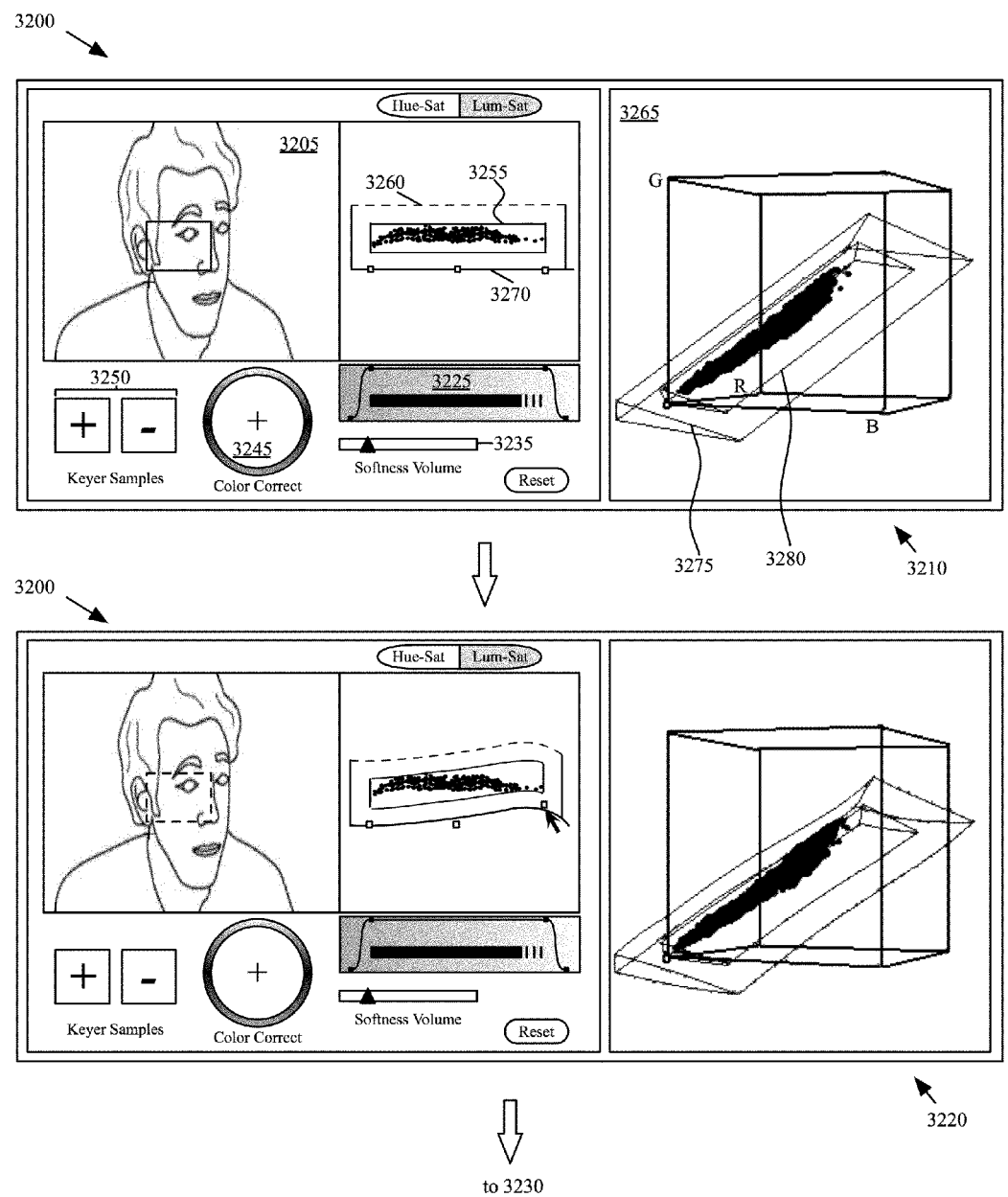
FIGS. 32A-B illustrate an example of direct user modification of the modifiable curve and key shape in the luminance-saturation plane.
Figure 32B:
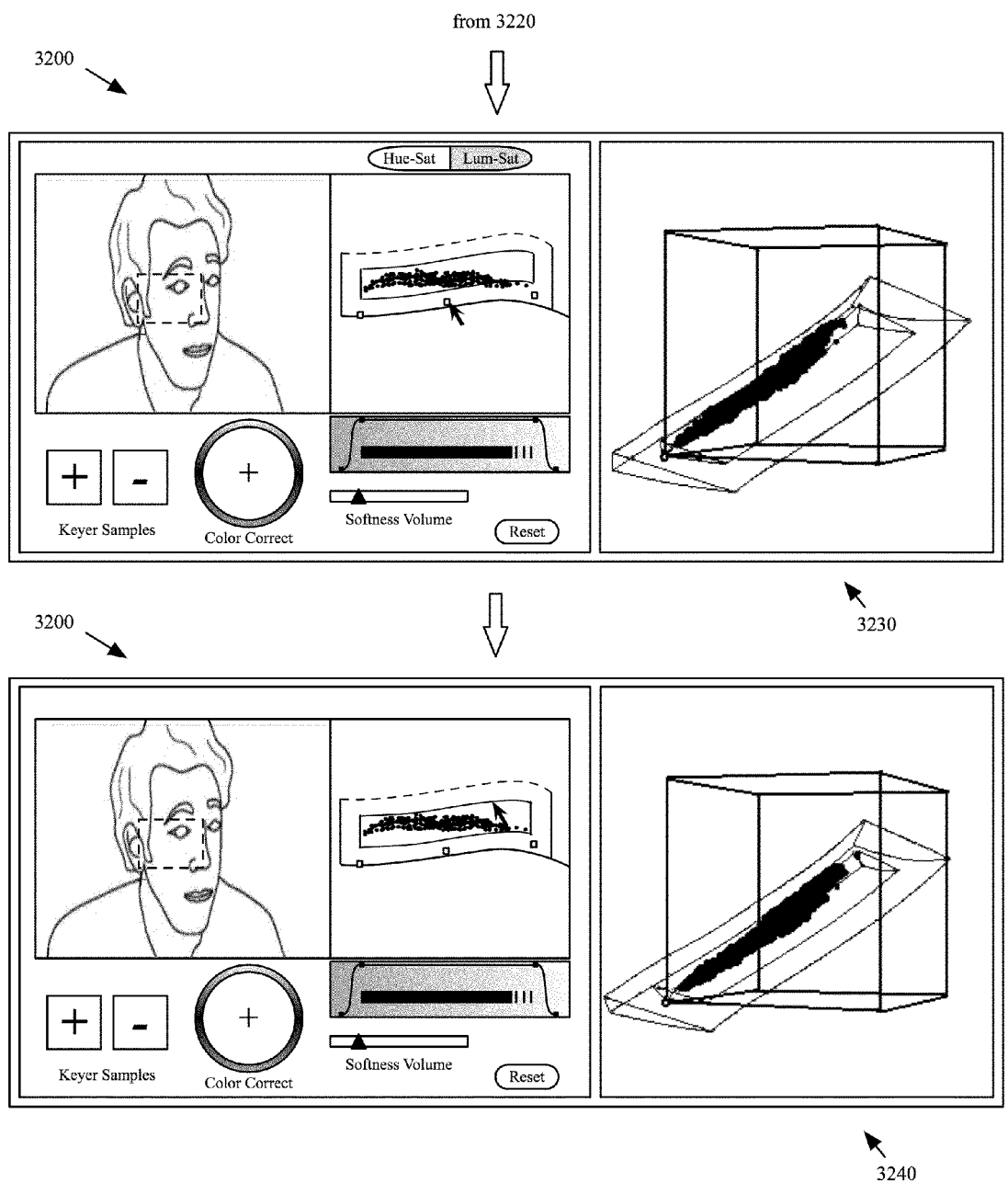

FIGS. 32A-B illustrate an example of direct user modification of the modifiable curve and key shape in the luminance-saturation plane. Specifically, FIGS. 32A-B illustrate a GUI 3200 in four stages 3210-3240, in which a user has made various modifications to the key and transition region through the items displayed in the key display area of GUI 3200. The first two stages 3210 and 3220 are illustrated in FIG. 32A, while the last two stages 3230 and 3240 are illustrated in FIG. 32B. The GUI 3200 includes an image display area 3205, a key display area 3215, a third dimension graph 3225, a transition region size slider 3235, color correction tools 3245, sampling tools 3250, and 3D color space display area 3265.

At stage 3210, the key display area 3215 displays the luminance-saturation plane as described above by reference to FIG. 30 after the user has selected a part of the subject's face in image display area 3205 as a positive sample. In this case, the luminance of the sampled pixels varies extensively, so the key 3255 and transition region 3260 run most of the length of the luminance axis. As skin tones are selected, the saturation axis runs from a reddish hue on the upper half to a bluish-green hue on the bottom. The sampled pixels vary enough that the transition shape in the CbCr plane just encompasses the origin of the plane (the luminance axis), such that the shape in the CbCr plane has a single point rather than an inner arc. Accordingly, in the luminance-saturation plane displayed in key display area 3215, the key region is below the halfway point (as a result, the transition region extends further into the lower half of the plane).

A user-modifiable curve 3270 runs along the luminance axis on the bottom edge of the transition region in the key display area. Three user-modifiable points are displayed on the curve, at the low luminance end of the key, the high luminance end of the key, and halfway in between. In some embodiments, these selectable UI items are the only three points that the user may modify to change the shape of the curve (and with it, the shape of the key and transition regions). In other embodiments, additional or different points along the curve are user-modifiable. In fact, some embodiments allow the user to add user-modifiable points anywhere along the curve (e.g., by double-clicking). Some embodiments limit the number of user-modifiable points (e.g., to 3 or 5) but allow the user to move the points sideways in the plane (i.e., along the luminance axis).

The 3D color space display area 3270 displays a three dimensional color space with key and transition volumes, as described above. In the GUI 3200, the color space display area 3270 displays the RGB space, with the origin in the bottom left and the letters "R", "G", and "B" indicating the three axes. The cube indicates the edges of the color space, as standard RGB values run from 0 to 255 along each axis. The display area 3270 also displays a plot of the sample pixel values, key volume 3275 (which presently encloses the pixel values), and transition volume 3280. At this stage, the two volumes are both prisms. As the luminance axis of some embodiments trends generally at a 45° angle from each of the axes (that is, it runs from the RGB origin towards the RGB point (255, 255, 255), the key and transition volumes are prisms with their edge running along the angle of the luminance axis.

In some embodiments, the 3D color space can be manipulated by the user. The user can drag within the display area (e.g., with a cursor controller, or a finger on a touchscreen) and through various movements turn the color space in order to see different views.

At the second stage 3220, a user has moved the rightmost of the three modifiable definition points on the modifiable curve 3270 upwards. One will note that the modifiable points are not necessarily on the curve, as the curve in this example is a spline defined by points off the curve (e.g., a b-spline). For instance, the middle of the three points is now below the curve, having not moved. As a result of the user dragging the definition point upwards, the curve 3270 shifts upwards on the right side. In some embodiments, the left and right endpoints of the modifiable curve stay fixed, while in other embodiments the endpoints also have selectable UI items that a user can drag as with the points on the interior.

As the user modifies the curve 3270, the key 3255 and transition region 3260 are modified accordingly. As the vertical range of the regions represents the radial ranges in the chroma plane of the key and transition shapes (e.g., the wedges shown in the above examples), modifying the curve moves these shapes further or closer to the center of the plane at different luminance values. The key and transition volumes 3275 and 3280 illustrate this modification, as the edges of the prisms are now in the shape of the modifiable curve (such that the volumes are not true prisms anymore, as the edges are not straight).

At the third stage 3230, the user has moved the middle of the three modification points of curve 3270 upwards, though not as far upwards as the rightmost point. At this stage, some of the sample pixel values are no longer within the keyed region. As a result, in the 3D color space display area 3265, some of the pixel values are outside the key volume 3275. Once the user starts modifying the curve directly, some embodiments indicate that the key is no longer generated solely from the samples by modifying the display of the sample box in the image display area. As shown at stage 3220 (and subsequent stages), the sample box is now displayed with a dashed line.

At the fourth stage 3240, the user has selected the upper and lower edges of the key region 3255 in the luminance-saturation plane and moved them downwards. As a consequence, the upper and lower edges of the transition region 3260 have moved downwards as well. In some embodiments, a user can drag the upper and lower key edges (e.g., with a cursor controller or a finger on a touchscreen) in order to modify the saturation range of the key without modifying the shape of the curve. This will have an effect on the key shape in the chroma plane as well, by moving the inner and outer arcs (or point) to different radial distances in the plane. As the user moves the key edges up and down in the luminance-saturation plane, the transition edges follow in some embodiments so as to stay a fixed distance from the key according to the transition region size value. In addition, some embodiments allow the user to move the transition edges separately so as to increase or decrease the distance between the key and the transition boundaries. To move the lower edge of the transition region, the user can drag the modifiable curve by selecting the curve at a point other than one of its modifiable definition points.

As shown in FIG. 32, modifying the key in the luminance-saturation plane has allowed the user to better fit the key volume to the sample, the chroma values of which may vary by luminance. As a general rule, the more the luminance values of the key vary at different chroma values, the more "empty space" will be in the initially-generated key volume. Some embodiments, though, provide a key tightening feature which automates the fitting of the key to the three-dimensional sample pixel values.

Figure 33:
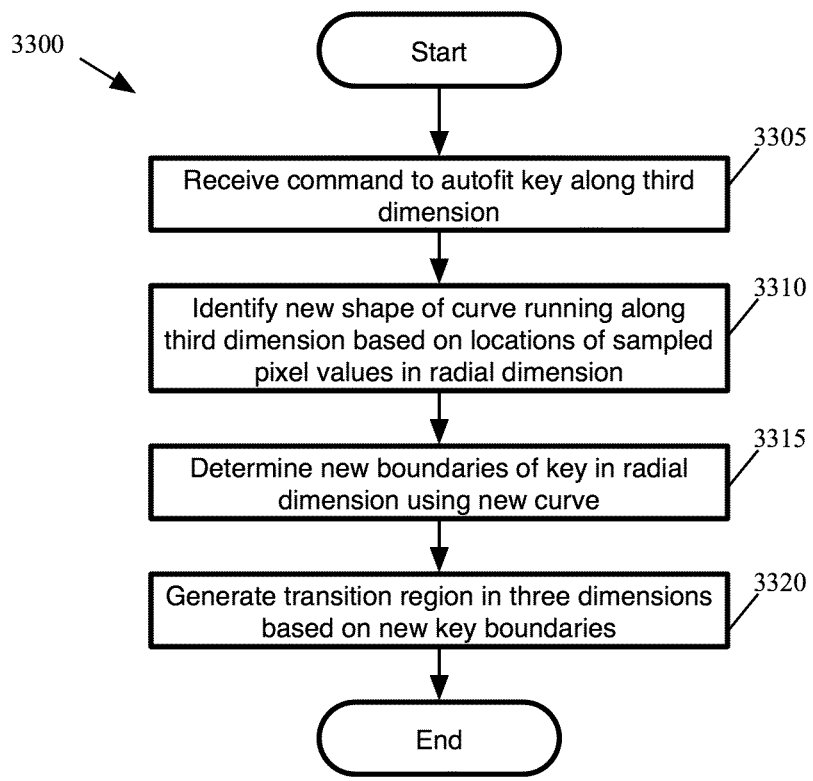
FIG. 33 conceptually illustrates a process of some embodiments for automatically fitting the key volume to a set of sample pixel values in three-dimensions.

FIG. 33 conceptually illustrates a process 3300 of some embodiments for automatically fitting the key volume to a set of sample pixel values in three-dimensions. The process 3300 will be described by reference to FIG. 34, which illustrates a GUI 3400 in two stages 3410 and 3420, before and after autofitting the curve. The GUI 3400 is similar to the GUI 3200, including an image display area 3405, key display area 3415, third dimension graph 3425, transition region size slider 3430, color correction tools 3435, sampling tools 3440, and 3D color space display area 3445. The GUI 3400 also includes an autofitting button 3450, described below.

Returning to FIG. 33, the process 3300 begins by receiving (at 3305) a command to autofit the key along the third dimension. As described in detail above in Section I, some embodiments automatically fit a key shape in a two-dimensional plane (e.g., the CbCr plane) to a projection into that plane of all of the sample pixel values. However, when the sample pixel values vary widely in the third (e.g., Y) dimension, forming the three-dimensional key by extending the key shape as a prism the length of the pixel values in the third dimension may not create a tight fit in three dimensions.

Thus, some embodiments provide an option (e.g., as a user interface tool, a hotkey or set of keystrokes, a menu item, etc.) to better fit the key volume in three dimensions by fitting a curve along the third dimension. On the other hand, some embodiments automatically fit the curve along the third dimension as the key is initially generated from the samples.

Figure 34:
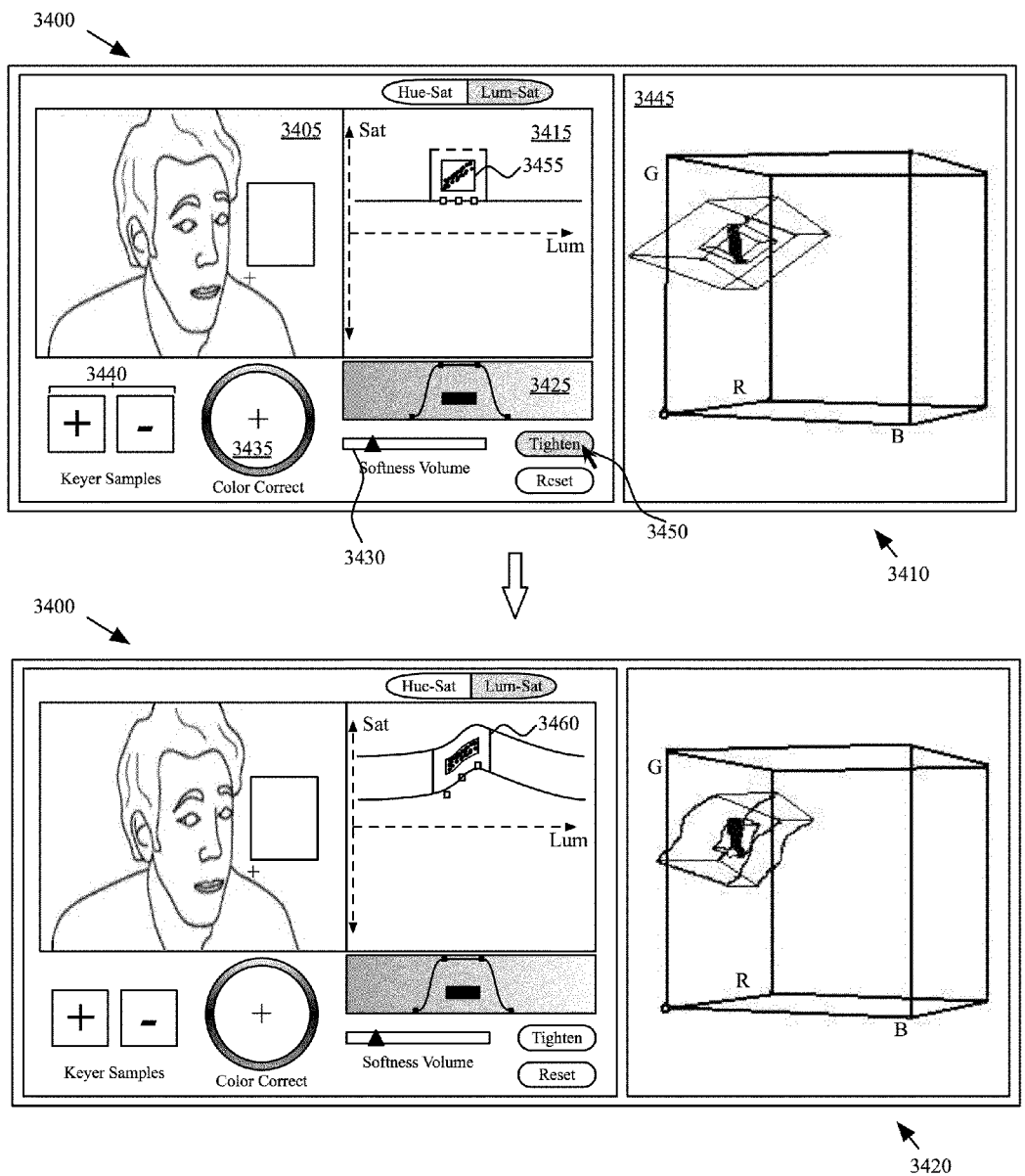
FIG. 34 illustrates a GUI before and after autofitting the modifiable curve of some embodiments.

As shown at stage 3410 of FIG. 34, a user is selecting the autofitting button 3450. The autofitting button 3450 causes the media-editing application to automatically fit the key along the third (in this case, luminance) dimension. As shown in GUI 3400, a user has selected a greenscreen background as sample pixels. However, these sample pixels include a range of luminance and chroma values, possibly due to shadows on the greenscreen. Thus, the initially generated key 3455 includes a significant amount of empty space in the luminance-saturation plane.

The process 3300 identifies (at 3310) a new shape for the curve running along the third dimension based on the locations of the sampled pixel values in the radial dimension of the two-dimensional plane. In the examples shown, that radial dimension is the saturation. Before autofitting, the curve is a straight line that parallels the luminance axis, as shown at stage 3410 of FIG. 34. In some embodiments, the new shape is a spline or other curve that most closely fits the bottom of the sample pixel values in the plane of the third dimension vs. the radial dimension (i.e., the luminance-saturation plane shown in key display area 3415 of FIG. 34). Different embodiments use different algorithms to identify the shape of the curve. One such algorithm is described in detail below by reference to FIG. 35.

Once the curve is identified, the process determines (at 3315) the new boundaries of the key in the radial dimension using the new curve. The key boundaries (i.e., the curve running along the third dimension axis) may need to be shifted up or down in the radial dimension such that all of the sample pixel values remain within the key in three dimensions. For the lower boundary (corresponding to the inner arc of the two-dimensional plane), some embodiments find the highest location at which all of the sample pixel values are still above the boundary. Similarly, for the lower boundary, the application finds the lowest location at which all of the sample pixel values are still below the boundary. The boundaries in the third dimension do not change in some embodiments, as these are determined by the highest and lowest sample pixel values in the third dimension.

The process 3300 then generates (at 3320) the transition region in three dimensions based on the new boundaries. To generate the transition region, some embodiments use the same curve that runs along the third dimension as for the key. Unless the transition region size value has been modified, the distance in the radial dimension between the key and the transition boundary does not change. Thus, as the key shape (e.g., the wedge shape) moves in and out radially in the two-dimensional plane at different values along the third dimension axis, the transition shape will follow.

Stage 3420 of FIG. 34 illustrates the result of the autofitting function in GUI 3400. The key 3455 in the luminance-saturation plane is modified so as to very tightly fit the sample pixel values. As shown, the transition region 3460 is also modified in the luminance-saturation plane in accordance with the changes to the key 3455. The difference in the keys can be seen in the 3D color space display area 3445. At stage 3420, the shape is significantly smaller while still enclosing the entirety of the sample pixel values.

While these examples are shown without any negative (exclusionary) samples, in some embodiments such samples affect the boundaries of the transition region. For example, if the negative sample pixel values have the same chroma value as the key, but a luminance value outside the range of the key, some embodiments will shorten the transition in the luminance dimension, as described above. Similarly, the upper or lower boundaries of the transition region in the luminance-saturation plane may be shifted closer to the key to account for the negative sample pixel values. This corresponds to moving the inner or outer arcs in the chroma plane, as described in detail in the above sections.

Figure 35:
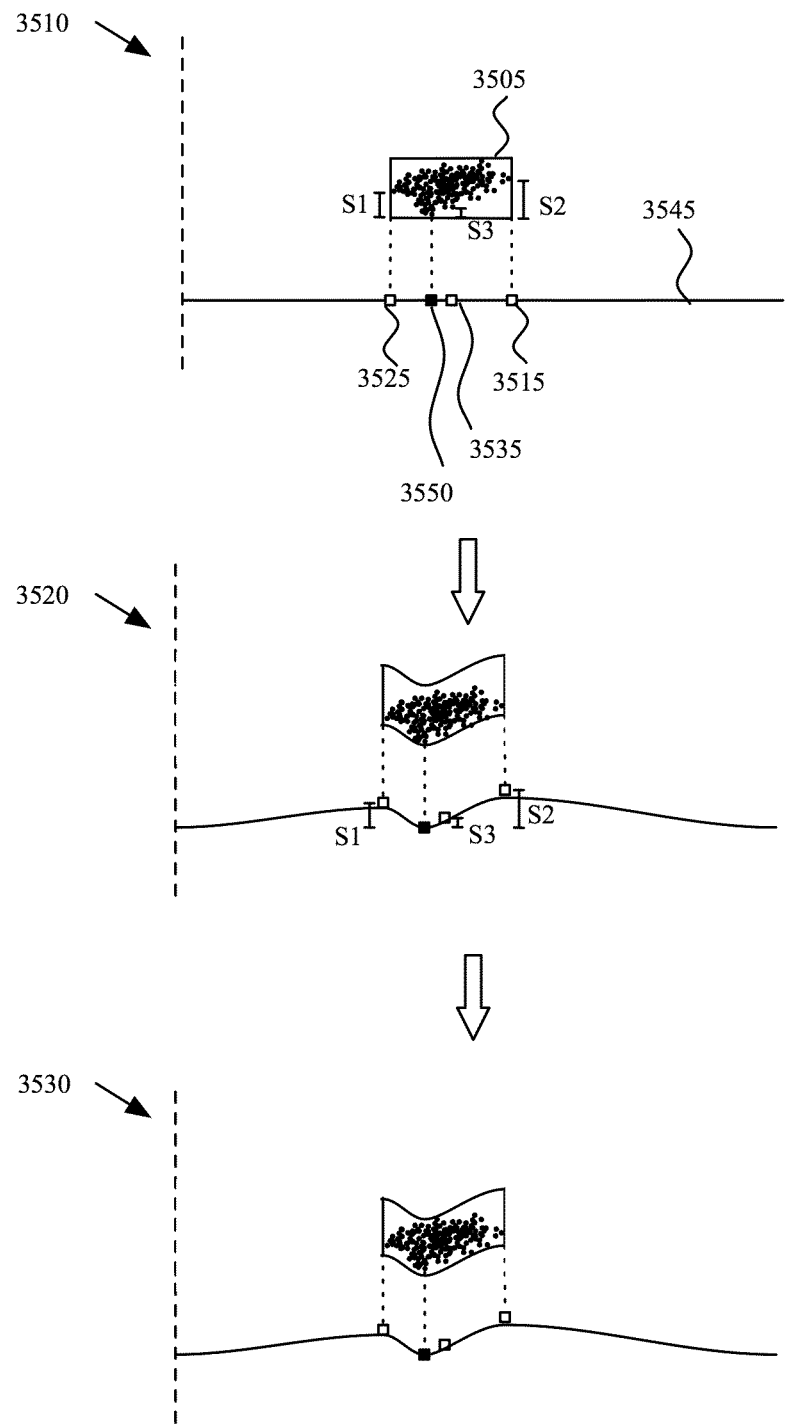
FIG. 35 illustrates one algorithm for auto-fitting the boundary of the curve along the third dimension for a tighter key.

As mentioned, FIG. 35 illustrates one algorithm for autofitting the boundary of the curve along the third dimension for a tighter key. FIG. 35 visually illustrates this algorithm in three stages 3510, 3520, and 3530. Illustrated at stage 3510 is a plot of pixel values (e.g., in the luminance-saturation plane), a key 3505, and a modifiable curve 3515 with three definition points 3525, 3535, and 3545. The definition points 3525 and 3545 are at the left and right (i.e., low luminance and high luminance) edges of the key, and the definition point 3535 is halfway in between.

The modifiable curve 3515, between the points 3525 and 3545, represents the path of the upper and lower borders of the key 3505. At stage 3510, the modifiable curve 3515 is a straight line. Stage 3510 also illustrates two values, S1 and S2. S1 is the vertical distance (i.e., saturation difference) between the leftmost (i.e., lowest luminance) pixel value and the lowest (i.e., lowest saturation) pixel value in the sample. Similarly, S2 is the vertical distance between the rightmost (i.e., highest luminance) pixel value and the same lowest pixel value in the sample, and S3 is the vertical distance between the lowest pixel value at the midpoint and the lowest pixel value overall. The point 3550 corresponds to the luminance value of the lowest saturation point in the set of sample pixels.

Stage 3520 illustrates that the left definition point 3525 is moved upwards by the amount S1, the right definition point 3545 is moved upwards by the amount S2, and the middle definition point 3535 is moved upwards by the amount S3. The point 3550, on the other hand, is fixed. As shown, the curve 3515 does not actually run through the definition points, as the example curve is a spline whose definition points are not necessarily on the curve (e.g., a b-spline). The key 3505 is tight fitting at the bottom (though excluding a few sample pixel values slightly) and off the samples at the top.

Stage 3530 illustrates the final key. The bottom and top (i.e., low saturation and high saturation) edges of the key 3505 are not changed in shape from the previous stage (they are still the same shape as the curve 3515). The bottom edge is shifted downwards so as to include the entire sample within the key, and the top edge is shifted downwards to bring the curve into contact with the sample pixel values.

The algorithm illustrated pictorially in FIG. 35 is only one possible algorithm that may be used by the keyer to tighten the key around the pixel values. For instance, some embodiments apply a similar process separately to the upper boundary of the key, which works especially well in situations such as the one pictured, in which the upper boundary of the pixel values is a different shape than the lower boundary of the pixel values. Some embodiments use more than three definition points, although as the number of points increases so does the amount of computation required to autofit the key.

IV. Automatic Keying

The above sections describe in detail a keying process of some embodiments that is based on a sample of pixels from an image. In some embodiments, the media-editing application automatically generates a key for an image as the application opens the image, without any further user interaction. Some embodiments automatically generate a key for a bluescreen or greenscreen background of the image. To identify the automatic key, some embodiments first identify whether the background of the image is a bluescreen or greenscreen. The application then identifies pixels in the image that are likely in the bluescreen or greenscreen, and uses these pixels as the sample. To identify the pixels, some embodiments use a 3D histogram in a color space.

Figure 36:
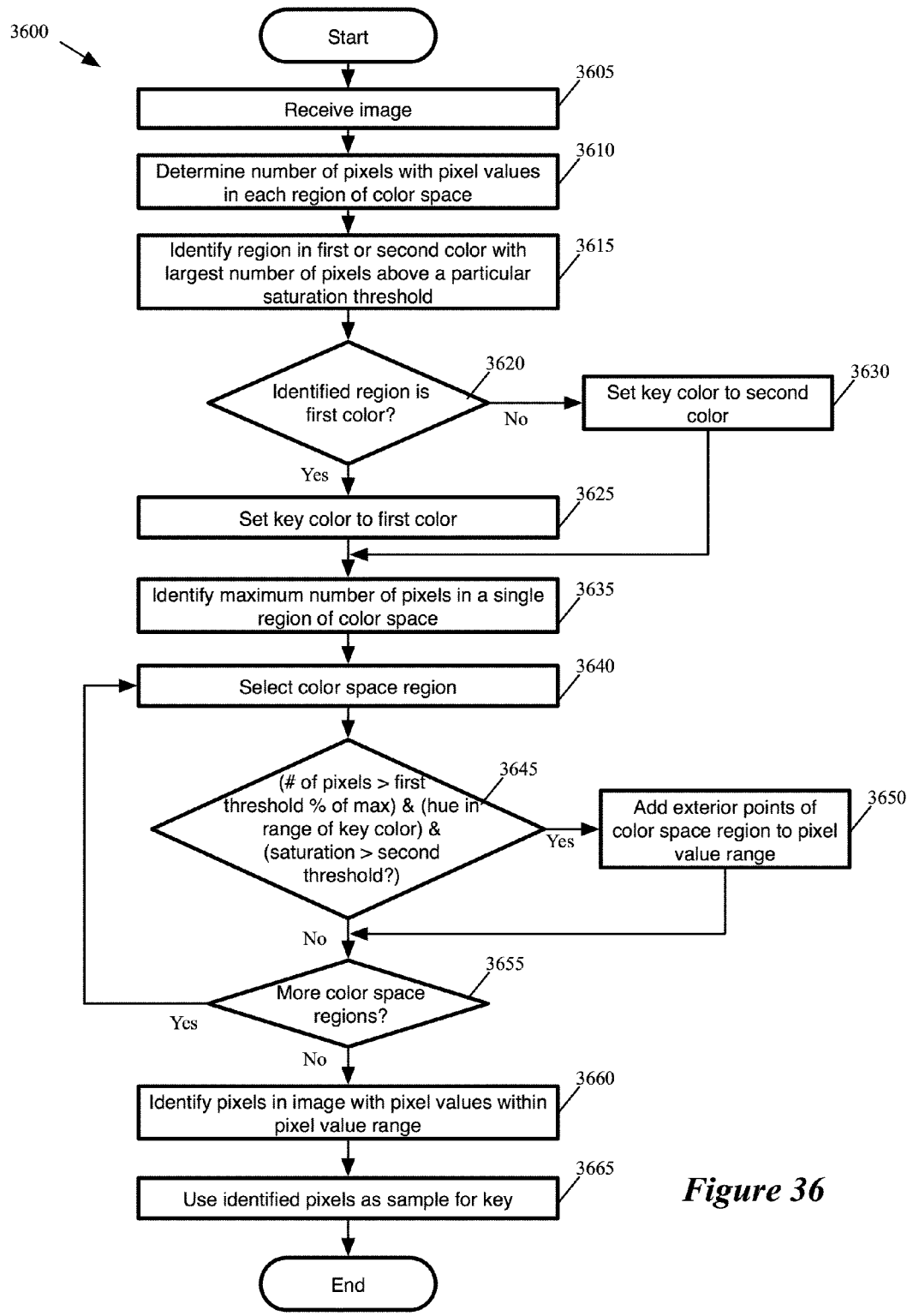
FIG. 36 conceptually illustrates a process 3600 of some embodiments for automatically generating a key for an image.

FIG. 36 conceptually illustrates a process 3600 of some embodiments for automatically generating a key for an image. As shown, the process receives (at 3605) an image. This may be the result of a user opening an image in the media-editing application. In some embodiments, the image can be a photograph or other still image, a video picture (e.g., a frame or field of video), etc.

The process then determines (at 3610) the number of pixels of the image with pixel values in each of a set of regions of a color space. Some embodiments break a color space (e.g., the RGB space) into a set of regions and identify, for each region, the number of pixels that fall into the region. This is essentially a 3D histogram for the color space, which is stored in memory. For an orthogonal color space such as RGB, some embodiments break the color space up into equally-sized cubes.

Figure 37:
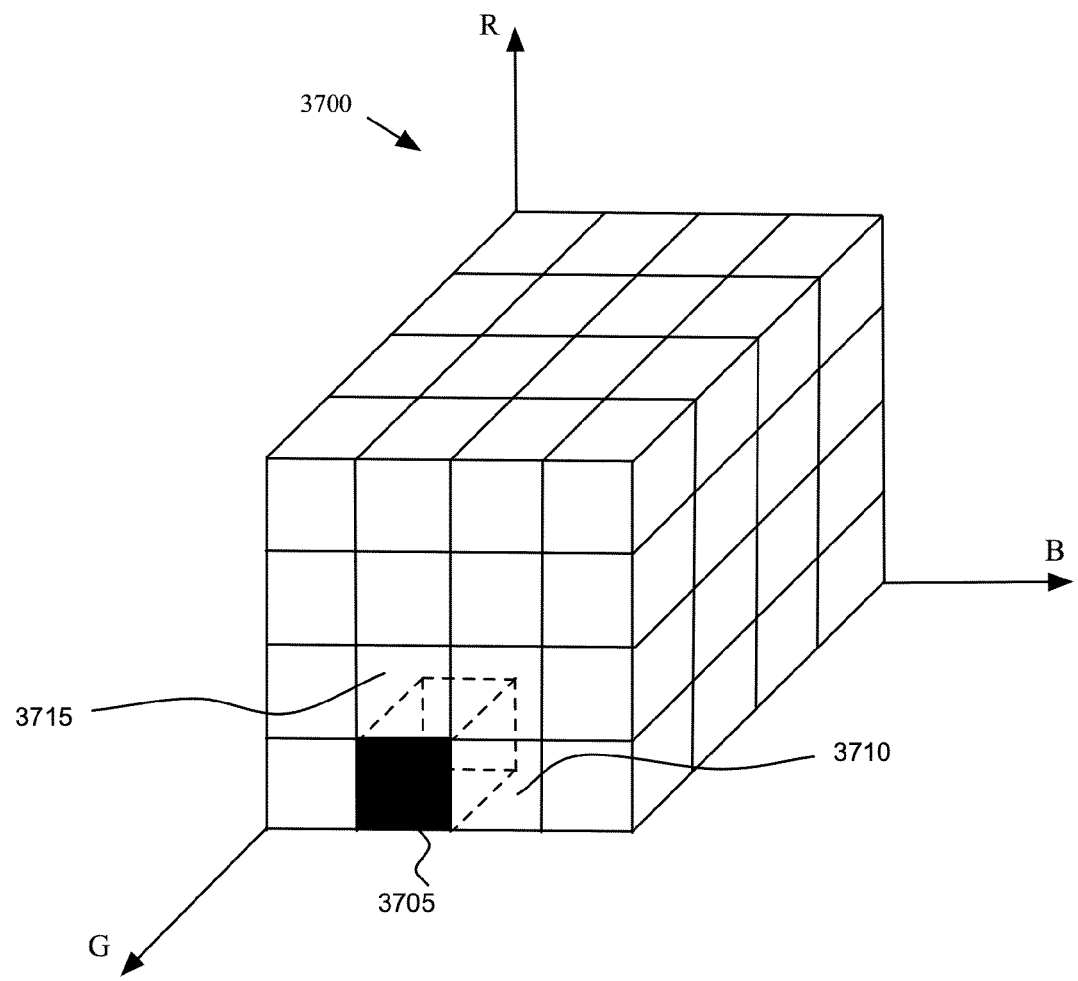
FIG. 37 illustrates the RGB space broken up into 64 cube-shaped regions.

FIG. 37 illustrates the RGB space 3700 broken up into 64 (4×4×4) cube-shaped regions, though various embodiments will use different sizes for the regions of color space (e.g., 512 (8×8×8) or 4096 (16×16×16) cubes). As each coordinate in RGB space can have a value from 0 to 255, the sides of the cubic regions have a length of 64. Some embodiments identify the pixel values (e.g., RGB values) of each pixel in the image and identify the region of the color space for the pixel. For instance, in the given example, a pixel with an RGB triplet of (15, 180, 65), would be in the region of RGB space that runs from 0 to 63 in red, 128 to 191 in green, and 64 to 127 in blue. This is region 3705 in the color space 3700.

Some embodiments graphically display the number of pixels in each region to the user. For instance, some embodiments display a three-dimensional color space such as FIG. 37 with a shape (e.g., a sphere) in each region sized relative to the number of pixels in that region. Thus, some embodiments display, in the region with the largest number of pixels, a sphere that bounds the edges of the region, and display spheres sized relatively to this sphere in each of the other regions. Some embodiments also color the spheres in accordance with the region of color space they represent.

The process 3600 then identifies (at 3615) the region of the color space in either a first or second color with the largest number of pixels above a particular saturation threshold. In some embodiments, the first and second colors are green and blue, and certain regions of the color space are classified as either green or blue (i.e., green regions are those with high green values and lower blue and red values, with blue regions defined similarly). The process determines, of those blue and green regions, which has the highest number of pixels that have a saturation value above a particular threshold. It is possible that, due to the spread in the color space of a region, it may include pixels that are both above and below the particular saturation threshold, especially since areas of constant saturation will not correspond to cubic region boundaries in RGB space.

The process then determines (at 3620) whether the identified region is associated with the first color (e.g., green). When the region is associated with the first color, the process sets (at 3625) the key color to the first color. If the region is not associated with the first color, then it will be associated with the second color (e.g., blue), and thus the process sets (at 3630) the key color to the second color. In some embodiments, when there is no region in either of the two colors, the process ends without auto-generating a key as there is neither a bluescreen nor a greenscreen.

With the key color set, the process identifies (at 3635) a maximum number of pixels in a single region of color space. That is, the process identifies the region of the color space with the maximum number of pixels and determines the actual number of pixels in that region. When the image includes a bluescreen or greenscreen background, the region with the highest number of pixels will usually correspond to the background color.

The process then iterates through the color space regions to determine whether each region should be part of an initial key for the image. The process selects (at 3640) a region of the color space. Some embodiments, when iterating through the RGB space, start at the cube that includes the origin (in the color space 3700, this is the cube that runs from 0 to 63 in each of the coordinates) and iterate outwards.

Some embodiments, however, use various methods to reduce the amount of computation required. Some embodiments order the color space regions using the histogram, such that the regions with the highest number of pixels are evaluated first. Some embodiments exclude certain regions—for instance, regions that only cover low-saturation areas of the color space. Pixels that have equal R, G, and B values will be grayscale, so if the pixel values are close to equal for all three coordinates, the saturation will be low. Some embodiments will also exclude regions that are not in the key color hue range (e.g., pure red regions).

For the selected region, the process determines (at 3645) whether (i) the number of pixels in the region is greater than a first threshold percentage of the maximum number identified at 3635, (ii) the hue of the pixels is in the range of the key color, and (iii) the saturation of the pixels is greater than a second threshold. Some embodiments narrow the total number of pixels by applying the latter two tests first, as a color space region could include both pixels that meet the tests and pixels that do not meet the tests. Other embodiments simply decide beforehand for each region of color space whether that region meets the hue and saturation requirements, and only test the regions that meet these requirements.

When the selected region meets the tests at 3645, the process adds (at 3650) the exterior points of the color space region to a pixel value range. When the color space regions are cubes, these exterior points are the eight vertices of the cube. Similarly, when the color space regions are other polyhedrons, the exterior points are the vertices of the polyhedron. The pixel value range is a set of pixel values stored in memory that is used to identify image pixels for the auto-keyer.

The process next determines (at 3655) whether more color space regions need to be evaluated. In some embodiments, as mentioned, the process iterates through all of the regions of the color space. Other embodiments, though, order the regions by the number of pixels, and stop evaluating regions once the number of pixels drops below the first threshold percentage of the maximum. When more regions remain for evaluation, the process returns to 3640 to select and evaluate the next region.

Once the process has evaluated all of the color space regions, the process identifies (at 3660) pixels in the image with pixel values within the pixel value range. In some embodiments, the range runs from the lowest value in each coordinate of color space to the highest value. Thus, in RGB space, the range would always be a rectangular prism. In other embodiments, each of the regions added to the range is treated separately, so if the regions form an L-shape, only the pixels whose pixel values fall into that shape are identified. An example of such an L-shape would be the three regions 3705, 3710, and 3715 in color space 3700 of FIG. 37.

The process then uses (at 3665) the identified pixels as a positive sample for the key. In some embodiments, the key is generated using the chroma keyer described in the above sections. Thus, some embodiments evaluate the key color and identify sample pixels using a first color space (e.g., RGB) and then convert the identified sample pixels into a second color space (e.g., YCbCr) to generate the key. Other embodiments may use different keyers (e.g., in different color spaces or using different methods to generate a key in the YCbCr plane). Once the key is automatically generated as the image is opened, the user can then modify the key or reset the key if he is unhappy with the results. If the key does a good job of isolating the bluescreen or greenscreen, the user can start editing the image without having to generate a key.

In addition, some embodiments automatically generate sample shapes in an autokeyed image, that the user can then manipulate in order to adjust the key. Some embodiments use the process 3600 (or a similar process) to identify a key for the image, then use the key to identify sample shapes in the keyed region.

Figure 38:
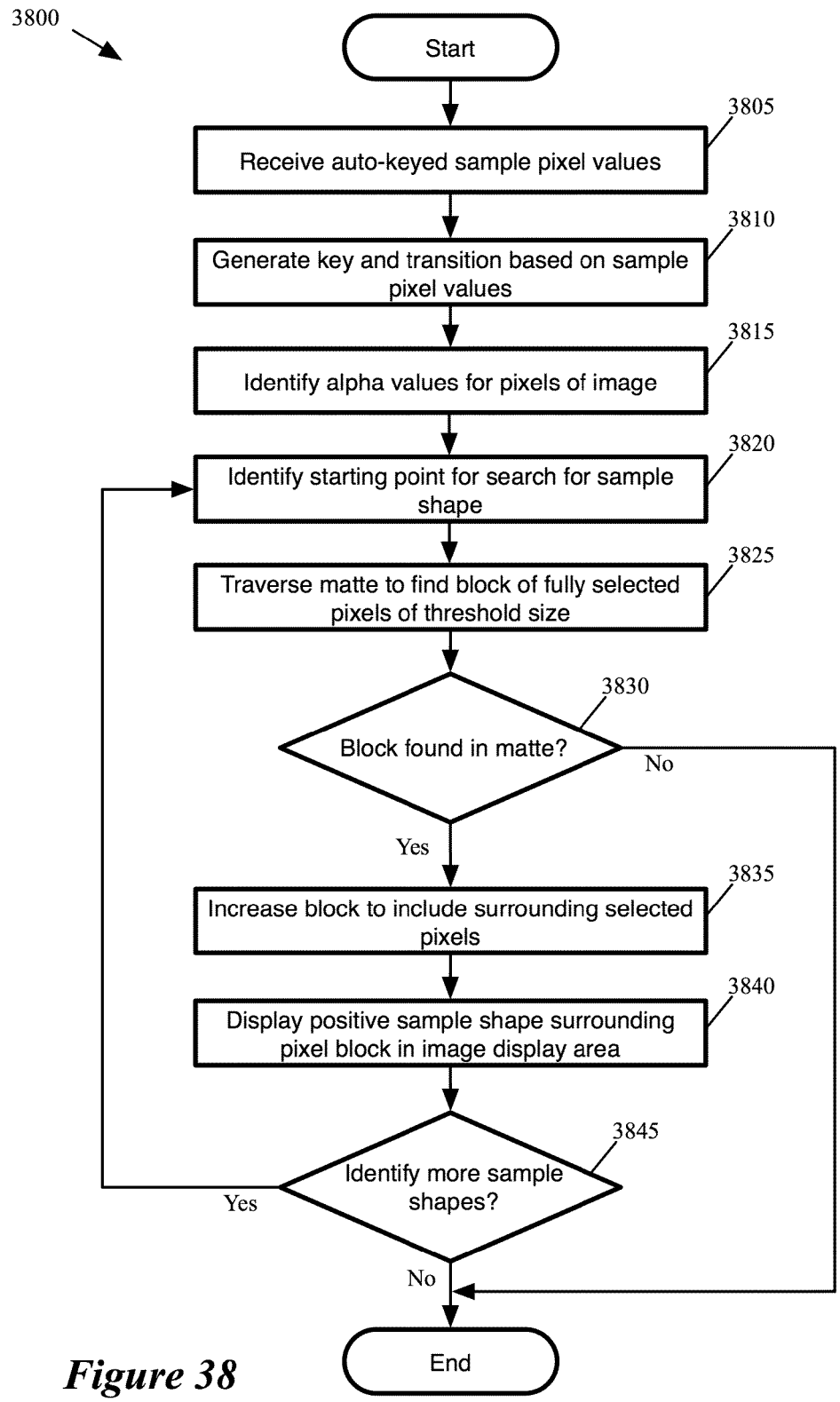
FIG. 38 conceptually illustrates a process of some embodiments for generating sample shapes for an autokeyed image.

FIG. 38 conceptually illustrates a process 3800 of some embodiments for generating such sample shapes for an autokeyed image. The process 3800 will be described by reference to FIG. 39, which illustrates a matte 3900 (i.e., the alpha values) of an image and three stages 3910-3930 identifying sample shapes for the image.

As shown, the process 3800 begins by receiving (at 3805) auto-keyed sample pixel values. The sample pixel values may be generated by a process such as process 3600 that identifies a background color of an image and picks out a region of a color space corresponding to the background. Pixels in that region of color space are then used as sample pixels.

The process then generates (at 3810) a key and transition region based on the received sample pixel values. Some embodiments generate the key and transition region as described above in Section I. That is, the media-editing application generates a wedge for the key to enclose the sample pixels, and then generates a larger wedge that encloses the key for the transition region.

Figure 39:
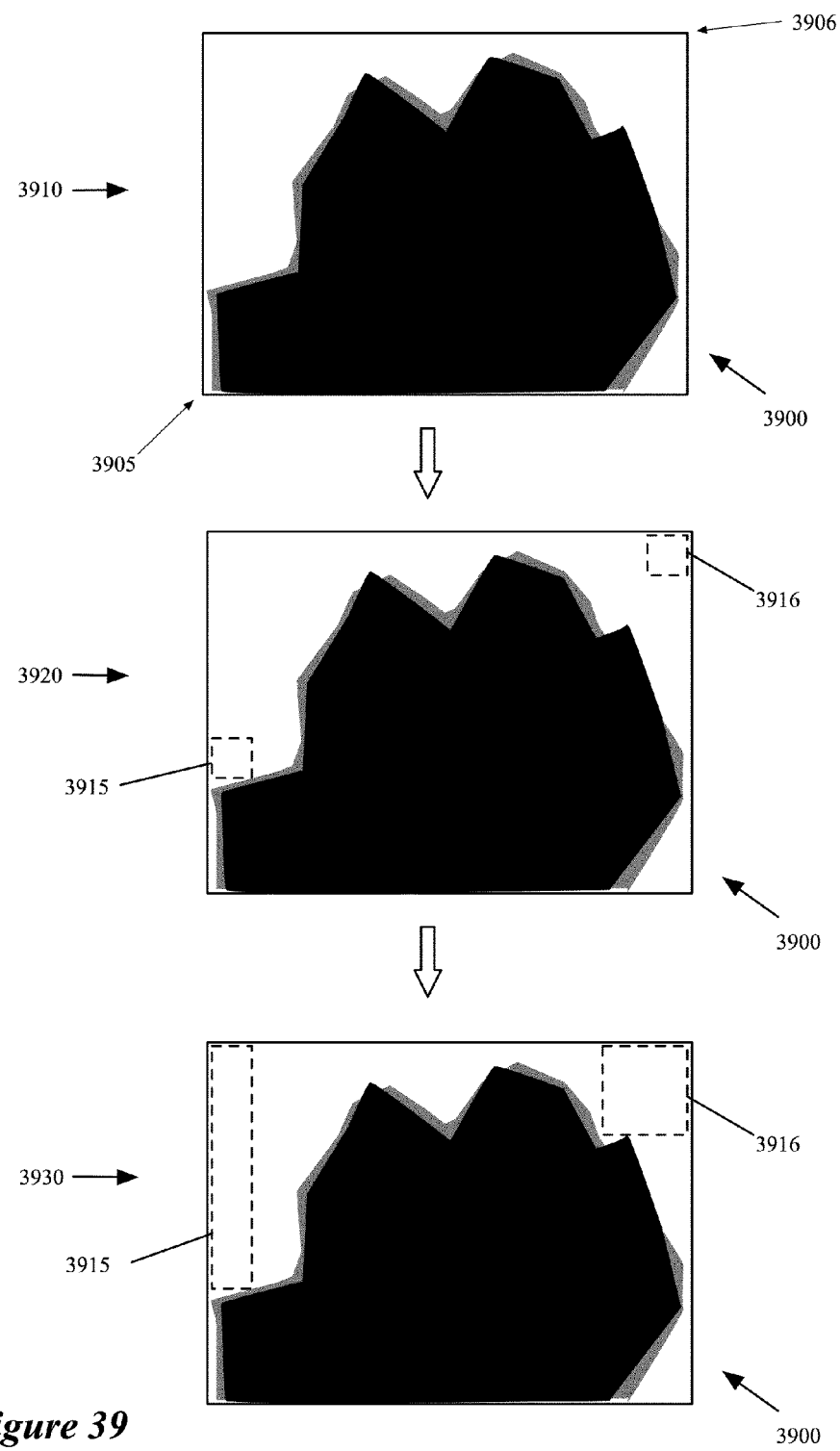
FIG. 39 illustrates identifying sample shapes in a matte of an image.

Next, the process identifies (at 3815) alpha values for the pixels of the image. As described above, each pixel in the image maps to a point in the color space of the key, and each point in the color space is associated with an alpha value based on the key and transition region. The alpha channel of an image is called a matte for the image. FIG. 39, as mentioned illustrates a matte 3900 for an image. The matte 3900 includes a background area of alpha=1, a main subject area of alpha=0, and a transition area of 0<alpha<1.

The process 3800 then identifies (at 3820) a starting point for searching for a sample shape in the image. Different embodiments start from different points in the matte. As shown at stage 3910, which illustrates starting points 3905 and 3906 some embodiments start at the lower left corner and the upper right corner. While FIG. 39 illustrates concurrent searching of the matte for a region to use as a sample shape, some embodiments, as conceptually illustrated by process 3800, perform one search at time. Some embodiments start searches in the middle of the matte moving outward, in a corner of the matte, etc.

With the starting point identified, the process traverses (at 3825) the matte to attempt to find a block of fully selected pixels of a threshold size. A fully selected pixel, as described above, is a pixel with alpha value of 1. Some embodiments will also allow pixels with alpha values very close to 1 (e.g., 0.98 or greater). Various embodiments search for square blocks, circular blocks, hexagonal blocks, etc. For instance, some embodiments search for a 20×20 square block of pixels. Some embodiments start in the lower left corner and traverse the matte horizontally, then move up one pixel and traverse again, continuing this until a block of the threshold size is found or the entire image is searched. Other embodiments traverse the image in a zigzag fashion from the starting point (i.e., from the bottom left corner, move one pixel to the right, then up and left to the left edge, then one pixel up, then down and right to the bottom edge, etc.).

Stage 3920 of FIG. 39 illustrates blocks of pixels identified in the matte for starting points 3905 and 3906. Starting from point 3905 (the bottom left corner), the block 3915 is identified along the left edge. Starting from point 3906 (the upper right corner), the block 3916 is identified in the upper right corner. As the upper right corner is part of the background, as soon as the traversal process begins the block is identified.

The process then determines (at 3830) whether a block of pixels, of at least the threshold size, having alpha values of 1, was found in the matte. When no such block can be found, the process ends. Otherwise, the process increases (at 3835) the block to include surrounding selected (i.e., alpha=1) pixels. Some embodiments will also include pixels with alpha very close to 1 (e.g., alpha>0.98) in the block as well. Some embodiments attempt to expand by one pixel along a first edge, then a second edge, and so on, until back to the first edge. When all of the pixels from an edge expansion are selected, the process will continue to expand that edge. Once an edge cannot expand any further, only the remaining edges are expanded in their respective directions.

Stage 3930 of FIG. 39 illustrates the blocks 3915 and 3916 expanded to include more pixels. The block 3915 expands upwards to the top of the image. The block 3916 expands downward and leftward until non-selected pixels are encountered. These blocks 3915 and 3916 will be the automatically-generated sample shapes for the image.

With the block identified, the process 3800 displays (at 3840) a positive sample shape surrounding the pixel block in the image display area. The positive sample shape, in some embodiments, appears the same as a positive sample shape drawn by a user with a positive sampling tool such as is described above in Section I. These sample shapes can be manipulated (e.g., deleted, moved, modified) by the user to further refine the key if desired.

The process then determines (at 3845) whether to identify any more sample shapes in the image. For example, some embodiments identify two sample shapes, one starting from the lower left and one starting from the upper right (or the other two corners). Other embodiments identify four (e.g., one from each corner) shapes or any other number of shapes. When there are more sample shapes to identify, the process 3800 returns to 3820 to identify the next starting point. Otherwise, the process ends.

Figure 40:
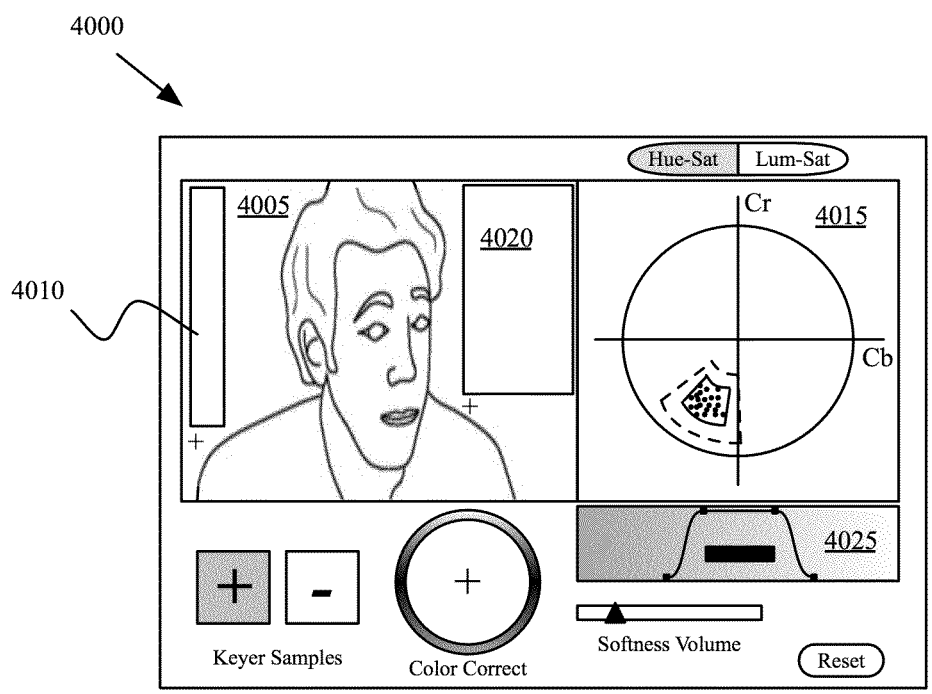
FIG. 40 illustrates a GUI directly after a user has opened an image with the media-editing application of some embodiments that uses an autokeyer and applies processes similar to those of FIG. 36 and FIG. 38.

FIG. 40 illustrates a GUI 4000 directly after a user has opened an image with the media-editing application of some embodiments that uses an autokeyer and applies processes similar to process 3600 and process 3800. The GUI 4000 includes similar elements to those described in detail above for FIG. 5. As a result of the auto-keying (e.g., process 3600) a key and transition region are generated for the image, as illustrated in the key display area 4015 and third dimension graph 4025. In addition, sample shapes 4010 and 4020 identified (e.g., using process 3800) for the key are displayed in the image display area 4005.

V. Color Correcting a Selection of an Image

As described above, the keyer of some embodiments is used by a media-editing application to identify a selection of an image. A user can then perform edits, such as color correction, which the media-editing application applies to the selection. When a particular pixel is partially selected, the edits are applied to the particular pixel only to the extent that it is selected.

Figure 41:
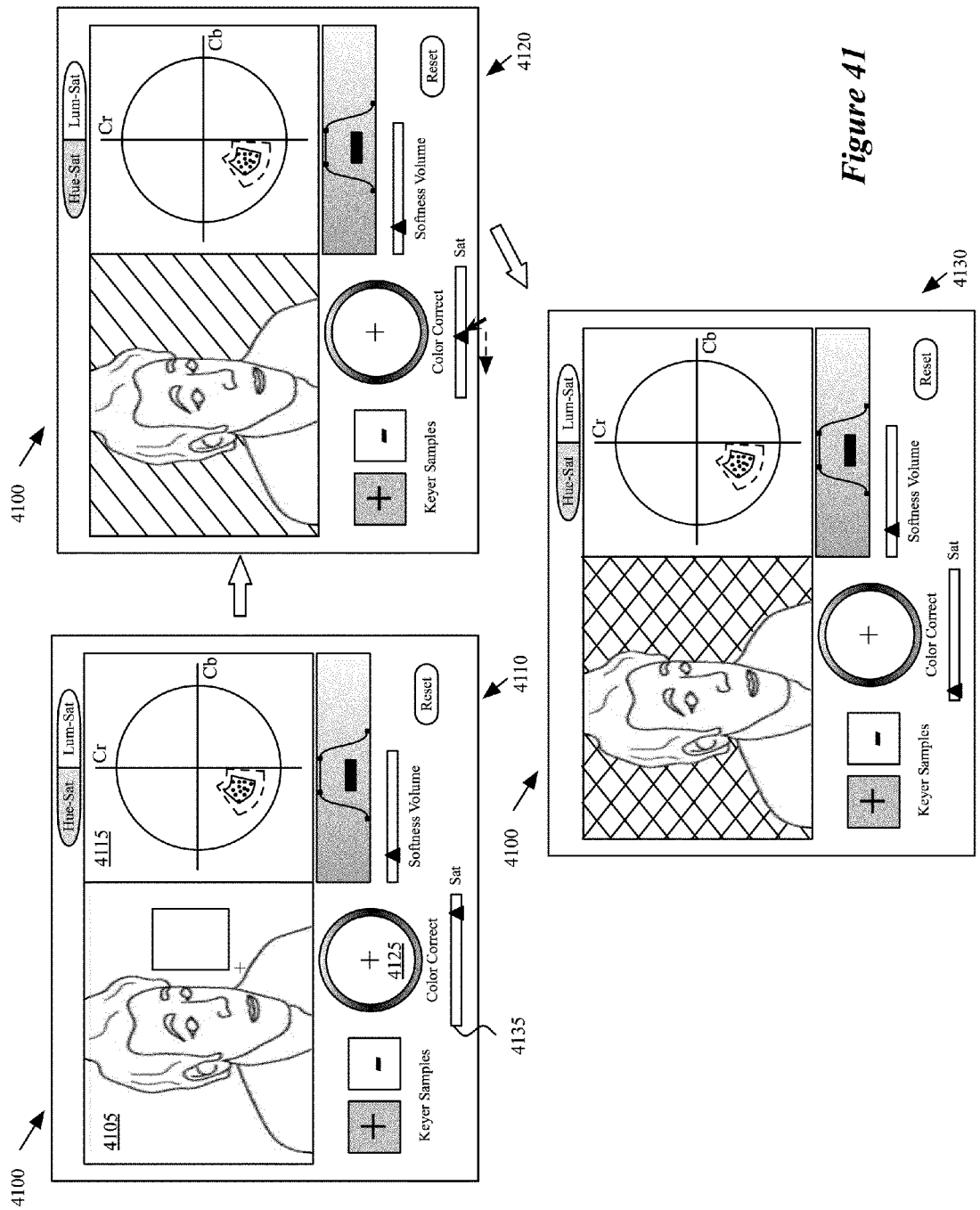
FIGS. 41 and 42 illustrate different examples of editing a selection of an image.
Figure 42:
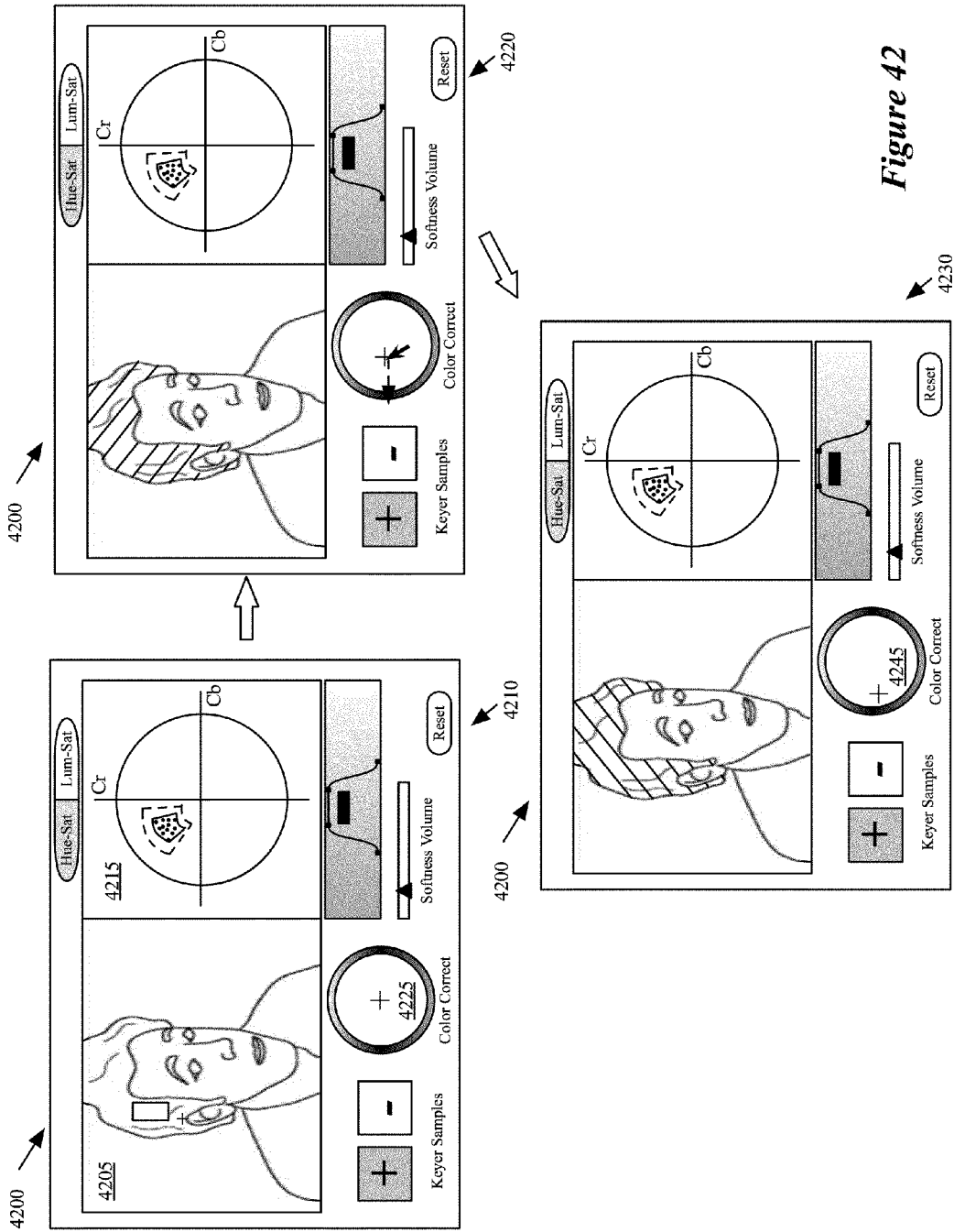

FIGS. 41 and 42 illustrate different examples of editing a selection of an image. FIG. 41 illustrates a GUI 4100 in three stages 4110-4130 in which a user modifies the background of an image. The GUI 4100 includes an image display area 4105, a key display area 4115, and many of the other GUI items described above. For color correction tools, the GUI 4100 includes a color wheel 4125 and a saturation slider 4135. The color wheel 4125 enables a user to change the color of a selected region, while the saturation slider 4135 enables the user to increase or decrease the saturation of a selected region. Various embodiments will also include additional color correction tools.

As shown at the first stage 4110, the user has drawn a positive sample shape in the background of the image displayed in image display area 4105, resulting in a key and transition region displayed in the key display area 4115. The keyed portion of the color space corresponds to the color in the background of the image.

At stages 4120 and 4130, the user moves the saturation slider 4135 to the left in order to decrease saturation. As a result, the selected area (the entire background) is modified in these stages. By stage 4130, the media-editing application completely removes the saturation from the background of the image, resulting in a grayscale background. In some embodiments, users perform such saturation removal in order to enable the image (or video of which the image is a part) to be composited with a background scene.

FIG. 42 illustrates a GUI 4200 in three stages 4210-4230 in which a user modifies a portion of a subject of the image. The GUI 4200, similar to the GUI 4100, includes an image display area 4205, a key display area 4215, a color wheel 4225, and various other GUI items described above.

As shown at the first stage 4210, the user has drawn a positive sample shape in the hair of the subject of the image displayed in image display area 4205, resulting in a key and transition region displayed in the key display area 4215. The keyed portion of the color space corresponds to the color of the subject's hair.

At stages 4220 and 4230, the user moves the center of the color wheel 4225 to the left in order to modify the color of the selected portion of the image. As a result, the selected area (the hair of the subject) is modified in these stages. By stage 4230, the media-editing application has completely changed the color of the subject's hair in the image (e.g., from red to blonde).

VI. Software Architecture

Figure 43:
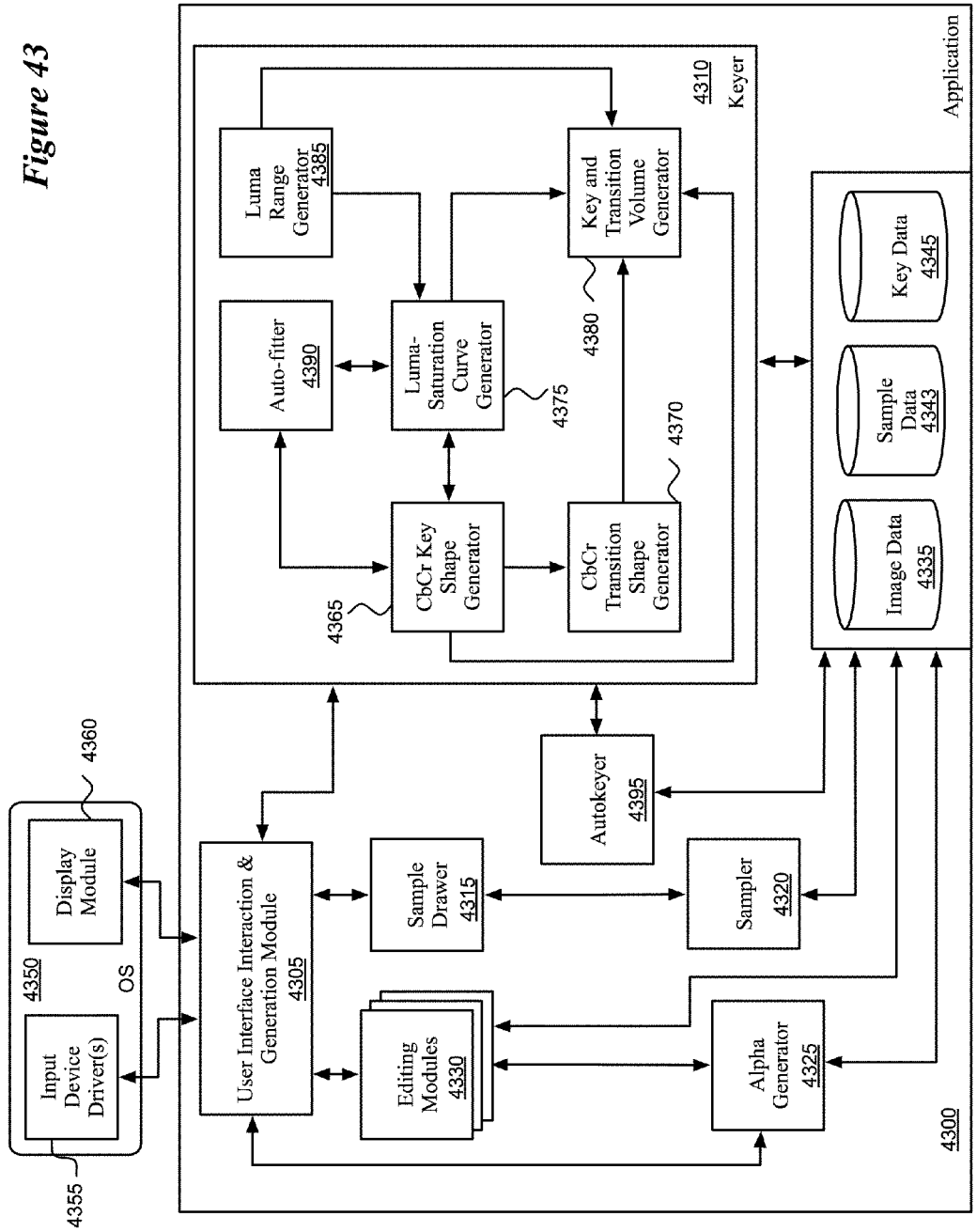
FIG. 43 conceptually illustrates the software architecture of a media editing application of some embodiments.

In some embodiments, the processes described above are implemented as software running on a particular machine, such as a computer or a handheld device, or stored in a machine readable medium. FIG. 43 conceptually illustrates the software architecture of a media editing application 4300 of some embodiments. In some embodiments, the media editing application is a stand-alone application or is integrated into another application (e.g., a compositing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 4300 includes a user interface (UI) interaction and generation module 4305, a keyer 4310, a sample drawer 4315, a sampler 4320, an alpha generator 4325, editing modules 4330, and autokeyer 4395. The media editing application also includes image data 4335, sample data 4340, and key data 4345. In some embodiments, the image data 4335 stores the images (i.e., still photos, video pictures, etc.) that a user edits with the media editing application 4300. This includes the pixel values for each pixel of the images. The sample data 4340 stores data about positive and negative samples selected by a user from an image to define a key and to constrain a transition region. The key data 4345 stores the definition of a key and transition region for an image in at least one color space (e.g., YCbCr, RGB, etc.). In some embodiments, storages 4335-4345 are all stored in one physical storage. In other embodiments, the storages are in separate physical storages, or two of the storages are in one physical storage while the third is in a different physical storage. For instance, the image data 4335 might be stored in one storage, while the sample data 4340 and key data 4345 are stored in a different storage.

FIG. 43 also illustrates an operating system 4350 that includes input device driver(s) 4355 and display module 4360. In some embodiments, as illustrated, the device drivers 4355 and display module 4360 are part of the operating system 4350 even when the media editing application 4300 is an application separate from the operating system.

The input device drivers 4355 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 4305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 4360 translates the output of a user interface for a display device. That is, the display module 4360 receives signals (e.g., from the UI interaction and generation module 4305) describing what should be displayed and translates these signals into pixel information that is sent to the display device. The display device may be an LCD, plasma screen, CRT monitor, touchscreen, etc.

The UI interaction and generation module 4305 of media editing application 4300 interprets the user input data received from the input device drivers and passes it to various modules, including the keyer 4310, the sample drawer 4315, the alpha generator 4325, and the editing modules 4330. The UI interaction module also manages the display of the UI, and outputs this display information to the display module 4365. This UI display information may be based on information from the keyer 4305, the sample drawer 4315, the editing modules 4330, the alpha generator 4325, etc. In addition, the module 4305 may generate portions of the UI based just on user input—e.g., when a user moves an item in the UI that only affect the display, not any of the other modules, such as moving a window from one side of the UI to the other.

The keyer 4310 generates a key and transition region for an image based on inputs including samples and direct user modification. The keyer 4310 includes a CbCr key shape generator 4365, a CbCr transition shape generator 4370, a luma-saturation curve generator 4375, a key and transition volume generator 4380, a luma range generator 4385, and an auto-fitter 4390. While the keyer described here operates in the YCbCr color space (as well as the HSL color space), some embodiments operate in other color spaces as well.

The CbCr key shape generator 4365 generates a shape in the CbCr plane for the key based on sample pixel values. In some embodiments, the key shape generator identifies a radial spread and angular spread (which translate to a hue range and saturation range) required to enclose the projection of all of the positive sample pixels into the plane. The key shape generator 4365 also responds to user input to directly modify the key shape (e.g., by dragging the edges of the shape).

The CbCr transition shape generator 4370 generates a shape in the CbCr plane for the transition region based on the key shape from the CbCr key shape generator 4365, any negative sample pixel values, and a transition size value. In some embodiments, the transition shape generator 4370 performs at least a portion of process 1100 or a similar process in order to generate the transition shape. The transition shape generator 4370 also responds to user input to directly modify the transition shape (e.g., by dragging the edges of the shape).

The luma-saturation curve generator 4375 generates the luma-saturation curve based on user input to modify the curve, or an auto-fitting of the curve by the auto-fitter 4390. In some embodiments, the curve is initially a straight line with a set of points that can be modified by a user, as illustrated in FIG. 32. In response to user modification of the points (which may be definition points for a spline curve, in some embodiments), the curve generator 4375 generates a new curve to define how the key and transition shapes from the shape generators 4365 and 4370 propagate along the luma axis.

The auto-fitter 4390 defines new locations for the modifiable points of the luma-saturation curve to tighten the fit of the key in three dimensions. In some embodiments, the auto-fitter 4390 performs the method illustrated in FIG. 35 in order to better fit the key in three dimensions of color space.

The luma range generator 4385 uses the luma values of sampled pixels from an image and generates a range for the key and transition volumes in the luma dimension. This information is used by the luma-saturation curve generator 4375 to identify locations along the luma axis for definition points of the curve and by the key and transition volume generator 4380.

The key and transition volume generator 4380 generates the final key and transition volumes. The volume generator 4380 propagates the key and transition shapes from the shape generators 4365 and 4370 along the luminance axis according to the curve from the curve generator 4375. The keyer 4310 stores the shapes, curve, and volumes that define the key in the key data storage 4345.

The sample drawer 4315 receives user input to draw a sample shape over an image. The sample drawer 4315 identifies, based on which tool is selected, whether the sample is a positive sample or negative sample. Based on the location in the user interface of the cursor (or, if a touchscreen, the location being touched), the sample drawer generates a sample shape to be drawn over the image. The sample drawer 4315 also passes the sample shape information to the sampler 4320. In some embodiments, the sample drawer 4315 also generates sample shapes automatically when an image is autokeyed.

The sampler 4320 identifies, based on a drawn sample, the pixels of an image at which is part of the sample. From the pixels, the sampler identifies the pixel values (i.e., the Y, Cb, and Cr values) and stores these as sample data 4340. The sampler 4320 also sends this information to the keyer 4310 for use in generating the key.

The alpha generator 4325 receives image data 4335 (i.e., pixel values for each pixel of the image) and key data 4345, and identifies an alpha value for each pixel in the image. The alpha values are used to generate an alpha view in the user interface and to determine the extent to which various edits are applied to the pixels of the image. In order to generate the alpha values, the alpha generator may have to convert between the color space of the image data (e.g., RGB) and the color space of the key data (e.g., YCbCr)

The editing modules 4330 perform various edits to a selected portion of the image. The various edits may include color correction edits (e.g., modifications to hue, luminance, or saturation, modification of RGB coordinates, etc.) in some embodiments. The edits are performed to a different extent on different pixels based on the alpha value of the pixels.

The autokeyer 4395 automatically generates a key for an image when the image is opened by the media-editing application 3100. The autokeyer, as described above in Section IV, identifies sample pixels for a key based on a bluescreen or greenscreen background of an image.

The sample pixels are sent to the keyer 4310 to generate a key.

While many of the features have been described as being performed by one module (e.g., the UI interaction and generation module 4305, the autokeyer 4395, etc.), one of ordinary skill in the art will recognize that the functions described herein might be split up into multiple modules. Similarly, functions described as being performed by multiple different modules might be performed by a single module in some embodiments (e.g., the sample drawing and sampler functions).

VII. Process for Defining a Media Production Application

Figure 44:
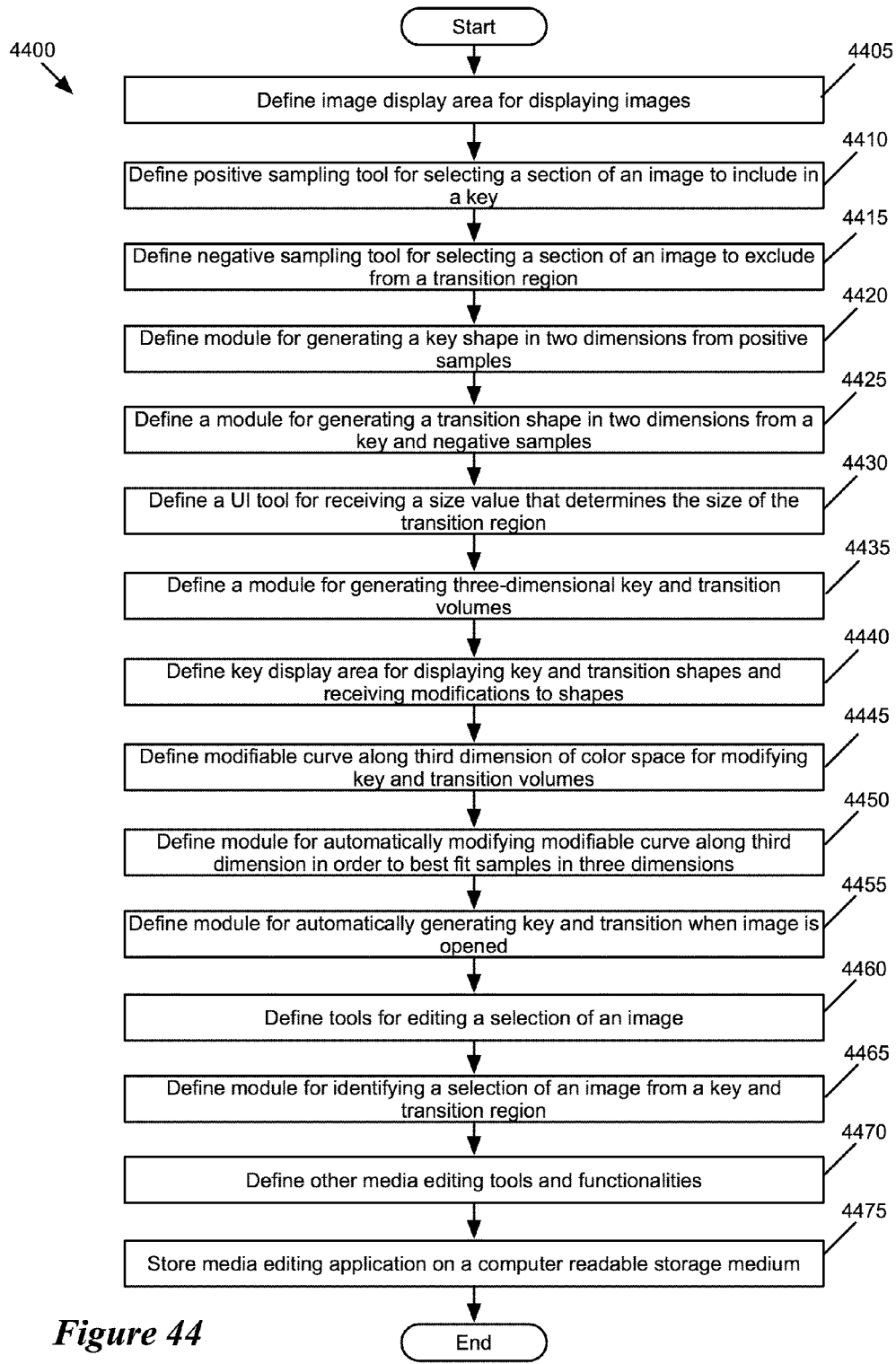
FIG. 44 conceptually illustrates a process of some embodiments for manufacturing a computer readable medium that stores a media editing application such as the application of FIG. 43.

FIG. 44 conceptually illustrates a process 4400 of some embodiments for manufacturing a computer readable medium that stores a media editing application such as the application 4300 described above. In some embodiments, the computer readable medium is a distributable CD-ROM. As shown, the process 4400 begins by defining (at 4405) an image display area for displaying images, such as the image display area 505 of FIG. 5. The process next defines (at 4410) a positive sampling tool for selecting a section of an image to include in a key. The process also defines (at 4415) a negative sampling tool for selecting a section of an image to exclude from a transition region. The sampling UI items 525 and 535 are examples of UI items that activate such tools.

Next, the process 4400 defines (at 4420) a module for generating a key shape in two dimensions from positive samples, such as the CbCr key shape generator 4365 of FIG. 43. The process then defines (at 4425) a module for generating a transition shape in two dimensions from a key and negative samples. The CbCr transition shape generator 4370 is an example of such a module. The process next defines (at 4430) a UI tool for receiving a size value that determines the size of the transition region, such as the transition region size slider 555 of FIG. 5. The process 4400 defines (at 4435) a module for generating three-dimensional key and transition volumes in a color space. The key and transition volume generator 4380 is an example of such a module.

Next, the process 4400 defines (at 4440) a key display area for displaying key and transition shapes and receiving modifications to the shapes. The key display area 515 of FIG. 5 is an example of a key display area which displays the key and transition shapes. The process then defines (at 4445) a modifiable curve along the third dimension of a color space for modifying key and transition volumes in the color space. An example of such a curve is the curve 3270 of FIG. 32. The process defines (at 4450) a module for automatically modifying the modifiable curve along the third dimension in order to best fit samples in three dimensions. The autofitter 4390 is an example of such a module.

The process 4400 defines (at 4455) a module for automatically generating a key and transition when an image is opened. The autokeyer 4395 is one example of such a module. The process then defines (at 4460) tools for editing a selection of an image, such as the color correction tools 4125 and 4135 illustrated in FIG. 41. The process defines (at 4465) a module for identifying a selection of an image from a key and transition region. The alpha generator 4325 of FIG. 43 is an example of such a module.

The process also defines (at 4470) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process defines these additional tools in order to create a media editing application that has many additional features to the features described above.

Figure 45:
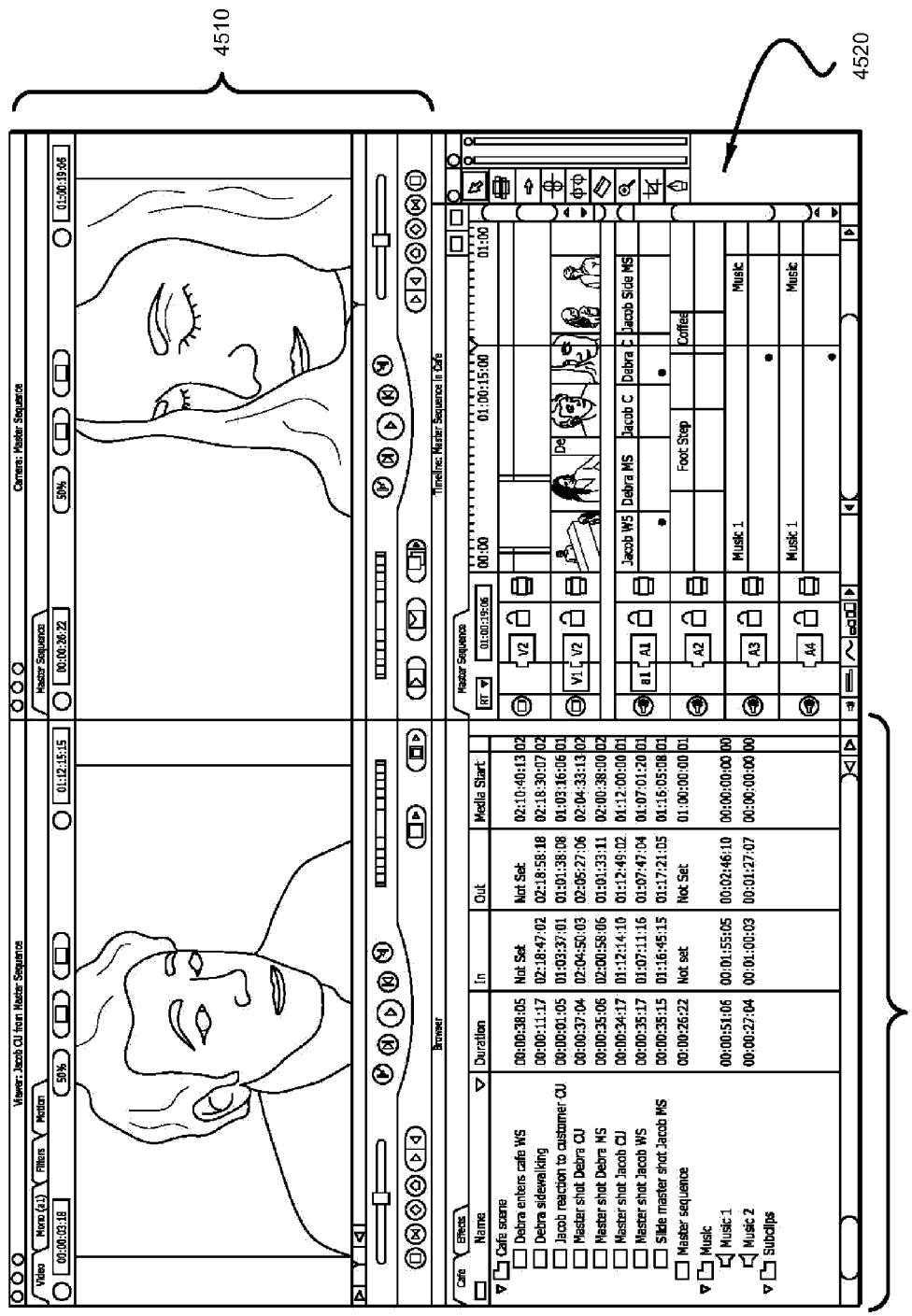
FIG. 45 illustrates an alternative GUI of the media editing application of some embodiments.

A more detailed view of a media editing application with these additional features is illustrated in FIG. 45. Specifically, this figure shows a media editing application with these additional tools. FIG. 45 illustrates a list of video and/or audio clips 4510, video editing tools 4520, and video displays 4530. The list of clips 4510 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 4520 include tools that allow a user to graphically set in and out points for video clips (in other words, where in the final product a specific clip or part of a clip will be shown). The video editing tools 4520 can be used to modify the temporal sequence of the video frame and to synchronize audio tracks with video tracks (e.g., in order to add music over a video clip). In some embodiments, video editing tools 4520 also give users the ability to edit in effects or perform other video editing functions. In some embodiments, the video editing tools include trim tools for performing edits such as slide edits, ripple edits, slip edits, roll edits, etc.

Video displays 4530 allow a user to watch multiple video clips at once, thereby enabling easier selection of in and out points for the video clips. The screen shot 4500 illustrates a few of many different editing tools that a video editing application of some embodiments may have to edit digital video.

In some cases, some or all of the video clips that are displayed in the list of clips 4510, played in displays 4530, and edited by a user with video editing tools 4520, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

In some embodiments, from the user interface illustrated in FIG. 45, a user can select a particular video clip in order to color correct the video. This may bring up a new user interface or a new window that allows the user to key the video and color correct the video as described in the sections above.

Returning to FIG. 44, the process then stores (at 4475) the media production application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 4400 are not exhaustive of the modules, rules, processes, and UI items that could be defined and stored on a computer readable storage medium for a media production application incorporating some embodiments of the invention. In addition, the process 4400 is a conceptual process, and the actual implementations may vary. For example, different embodiments may define the various elements in a different order, may define several elements in one operation, may decompose the definition of a single element into multiple operations, etc. In addition, the process 4400 may be implemented as several sub-processes or combined with other operations within a macro-process.

VIII. Computing Device

Many of the above-described features and applications are implemented as software processes that are specified as a set of instructions recorded on a machine readable storage medium (also referred to as machine readable medium, computer readable medium, or computer readable storage medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 46:
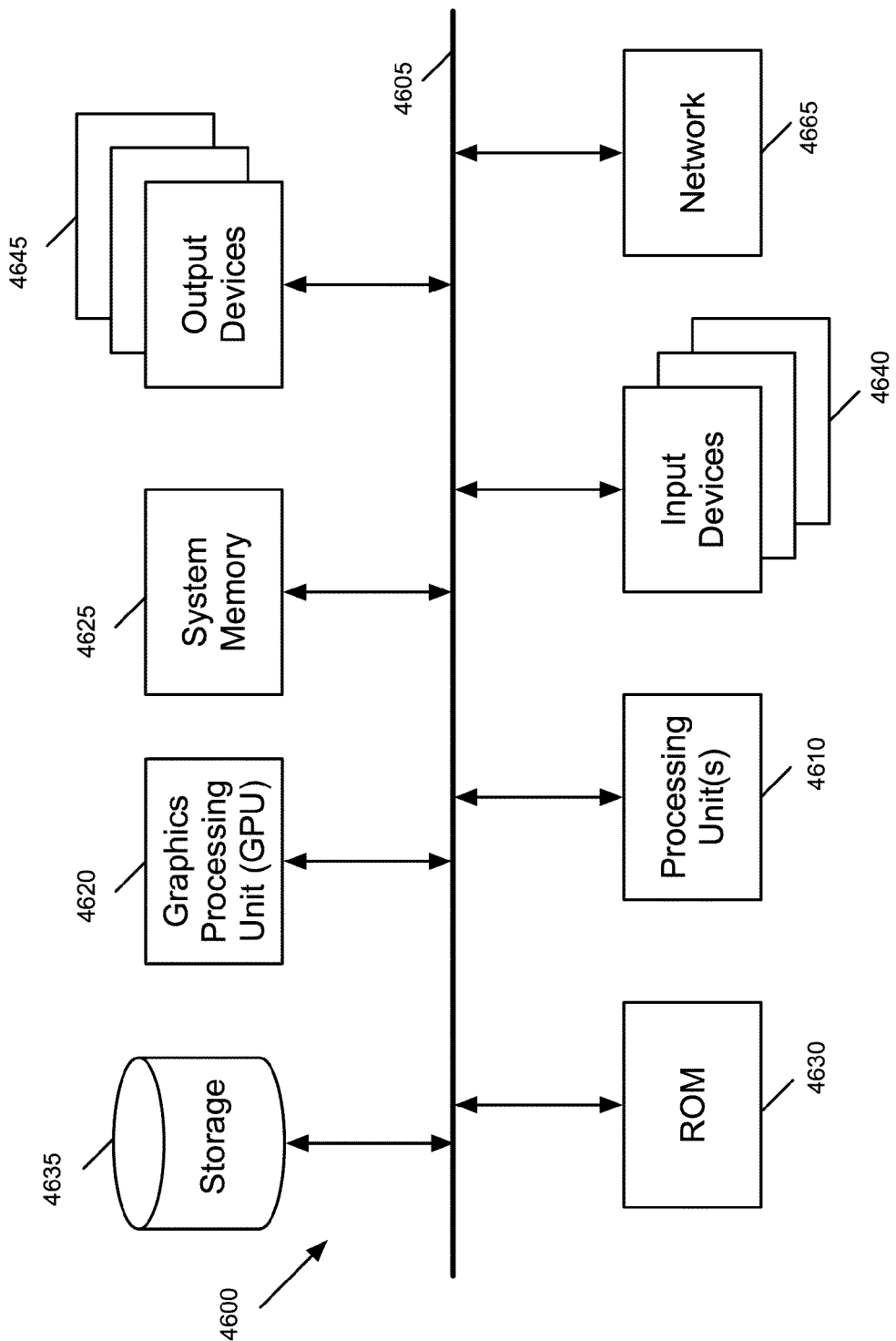
FIG. 46 conceptually illustrates a computer system with which some embodiments of the invention are implemented.

FIG. 46 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 4600 includes a bus 4605, processing unit(s) 4610, a graphics processing unit (GPU) 4620, a system memory 4625, a read-only memory 4630, a permanent storage device 4635, input devices 4640, and output devices 4645.

The bus 4605 collectively represents all system, peripheral, and chipset buses that communicatively connect the numerous internal devices of the computer system 4600. For instance, the bus 4605 communicatively connects the processing unit(s) 4610 with the read-only memory 4630, the GPU 4620, the system memory 4625, and the permanent storage device 4635.

From these various memory units, the processing unit(s) 4610 retrieve instructions to execute and data to process in order to execute the processes of the invention. The processing unit(s) may be a single processor or a multi-core processor in different embodiments. While the discussion in this section primarily refers to software executed by a microprocessor or multi-core processor, in some embodiments the processing unit(s) include a Field Programmable Gate Array (FPGA), an ASIC, or various other electronic components for executing instructions that are stored on the processor.

Some instructions are passed to and executed by the GPU 4620. The GPU 4620 can offload various computations or complement the image processing provided by the processing unit(s) 4610. In some embodiments, such functionality can be provided using CoreImage's kernel shading language.

The read-only-memory (ROM) 4630 stores static data and instructions that are needed by the processing unit(s) 4610 and other modules of the computer system. The permanent storage device 4635, on the other hand, is a read-and-write memory device. This device is a non-volatile memory unit that stores instructions and data even when the computer system 4600 is off. Some embodiments of the invention use a mass-storage device (such as a magnetic or optical disk and its corresponding disk drive) as the permanent storage device 4635.

Other embodiments use a removable storage device (such as a floppy disk, flash drive, or ZIP® disk, and its corresponding disk drive) as the permanent storage device. Like the permanent storage device 4635, the system memory 4625 is a read-and-write memory device. However, unlike storage device 4635, the system memory is a volatile read-and-write memory, such a random access memory. The system memory stores some of the instructions and data that the processor needs at runtime. In some embodiments, the invention's processes are stored in the system memory 4625, the permanent storage device 4635, and/or the read-only memory 4630. For example, the various memory units include instructions for processing multimedia items in accordance with some embodiments. From these various memory units, the processing unit(s) 4610 retrieve instructions to execute and data to process in order to execute the processes of some embodiments.

The bus 4605 also connects to the input and output devices 4640 and 4645. The input devices enable the user to communicate information and select commands to the computer system. The input devices 4640 include alphanumeric keyboards and pointing devices (also called "cursor control devices"). The output devices 4645 display images generated by the computer system. The output devices include printers and display devices, such as cathode ray tubes (CRT) or liquid crystal displays (LCD).

Finally, as shown in FIG. 46, bus 4605 also couples computer 4600 to a network 4665 through a network adapter (not shown). In this manner, the computer can be a part of a network of computers (such as a local area network ("LAN"), a wide area network ("WAN"), or an Intranet, or a network of networks, such as the internet. Any or all components of computer system 4600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "machine readable medium" and "machine readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 11, 20, 23, 26, 33, 36, 38, and 44) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by at least one processing unit edits an image, the image comprising a plurality of pixels having pixel values in a color space, the program comprising sets of instructions for:
   based on a selected section of pixels of the image, identifying (i) a first portion of the color space and (ii) a second portion of the color space that encloses the first portion, wherein pixels whose pixel values are in the first portion of the color space are fully selected and pixels whose pixel values are in the second portion of the color space are partially selected;
   displaying a first freely deformable shape in two dimensions of the color space that represents the first portion in the two dimensions of the color space; and
   displaying a second freely deformable shape that encloses the first freely deformable shape in the two dimensions of the color space and represents the second portion in the two dimensions of the color space, wherein user modification to the first freely deformable shape causes automatic modification to the second freely deformable shape in order to maintain that the second freely deformable shape encloses the first freely deformable shape in the color space.

2. The non-transitory machine readable medium of claim 1, wherein the selected section of pixels comprises pixels whose pixel values are in the first portion of the color space.

3. The non-transitory machine readable medium of claim 1, wherein the first and second freely deformable shapes are wedge shapes.

4. The non-transitory machine readable medium of claim 3, wherein the wedge shapes are defined by angular and radial spreads in the two dimensions of the color space.

5. The non-transitory machine readable medium of claim 4, wherein the wedge shapes are deformable by modifying the angular and radial spreads.

6. The non-transitory machine readable medium of claim 1, wherein the first and second freely deformable shapes comprise a set of modifiable spline curves.

7. A non-transitory machine readable medium storing a program for execution by at least one processing unit, the program comprising sets of instructions for:
   receiving, for an image comprising a plurality of pixels, each pixel having a set of pixel values in a color space, a first selection of a first set of pixels for defining a first portion of the color space;
   identifying, in a two-dimensional plane of the color space, (i) an angular spread of the pixel values of the first set of pixels and (ii) a radial spread of the pixel values of the first set of pixels;
   defining the first portion of the color space based on the identified angular and radial spreads of the pixel values, the first portion for identifying a fully selected region of the image;
   defining a second portion of the color space to have a larger angular spread and larger radial spread than the first portion and thereby enclose the first portion in the two-dimensional plane, the second portion for identifying a partially selected region of the image;
   receiving a second selection of a second set of pixels for modifying the second portion of the color space; and
   modifying the second portion of the color space to exclude pixel values of the second set of pixels while continuing to enclose the first portion in the two-dimensional plane.

8. The non-transitory machine readable medium of claim 7, wherein the color space is a three-dimensional color space, wherein the set of instructions for defining the first portion of the color space comprises sets of instructions for:
   defining a shape in the two-dimensional plane from the angular and radial spreads of the pixel values; and
   extending the defined shape into the third dimension of the color space as a prism to define the first portion of the color space.

9. The non-transitory machine readable medium of claim 7, wherein the two-dimensional plane of the color space is a chrominance plane.

10. The non-transitory machine readable medium of claim 7, wherein the angular spread of the pixel values of the first set of pixels represents a hue range of the pixel values and the radial spread of the pixel values of the first set of pixels represents a saturation range of the pixel values.

11. The non-transitory machine readable medium of claim 7, wherein the larger angular spread for the second portion of the color space encloses the angular spread of the first portion of the color space and the larger radial spread for the second portion of the color space encloses the radial spread of the first portion of the color space.

12. The non-transitory machine readable medium of claim 7, wherein the larger angular and radial spreads of the second portion of the color space are based on the angular and radial spreads of the first portion of the color space as well as a size value for the second portion of the color space.

13. The non-transitory machine readable medium of claim 7, wherein the color space is a first color space and the image is stored as a set of pixel values in a second color space.

14. The non-transitory machine readable medium of claim 7, wherein the program further comprises sets of instructions for:
   receiving a third selection of a third set of pixels for defining the first portion of the color space;
   identifying (i) a new angular spread of the pixel values of the first and third sets of pixels combined and (ii) a new radial spread of the pixel values of the first and third sets of pixels combined; and
   redefining the first portion of the color space based on the identified new angular and radial spreads of the pixel values.

15. The non-transitory machine readable medium of claim 7, wherein the program further comprises sets of instructions for:
   receiving a third selection of a third set of pixels for modifying the second portion of the color space;
   modifying the second portion of the color space to exclude both pixel values of the second set of pixels and pixel values of the third set of pixels while continuing to enclose the first portion in the two-dimensional plane.

16. The non-transitory machine readable medium of claim 15, wherein the pixel values of the second and third sets of pixels are excluded separately from the second portion of the color space.

17. A method for editing an image, the image comprising a plurality of pixels having pixel values in a color space, the method comprising:
- based on a selected section of pixels of the image, identifying (i) a first portion of the color space and (ii) a second portion of the color space that encloses the first portion, wherein pixels whose pixel values are in the first portion of the color space are fully selected and pixels whose pixel values are in the second portion of the color space are partially selected;
- displaying a first freely deformable shape in two dimensions of the color space that represents the first portion in the two dimensions of the color space; and
- displaying a second freely deformable shape that encloses the first freely deformable shape in the two dimensions of the color space and represents the second portion in the two dimensions of the color space, wherein user modification to the first freely deformable shape causes automatic modification to the second freely deformable shape in order to maintain that the second freely deformable shape encloses the first freely deformable shape in the color space.

18. The method of claim 17, wherein the selected section of pixels comprises pixels whose pixel values are in the first portion of the color space.

19. The method of claim 17, wherein the first and second freely deformable shapes are wedge shapes.

20. The method of claim 19, wherein the wedge shapes are defined by angular and radial spreads in the two dimensions of the color space.

21. The method of claim 20, wherein the wedge shapes are deformable by modifying the angular and radial spreads.

22. The method of claim 17, wherein the first and second freely deformable shapes comprise a set of modifiable spline curves.

* * * * *